(12) United States Patent
Douglas et al.

(10) Patent No.: US 12,012,283 B1
(45) Date of Patent: Jun. 18, 2024

(54) ROBOTIC FULFILLMENT SYSTEM CARTON RELEASE LOGIC

(71) Applicant: Staples, Inc., Framingham, MA (US)

(72) Inventors: Matthew Robert Douglas, Orlando, FL (US); Yizhi Wang, Natick, MA (US); Stephen Nilsen, Clayton, NC (US); Paolo Gerli Amador, Framingham, MA (US); Gregory Patrick Cox, Sleepy Hollow, NY (US); Deepak Sharma, Shrewsbury, MA (US); Daniel Jarvis, Windermere, FL (US); Amit Kalra, Acton, MA (US); Kehang Han, Cambridge, MA (US)

(73) Assignee: Staples, Inc., Framingham, MA (US)

( * ) Notice: Subject to any disclaimer, the term of this patent is extended or adjusted under 35 U.S.C. 154(b) by 218 days.

(21) Appl. No.: 16/917,648

(22) Filed: Jun. 30, 2020

(51) Int. Cl.
| | |
|---|---|
| *B65G 1/06* | (2006.01) |
| *B65G 1/04* | (2006.01) |
| *B65G 1/137* | (2006.01) |
| *G05D 1/00* | (2006.01) |
| *G06Q 10/087* | (2023.01) |

(52) U.S. Cl.
CPC .......... *B65G 1/065* (2013.01); *B65G 1/0492* (2013.01); *B65G 1/1378* (2013.01); *G05D 1/0212* (2013.01); *G06Q 10/087* (2013.01)

(58) Field of Classification Search
CPC .... B65G 1/065; B65G 1/0492; B65G 1/1378; G05D 1/0212; G05D 2201/0216; G06Q 10/087
See application file for complete search history.

(56) References Cited

U.S. PATENT DOCUMENTS

| | | | | |
|---|---|---|---|---|
| 8,571,702 | B1* | 10/2013 | Haake | G06Q 10/047 |
| | | | | 705/26.1 |
| 8,682,473 | B1* | 3/2014 | Ramey | G06Q 10/087 |
| | | | | 705/29 |
| 10,099,864 | B1 | 10/2018 | Gopalakrishnan et al. | |
| 10,683,171 | B2 | 6/2020 | Jarvis et al. | |
| 10,803,420 | B2 | 10/2020 | Jarvis et al. | |
| 11,074,547 | B2* | 7/2021 | Rajkhowa | G06Q 10/04 |
| 2013/0317642 | A1* | 11/2013 | Asaria | G06Q 10/08 |
| | | | | 700/216 |
| 2014/0279191 | A1* | 9/2014 | Agarwal | G06Q 30/0633 |
| | | | | 705/26.7 |
| 2016/0176637 | A1* | 6/2016 | Ackerman | B62B 3/005 |
| | | | | 700/215 |
| 2017/0278047 | A1* | 9/2017 | Welty | G05D 1/0011 |
| 2019/0152703 | A1* | 5/2019 | Sellner | B65G 1/1373 |
| 2020/0151665 | A1* | 5/2020 | Fitzgerald | B65G 1/1378 |

(Continued)

*Primary Examiner* — Nathan A Mitchell
(74) *Attorney, Agent, or Firm* — VLP Law Group LLP; Michel Bohn

(57) ABSTRACT

A release logic system for releasing cartons into a fulfillment system is described. In an example implementation, a release logic engine may receive carton data representing a set of cartons and indicating picks for each the set of cartons. The release logic engine may determine a score for a carton of the set of cartons based on a location of a first pick of the carton in a pick-to-cart area of a fulfillment center. In some implementations, the release logic engine may assign the carton to a cart adapted to transport cartons based on the score determined for the carton, and may induct the carton into the fulfillment center for the first pick using the cart.

20 Claims, 24 Drawing Sheets

(56) References Cited

U.S. PATENT DOCUMENTS

2020/0265381 A1*  8/2020  Willard, III ........ G06Q 10/0837
2020/0311644 A1* 10/2020  Willard, III ........ G06Q 30/0601
2021/0061566 A1*  3/2021  Cacioppo ................. B25J 9/162
2021/0354922 A1* 11/2021  Gravelle ................ B65G 1/137

* cited by examiner

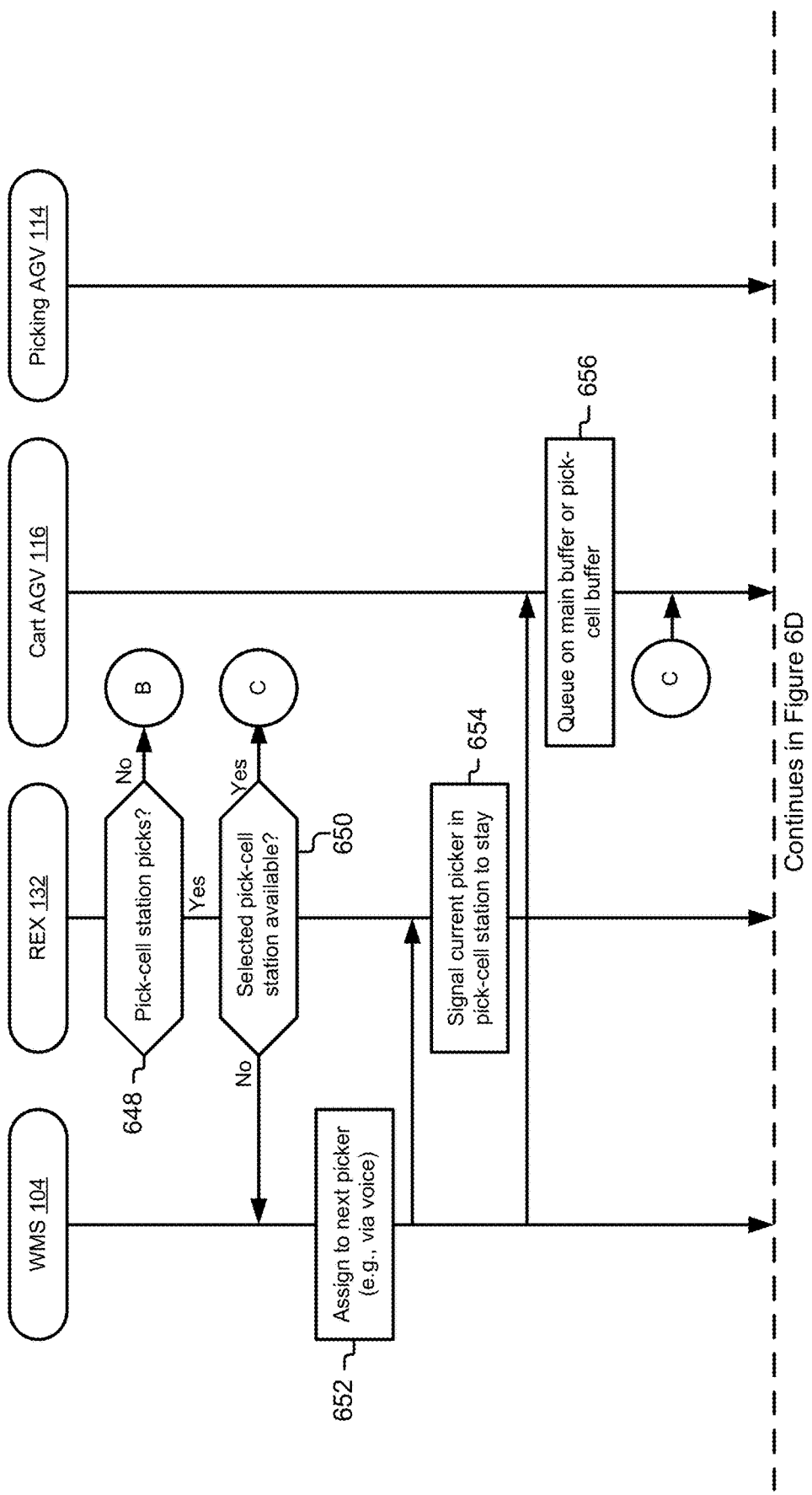

ROBOTIC FULFILLMENT SYSTEM CARTON RELEASE LOGIC

BACKGROUND

This application relates to inventory management systems (e.g., order distribution or fulfillment systems). For example, this application relates to automated guided vehicles used in inventory management systems.

Some current inventory management systems use drag-along carts on which human agents (pickers) place items they select (pick) to fulfill orders. In a zone-less pick-to-cart system, an agent drags his/her cart from location to location as instructed by the computer system of the facility. The cart can accommodate multiple orders and typically is equipped with dedicated cartons that are keyed to the orders being fulfilled by the agent during that cartload. In some cases, the agent wears a headset and/or is provided a terminal, such as a mobile picking computing device, via which the agent is provided ordered, item-by-item instructions on which items to pick. As the agent walks around the facility among the different fixed shelving units, he/she drags or pushes his/her cart manually. During a given shift, the agent may end up considerably fatigued from having to propel the cart around the warehouse.

Further, some current inventory management systems divide inventory into a series of zones and assign a human agent to a zone. The systems may use a conveyor belt to move orders across the zones as controlled by the computer system of the facility. In some cases, the agent wears a headset and/or is provided a terminal, such as a mobile computing device, via which the agent is provided ordered, item-by-item instructions on which items to pick. In some cases, pick-to-light systems use light displays to direct operators to product locations. Each product location may have a numeric or alphanumeric display with a light, an acknowledgment button, and a digital readout for indicating quantity.

Some current inventory management or distribution systems use a "goods-to-person" approach using robots to retrieve items to be picked from storage. For example, in these systems, robots may retrieve entire shelving units from storage and bring them to agents, who pick items from the shelving units.

These systems do not integrate picking in different picking areas together, nor do they efficiently manage which cartons are released to which area of the fulfillment center. For instance, some current inventory management or distribution systems send out continuous streams of cartons or entire batches (e.g., 1000 cartons) of cartons without regard for individual carts, individual picking stations, or workloads of various components of the system. These deficiencies lead to significant inefficiencies in resource utilization, imbalanced equipment workloads, and other problems.

SUMMARY

A carton release logic system can be configured to perform particular operations or actions by virtue of having software, firmware, hardware, or a combination of them installed on the system that in operation causes or cause the system to perform the actions. One general aspect of the system includes a computer-implemented method may include: receiving carton data representing a set of cartons, the carton data indicating one or more picks for each carton of the set of cartons; determining a score for a first carton of the set of cartons based on a first location of a first pick of the one or more picks for the first carton in a pick-to-cart area of a fulfillment center; assigning the first carton to a cart based on the score determined for the first carton, the cart being adapted to transport cartons to the pick-to-cart area of the fulfillment center; and inducting the first carton into the fulfillment center for the first pick using the cart.

Some implementations may include one or more of the following features: dispatching the cart to the pick-to-cart area of the fulfillment center based on the first location of the first pick for the first carton including transmitting an instruction to a cart automated guided vehicle (AGV) to transport the cart from an induction area to the first location, the cart AGV coupling with the cart to transport the cart, the cart AGV including a drive unit providing motive force to propel the cart AGV, a controller receiving the instruction and controlling the cart AGV, a guidance system coupled with the controller and processing navigation markers to locate the cart AGV within the fulfillment center, and a power source coupled to the controller and the drive unit; determining a first subset of cartons of the set of cartons that is assigned to be picked in the pick-to-cart area of the fulfillment center based on status codes associated with the set of cartons, the first subset of cartons including the first carton; determining a second subset of cartons of the set of cartons that is assigned to be picked in a goods-to-person area of the fulfillment center based on the status codes associated with the set of cartons; inducting one or more of the second subset of cartons to a station in the goods-to-person area of the fulfillment center; assigning each of the set of cartons to one of the first subset of cartons and the second subset of cartons including: determining a first workload level of the pick-to-cart area of the fulfillment center, determining a second workload level of the goods-to-person area of the fulfillment center, and setting a status code for that carton of the set of cartons based on level and the second workload level; determining that a second carton of the second subset of cartons is swappable from the first subset of cartons to the second subset of cartons based on a physical attribute of the second carton; and reassigning the second carton from the first subset of cartons to the second subset of cartons based on the determination that the second carton is swappable including modifying the status code for the second carton.

Some implementations may additionally or alternatively include one or more of the following features: that the first carton includes a first pick and a second pick in the pick-to-cart area of the fulfillment center, and determining the score for the first carton includes: determining the first location of the first pick for the first carton, determining a second location of the second pick for the first carton, and computing the score for the first carton based on a proximity of the second location to the first location; that determining the score for the first carton includes: determining the first location of the first pick for the first carton, determining a second location of a second pick for a second carton, the second carton being assigned to the cart, and determining the score for the first carton based on the first location and the second location; determining that the second carton has a priority status based on a delivery departure cut time of the second carton; assigning the second carton to the cart based on the priority status, the second carton being assigned to the cart prior to the first carton being assigned to the cart; determining the score for the first carton based on a distance traveled from the second location to the first location; and that determining the score for the first carton based on the first location and the second location includes determining that the first location and the second location are located on a same aisle of the pick-to-cart area of the fulfillment center, determining a distance traveled in the same aisle by a cart transporting the first carton and the second carton to the first location and the second location, and/or determining that the first pick and the second pick are for items having a same stock keeping unit.

Some implementations may additionally or alternatively include one or more of the following features: that determining the score for the first carton includes determining a proximity of the first location to a focus zone in the pick-to-cart area of the fulfillment center; identifying a second carton of the set of cartons that has a second pick for an item marked as needing replenishment; holding the second carton for a later induction release; identifying a plurality of workstations adapted to prepare the set of cartons for the one or more picks in the fulfillment center, the fulfillment center including the pick-to-cart area and a goods-to-person area; configuring a first set of the plurality of workstations to prepare cartons of the set of cartons that are within a threshold time of a delivery departure cut time; determining a first workload level of the pick-to-cart area of the fulfillment center; determining a second workload level of the goods-to-person area of the fulfillment center; determining a level of balance between the first workload level and the second workload level; configuring a second set of the plurality of workstations to prepare cartons of the set of cartons for one or more of the pick-to-cart area and the goods-to-person area based on the level of balance; determining a second carton and a third carton of the set of cartons that are assigned to a goods-to-person area of the fulfillment center; assigning the second carton to a certain cartless fulfillment station based on a delivery departure cut time for the second carton and an attribute of the certain cartless fulfillment station; and assigning the third carton to the certain cartless fulfillment station based on the third carton having at least one pick at a same location as a pick of the second carton.

Other implementations of one or more of these aspects include corresponding systems, apparatus, and computer programs, configured to perform the actions of the methods, encoded on computer storage devices.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIGS. 6A-6E are data-flow diagrams of an example method of managing automated guided vehicles by a robot execution system.

DESCRIPTION

Figure 1:
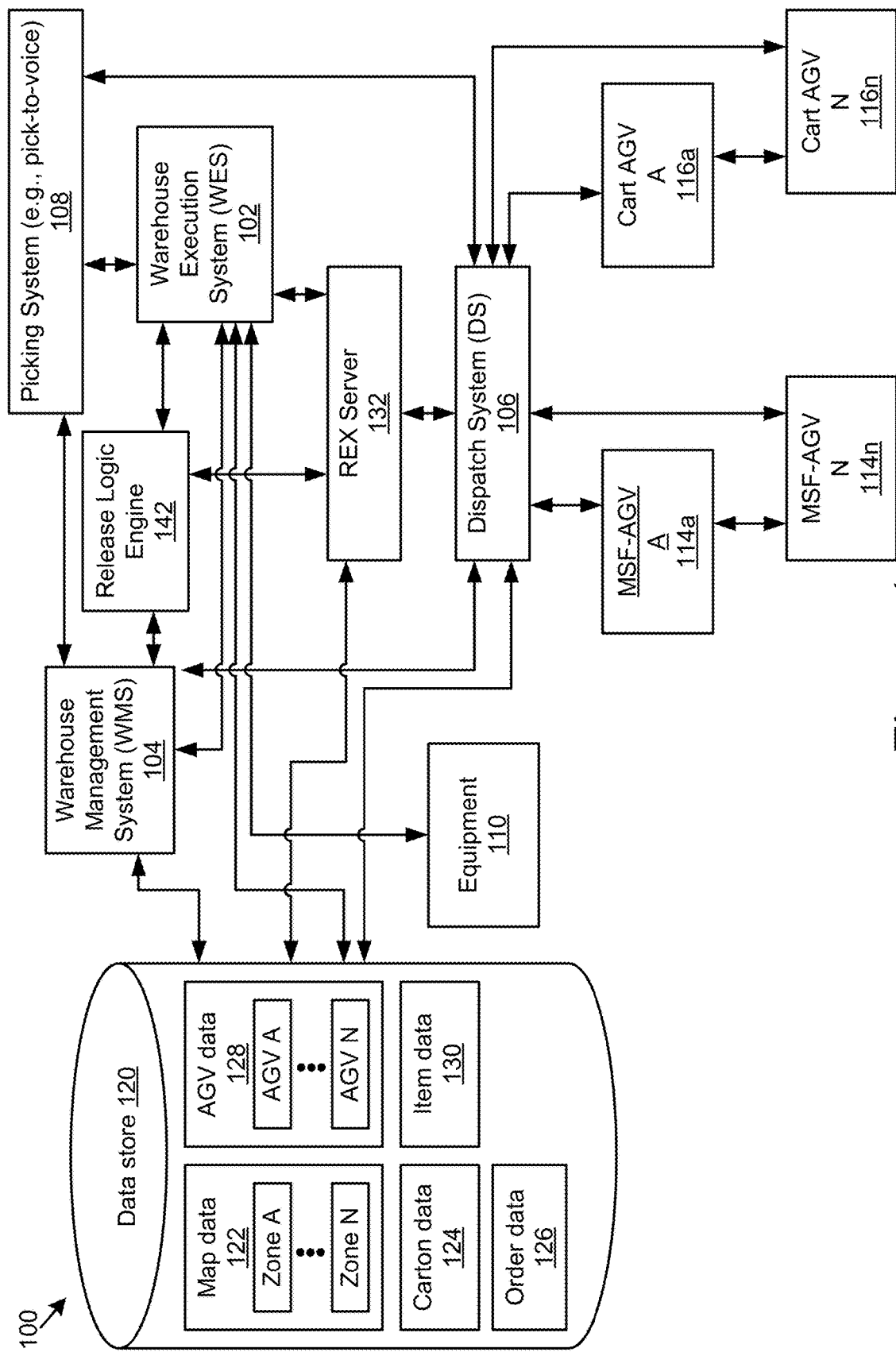
FIG. 1 is a block diagram of an example system and data communication flow for an intelligent carton release logic system.

Among other benefits, the technology described herein improves upon that described in the Background Section. For instance, the technology provides robotic devices, systems, methods, and other aspects that can more efficiently process goods (e.g., items in a distribution facility) based on demand, available capacity, and other dynamic factors in the resources and equipment of the distribution facility. Further, the technology can reduce the number of irrelevant items carried simultaneously with relevant items by providing automated guided vehicle(s) (AGV(s)) that are configured to efficiently carry items.

Implementations of the technology described herein include example AGVs that carry items. In some implementations, a cart AGV 116 may autonomously transport a cart loaded with cartons into which items may be picked.

In some implementations, a modular storage fetching AGV (MSF-AGV) 114 may autonomously retrieve items from storage and transport them to a picker, for example, at a goods-to-person station, such as a pick-cell station 316 or cartless station 326. An MSF-AGV 114 may autonomously retrieve items from shelving units in a high-density storage area 304, transport them (e.g., on a shelf of the MSF-AGV 114) to a picker, and, in some instances, place the items on shelves at a goods-to-person station for access by the picker. The technologies described in reference to the MSF-AGV 114 are beneficial over the previous solutions described in the Background Section at least because they allow the MSF-AGV 114 to retrieve individual items or containers of items from shelving units in a high-density storage area rather than having to retrieve entire shelving units.

Implementations of the technology may gather real-time data from equipment (e.g., MSF-AGVs 114, cart AGVs 116, picking system 108, equipment 110, etc.) in the distribution facility to determine a use level, backlog, capacity, downtime, etc., for the equipment and may use the data to select cartons for fulfillment using various equipment in the facility and based on attributes of the cartons. For instance, the technology may separate out workflows for different equipment, which allows the system to reduce cycle times of carts and optimize the path and operations of the carts and, in some implementations, that of associated mechanical equipment, such as conveyors, AGVs, etc.

For a particular resource, such as a cart, AGV, goods-to-person station, picking computing device, etc., the technology may select an optimal set of cartons to reduce downtime of the resource, increase efficiency and utilization of equipment, reduce computation loads, and speed up preparation of cartons. For example, the cartons may be grouped together based on affinity (e.g., the frequency at which items occur in common orders), location within the distribution facility, carton/box type, etc.

The technology may also manage the priority of individual cartons and manage stock levels in the distribution facility. For instance, the technology may track a departure cut time for a delivery vehicle associated with a certain carton, the time to prepare the carton, and a release time to allow the certain carton to be prepared using determined equipment, at a determined time, and/or in association with other cartons so that the certain carton can be placed on the delivery vehicle before the departure cut time.

Features of the technology described herein can be integrated into any logistics system, dispatch system 106, warehouse execution system 102, warehouse management system 104, a robot execution server 132, etc., to coordinate the provision of to-be-picked items in a hybrid modular storage fetching system. This technology beneficially improves productivity and throughput, increases asset utilization, and lowers cycle time and labor costs. These benefits, in turn, lead to shorter delivery times and result in significant value.

Further, it should be noted that while operations herein are described in reference to a robotic system, some aspects and implementations may be applied in systems using manual pickers (e.g., human warehouse associates), conveyor mechanisms, etc., while still providing significant benefits to these systems.

With reference to the figures, reference numbers may be used to refer to components found in any of the figures, regardless whether those reference numbers are shown in the figure being described. Further, where a reference number includes a letter (e.g., suffix) referring to one of multiple similar components (e.g., component 000a, 000b, and 000n), the reference number may be used without the letter to refer to one or all of the similar components.

FIG. 1 is a block diagram of an example system 100 and data communication flow for an intelligent carton release logic system. The system 100 includes a warehouse execution system (WES) 102. The WES 102 is coupled to equipment 110 (e.g., conveyor controls, conveyor scanners, conveyors, automated induction equipment, other warehouse equipment, etc.), a warehouse management system (WMS) 104, a data store 120 storing warehouse management, execution, dispatch, picking, carton, order, item, AGV, map, and/or other data, a picking system 108 (e.g., pick-to-voice, pick-to-light, etc.), a robot execution server (REX) 132, and a dispatch system 106.

The WES 102 may, in some implementations, include one or more hardware and/or virtual servers programmed to perform the operations, acts, and/or functionality described herein. The components of the WES 102 may comprise software routines storable in one or more non-transitory memory devices and executable by one or more computer processors of the WES 102 to carry out the operations, acts, and/or functionality described herein. In further implementations, these routines, or a portion thereof, may be embodied in electrical hardware that is operable to carry out the operations, acts, and/or functionality described herein.

The REX 132 may, in some implementations, include one or more hardware and/or virtual servers programmed to perform the operations, acts, and/or functionality described herein. The REX 132 may generate a schedule that defines the route for an AGV during a picking session, as described herein. For a given cart AGV 116a . . . 116n, depending on the items (e.g., identified by stock keeping units or SKUs) to be placed in the cartons of that cart, the REX 132 generates a schedule and transmits it to the dispatch system 106, which in turn deploys a cart AGV 116 according to the schedule, for instance. In some implementations, the dispatch system 106 instructs the AGV to proceed through one or more of the picking zones of the distribution facility according to the schedule. The schedule of the AGVs may be coordinated such that an optimal flow can be achieved, as discussed elsewhere herein.

In some implementations, the REX 132 may include or may communicate with a SKU (e.g., a stock keeping unit or unique identifier identifying an item) routing engine. The SKU routing engine is executable to route items into different storage zones/areas depending based on picking profiles of the items, which may be stored and maintained as item data 130. The SKU routing engine dynamically monitors the picking activity in the distribution facility, tracks which items have the highest volume or velocity for a given timeframe, stores the tracking data in the data store 120, and can instruct the REX 132 to have items relocated by AGVs to different storage locations in the distribution facility based on the tracked picking activity. In some implementations, the REX 132 may use the batches or lists generated by the release logic engine 142 (described below) when generating the schedule for the AGVs, for example, for a cart AGV 116.

A picking profile of a given item can change over time as demand for the item changes. The demand for a given item may be random or predictable (e.g., seasonal), and may change based on time of day, week, month, year, etc. The item routing engine may maintain the picking profile in the database as item data 130, and utilize that data to determine in which zone of the distribution facility to store the item.

The WES 102 may store productivity information for points in the distribution facility in a database (e.g., a non-transitory data store 120). The productivity information may reflect the mechanical capacity of that given point of the AGV system. In some cases, the mechanical capacity may be dynamic based on current conditions (e.g., system health, staffing levels (e.g., number of associates working in zone), stock levels, operational state, etc.).

The dispatch system 106 may be electronically communicatively coupled to a plurality of AGVs. In some implementations, the dispatch system 106, or elements thereof, may be integrated with or communicatively coupled with the REX 132. The dispatch system 106 includes hardware and software configured to dispatch the AGVs, and is coupled for communication the components of the system 100 to receive instructions and provide data. The dispatch system 106 may calculate a route to execute the task considering traffic and resources. In some cases, it adjusts the route or the task to keep the route optimum.

Figure 7B:
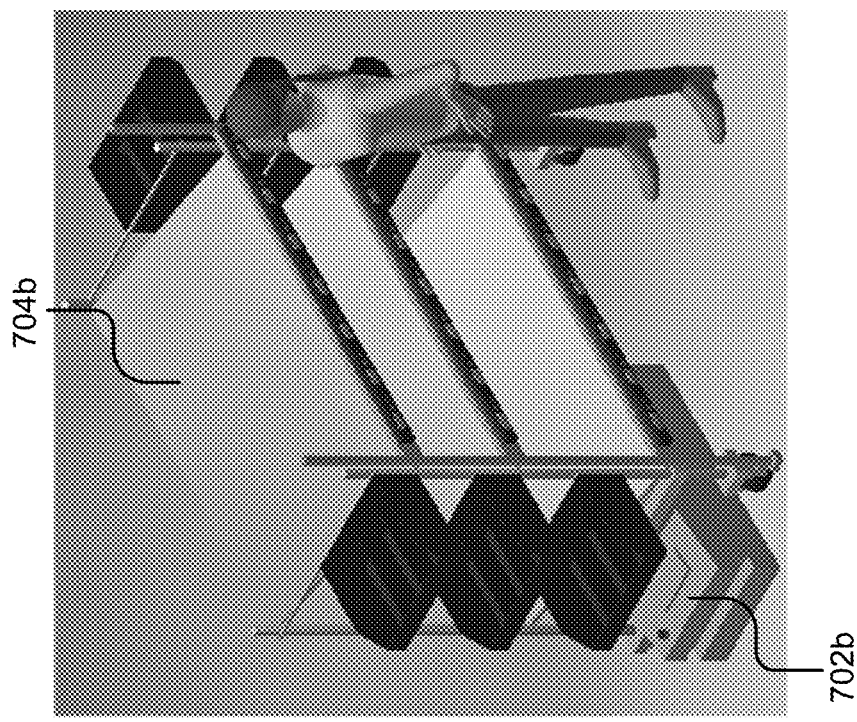
FIGS. 7A and 7B are illustrations of example cart automated guided vehicles.
Figure 7A:
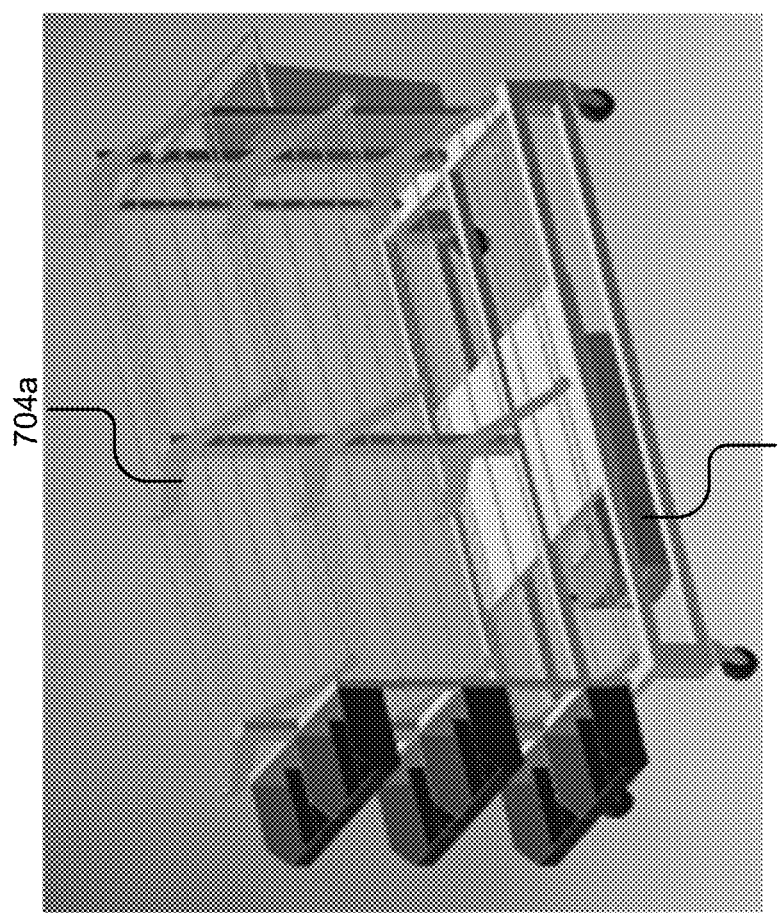
Figure 8:
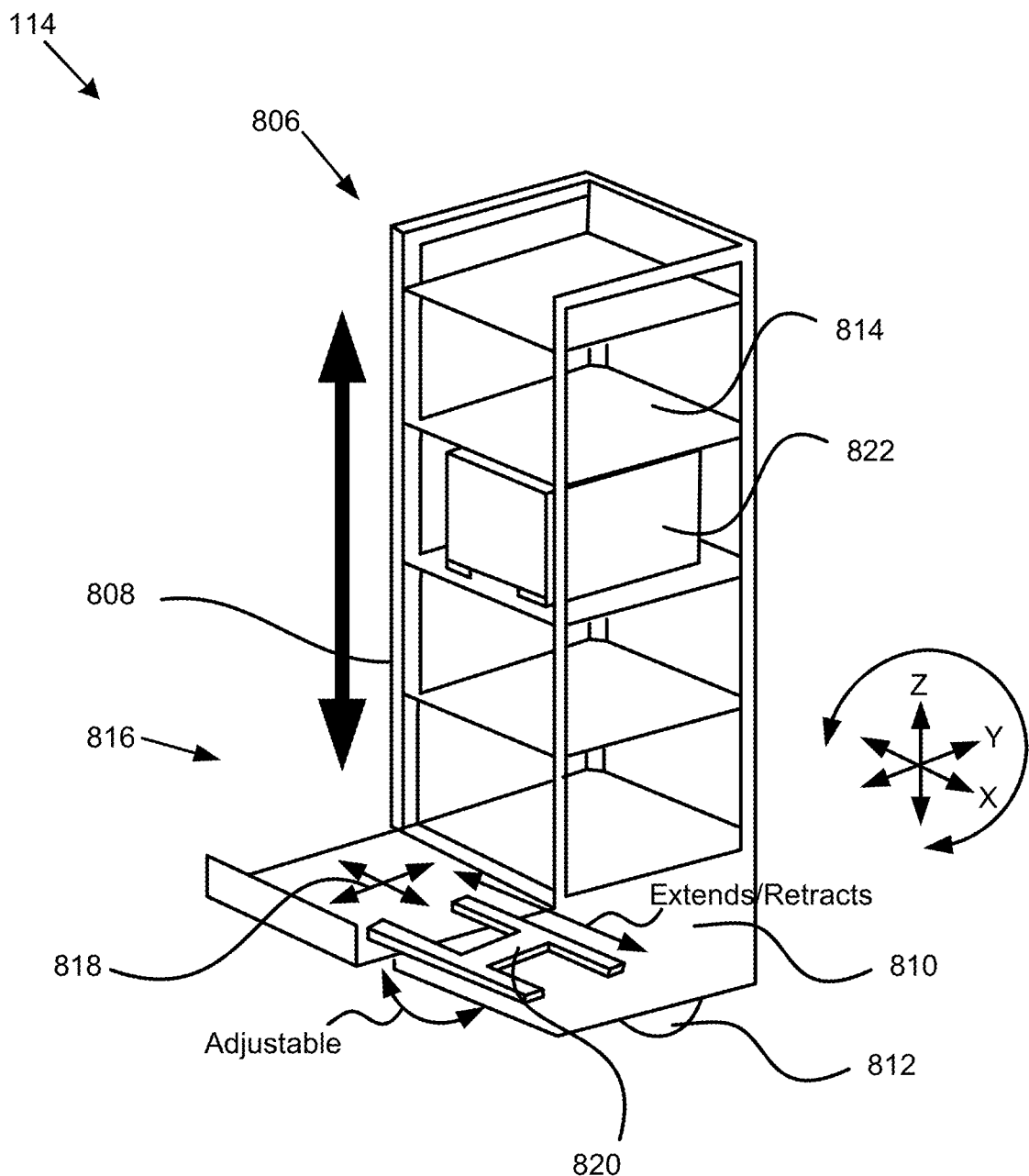
FIG. 8 is an illustration of an example picking automated guided vehicle.

The AGVs are robotic vehicles including drive units providing motive force for moving the AGVs (and, in some instances, carts, modular storage units, AGV racks, AGV shelves, etc.), guidance systems for determining the positions of the AGVs within the distribution facility, and equipment for carrying items. The equipment for carrying items may include carton holders, AGV shelves, modular storage unit holders, etc., such as carts, shelves, etc., as described in further detail in reference to FIGS. 7A, 7B, and 8, for example. FIGS. 7A, 7B, and 8 depict various types of AGVs, such as an MSF-AGV 114 and cart AGVs 116.

A modular storage unit (also referred to simply as a storage unit) may be a container in which items are stored, for example, in high-density storage 304. In some instances, the modular storage unit may be transported by an MSF-AGV 114. For example, a modular storage unit may comprise a pallet or tote, which may be a holding vessel to support items designed to be picked up by an MSF-AGV 114 using its CHM 816. For example, a modular storage unit may include a pallet and a holding structure that supports items designed to be picked up by an AGV with forks or another carrying surface 820. In some implementations, a pallet may be stackable. In some implementations, a pallet may be attachable to a container to form a modular storage unit.

Figure 3A:
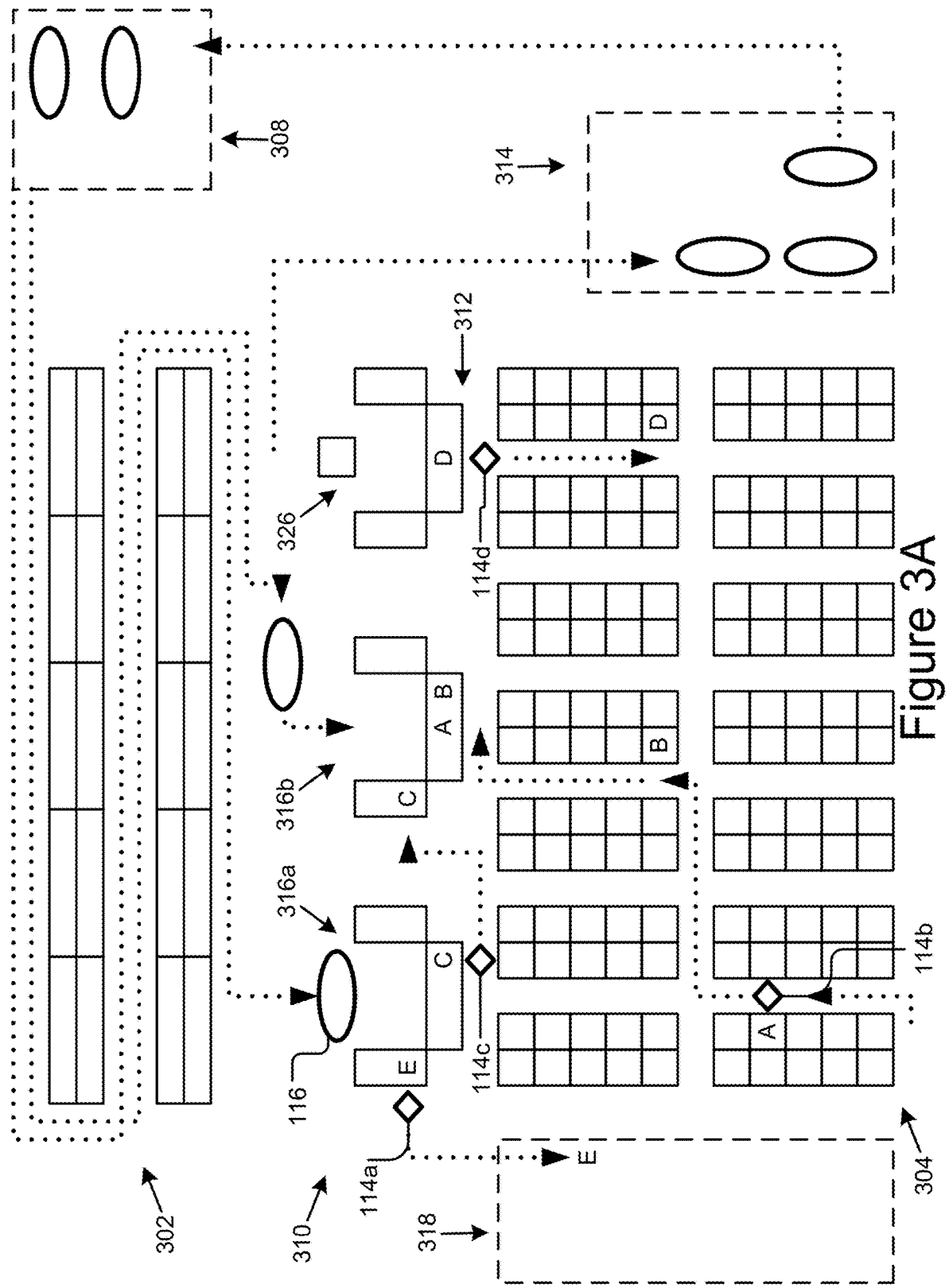
FIG. 3A is a schematic of an example configuration of a distribution facility layout.

A cart AGV 116 is an automated guided vehicle or robot configured to autonomously transport carton from a preparation or induction area 308 to a pick-to-cart area 302 of the distribution facility, a goods-to-person station, and/or finalizing area 314 (e.g., as described in reference to FIG. 3A). The cart AGV 116 may include a drive unit adapted to provide motive force to the cart AGV 116 and a guidance system adapted to locate the cart AGV 116 in the distribution facility. In some implementations, the cart AGV 116 is adapted to autonomously transport a carton holder (e.g., a cart or shelves) that is, in turn, adapted to hold cartons. Cartons may include, for instance, a box (e.g., a shipping box) adapted to hold items. For example, a cart AGV 116 may push/pull a cart holding cartons around a pick-to-cart area 302 and/or goods-to-person area 310 and may automatically stop at storage bays of the pick-to-cart area 302 where items to be picked are stored, so that a picker in the pick-to-cart area 302 can easily place items into one or more of the cartons. In some instances, the cart AGV 116 may transport the cart to a pick-cell station 316 to receive additional items into the cartons from high-density storage (e.g., from modular storage units in high-density storage, as described below). In some instances, the cart AGV 116 may move at walking speed next to, behind, or in front of a picker walking through the pick-to-cart area 302 of the distribution facility. Additional details of example cart AGVs 116 are shown and described in reference to FIGS. 7A and 7B.

An MSF-AGV 114a . . . 114n is an automated guided vehicle or robot that may be configured to autonomously transport items from a high-density storage area 304 of the distribution facility to a goods-to-person station (e.g., a pick-cell station 316 or cartless station 326), replenishment area 318, and/or finalizing area 314. The MSF-AGV 114 may include a drive unit adapted to provide motive force to the MSF-AGV 114, a guidance system adapted to locate the MSF-AGV 114 in the distribution facility, and a shelving unit, which may be adapted to hold modular storage units. The MSF-AGV 114 may include a container handling mechanism (CHM) 816 (e.g., as shown in FIG. 8) that retrieves items or modular storage units from storage shelves (e.g., in the high-density storage area), places items on an item holder (e.g., an AGV shelf) coupled with the MSF-AGV, and replaces items on storage shelves or at a goods-to-person station. In some implementations, an MSF-AGV 114 may autonomously retrieve modular storage unit(s) containing items to be picked in an order from the high-density storage area. For instance, the MSF-AGV 114 may transport the modular storage unit(s) to a pick-cell station 316, so that a picker at the pick-cell station 316 can pick items from the modular storage unit(s) and place them into cartons in a cart. For example, a cart AGV 116 may transport a carton to a bay in the pick-to-cart area 302 having a first item in an order, then to a pick-cell station 316 where a separate MSF-AGV 114 has delivered or will deliver a second item (e.g., in a modular storage unit) in the order, so that a picker can place the second item into the carton with the first item, and so on and so forth. The process may be repeated as necessary, depending on the number of items to be placed in the carton(s) of the pick-cell station 316. The system 100 may coordinate the timing, placement, and movement of the cartons, modular storage units, pick-cell station 316 workload, and AGVs to bring cartons and modular storage units having items corresponding to an order to the same pick-cell station 316 during the same time window, as described in further detail herein. Additional details of example MSF-AGVs 114 are described in reference to FIG. 8.

In some implementations, as described below, the MSF-AGV 114 may transport storage units from to a cartless goods-to-person station in which a picker may pick items from the storage units into cartons. In such implementations, the system 100 may coordinate transportation of cartons to the cartless station 326 (e.g., by a conveyor), building of cartons at the cartless station 326, or departure of the cartons from the cartless station 326 with the operations of the MSF-AGV 114 to bring items to the cartless station 326 at the appropriate time. In some implementations, the system 100 may instruct one or MSF-AGVs 114 to bring modular storage units holding items to be picked into a carton at a particular time and, when the items are at the cartless station 326, may issue an instruction to the cartless station 326 or picker at the cartless station 326 (e.g., via the picking system 108) to prepare (e.g., print or build) a carton to receive the picks.

The WMS 104 may, in some implementations, include one or more hardware and/or virtual servers or software routines storable in one or more non-transitory memory devices and executable by one or more processors to perform the operations, acts, and/or functionality described herein. The WMS 104 may be configured to store and maintain carton data 124 in the data store 120. The carton data 124 includes information about cartons and/or containers in the system, such as a unique identifier for each carton or container, a carton or container type, the zones or areas a carton will visit, the number of pick lines a carton proceeds through, and the priority for the carton. Some cartons may have a higher priority relative to other cartons and the system 100 may expedite handling of those cartons with higher priority relative to other cartons by the system 100. The carton data 124 may include a picklist defining the items the carton will contain. The WMS 104 may store data mapping items to the different pick zones (e.g., the pick-to-cart area 302, the high-density storage area 304, a particular modular storage unit, a particular location at a particular goods-to-person station, etc.). In some implementations, the WMS 104 may be configured to communicate the carton data 124 with the WES 102, the picking system 108, and/or dispatch system 106 in real time, in batches, as requested by these components, etc.

In some implementations, the system 100 may include a release logic engine 142, although it should be noted that the features and operations of the release logic engine 142 may be implemented on or distributed among other components of the system 100. The release logic engine 142 may include computer systems and/or logic that perform operations described herein. For instance, the release logic engine 142 may receive data describing capacity and performance of system resources, such as workstations that print cartons, cart AGVs that transport carts, goods-to-person stations (e.g., pick-cell stations 316 or cartless stations 326), picking system client devices, conveyors, etc., and may direct operations of the resources.

The release logic engine 142 may receive a trigger to release a batch of cartons for a cart (e.g., a cart may hold 30 cartons) and may, based on priority, pick location, replenishment, cycle times, affinity, etc., select the batch of cartons for the cart. The release logic engine 142 may instruct a workstation to print the batch of cartons (either as a batch or one by one) and release them to receive picks on the cart. The release logic engine 142 may also release cartons to goods-to-person stations (either using carts or without using carts) to balance workload in the fulfillment center. It should be noted that although many of the operations are described herein in reference to a robotic system, the release logic engine 142 may also instruct human pickers and other distribution facility/center associates to prepare the cartons, transport carts, etc., as described herein, for example, by transmitting data to picking computing devices of the human associates instructing the computing devices to display instructions for carton preparation.

In some implementations, the release logic engine 142 may implement one or more scoring algorithms for selecting the cartons that are assigned to a certain cart or cart AGV 116, a certain goods-to-person station, or workflows for various areas of the fulfillment center, etc. For instance, the release logic engine 142 may use item affinity (e.g., the frequency with which items are ordered together), cart travel distance, pick locations, etc., to select an efficient batch of cartons for a given cart, as described in further detail below.

In some implementations, the release logic engine 142 may manage priority of released and/or unreleased cartons, cartons that include picks of items that need to be replenished in a given area (e.g., in a bay, modular storage unit, etc.), and workload balancing among resources in the distribution facility. For instance, the release logic engine 142 may track a cut time by which a carton is assigned to be shipped and prepare the carton using the appropriate resources and at the appropriate time to prepare it by the cut time. Additionally or alternatively, the release logic engine 142 may determine workload, capacity, and performance of resources (e.g., carton preparation workstations, carts, cart AGVs, MSF-AGVs, goods-to-person stations, etc.) and use this data to balance workload, provide efficient operation, and manage priority cartons, as described in further detail below. Accordingly, the release logic engine 142 may react to the robotic system and how it is performing.

In some instances, the release logic engine 142 may track the performance data of resources and feed it back into the system to improve the accuracy of releases and other features of the system. For example, the release logic engine 142 may track pick time, travel time, etc., of carts and use the tracked time to adjust weights of the scoring algorithms for assigning cartons. For instance, if traveling to a new aisle takes proportionately more time than traveling to the end of the same aisle, the release logic engine 142 may adjust the scoring so that a pick in a new aisle affects the score more significantly than traveling to the end of an aisle.

The picking system 108 may, in some implementations, include one or more hardware and/or virtual servers or software routines storable in one or more non-transitory memory devices and executable by one or more processors to perform the operations, acts, and/or functionality described herein. The picking system 108 may receive pick confirmations, for example, from pickers or operators (e.g., using barcode scanners, NFC, RFID chips, or other sensors or input methods) working within a pick zone (e.g., a pick-to-cart area 302, goods-to-person station, etc.) confirming that picks for a given carton have been performed, as described in further detail below. An example picking system 108 may include an available pick-to-voice or a pick-to-light system. The picking system 108 may be configured to communicate the pick confirmation data with the WES 102, WMS 104, or other components of the system in real time, in batches, as requested by the components of the system, etc.

The picking system 108 may receive confirmatory input (e.g., pick confirmations) from pickers working within a pick zone. The confirmatory input confirms that all picks for a given carton have been completed. The picking system 108 transmits the confirmatory input to the WES 102. The confirmatory input may include the time stamp reflecting completion of the picks in the zone, a unique identifier identifying the picker (operator), a unique identifier identifying the pick zone, a unique identifier identifying the AGV, and/or a unique identifier identifying the carton (e.g. a carton number).

The data store 120 is an information source for storing and providing access to data. The data stored by the data store 120 may be organized and queried using various criteria including any type of data stored by it. The data store 120 may include data tables, databases, or other organized collections of data. An example of the types of data stored by the data store 120 may include, but is not limited to map data 122, AGV data 128, carton data 124, order data 126, modular storage unit data, etc. In some instances, the data store 120 may also include, conveying system attributes, picking data, picker attributes, sensor data, etc.

The data store 120 may be included in the WES 102, WMS 104, REX 132, or in another computing system and/or storage system distinct from but coupled to or accessible by the WES 102, WMS 104, REX 132, or other components of the system 100. The WES 102, picking system 108, REX 132, and/or dispatch system 106, for example, may store and maintain map data 122, order data 126, carton data 124, and AGV data 128. The data store 120 can include one or more non-transitory computer-readable mediums for storing the data. In some implementations, the data store 120 may store data associated with a database management system (DBMS) operable on a computing system. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

The map data 122 may include data reflecting the 2 or 3-dimensional layout of the facility including the location of modular storage units, picking areas, lanes, equipment 110, storage shelving units, items, AGVs, etc. Map data 122 may indicate the attributes of the distribution facility, including attributes of resources (e.g., one or more pick-to-cart areas 302, high-density storage areas 304, induction areas 308, finalizing areas 314, goods-to-person stations, replenishment areas 318, etc.). For example, attributes of zones may include the number, quantity, and location of shelving units or bays, modular storage units, items, guidance system locators or markers, etc.

The order data 126 includes data about picking including orders, items picked, items to be picked, picking performance, picker identities, pick confirmations, locations items are picked from, etc. Order data 126 may indicate the quantity and identity of items in orders, shipping addresses, order priority, progress of order fulfillment, number of cartons in an order, etc.

Item data 130 may describe items available for picking in a distribution facility. The item data 130 may include unique identifiers for these items, the item volume (e.g., the total amount picked in a given window (e.g., in an hour, day, etc.)), the item velocity (e.g., number of different times item picked in a given window (e.g., per hour, day etc.), the unique location of the items within the distribution facility (aisle, shelf, shelf position, etc.), other attributes of the item (e.g., size, description, weight, quantity of items in a package, color, etc.), item inventory, mapping of items of modular storage units, etc. In some implementations, the item data 130 may include the quantity of particular items a modular storage unit contains, the current location of a modular storage unit, a preferred storage location of items and/or modular storage units, a threshold inventory level of items to be satisfied before autonomously transporting the modular storage unit to a replenishment area 318 by an MSF-AGV 114 (e.g., to restock the items in the modular storage unit).

The AGV data 128 may describe the state of an AGV (operational state, health, location, battery life, storage capacity, items being carried, cartons, etc.), whether picker is assigned to it, etc.

The components of the system 100 may be coupled to exchange data via wireless and/or wired data connections. The connections may be made via direct data connections and/or a computer network. The computer network may comprise any number of networks and/or types of networks, such as wide area networks, local area networks, virtual private networks, cellular networks, close or micro proximity networks (e.g., Bluetooth, NFC, etc.), etc. In some implementations, one or more of these components may be coupled via a data communications bus.

Figure 2A:
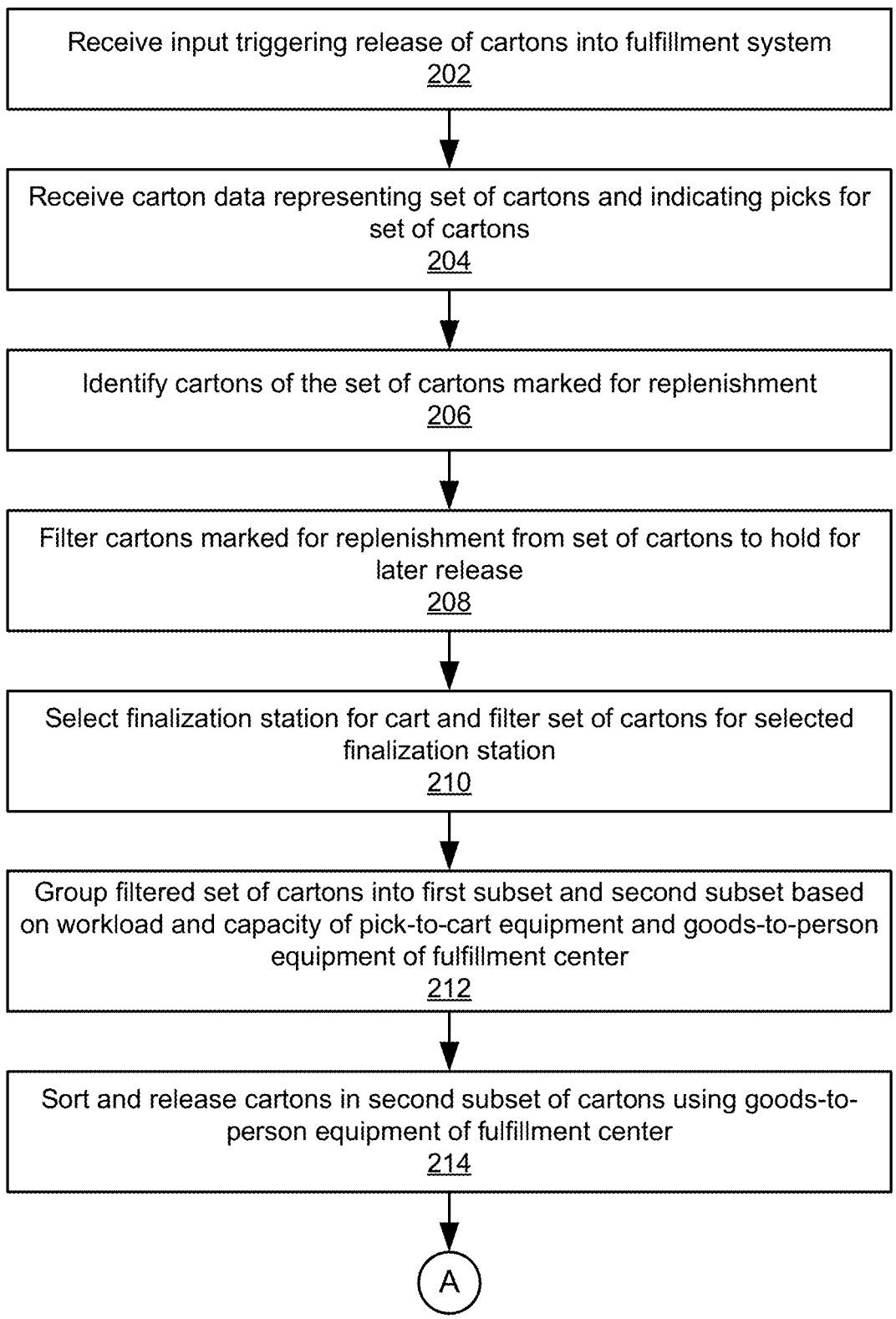
FIGS. 2A and 2B are a flowchart of an example method for carton release.
Figure 2B:
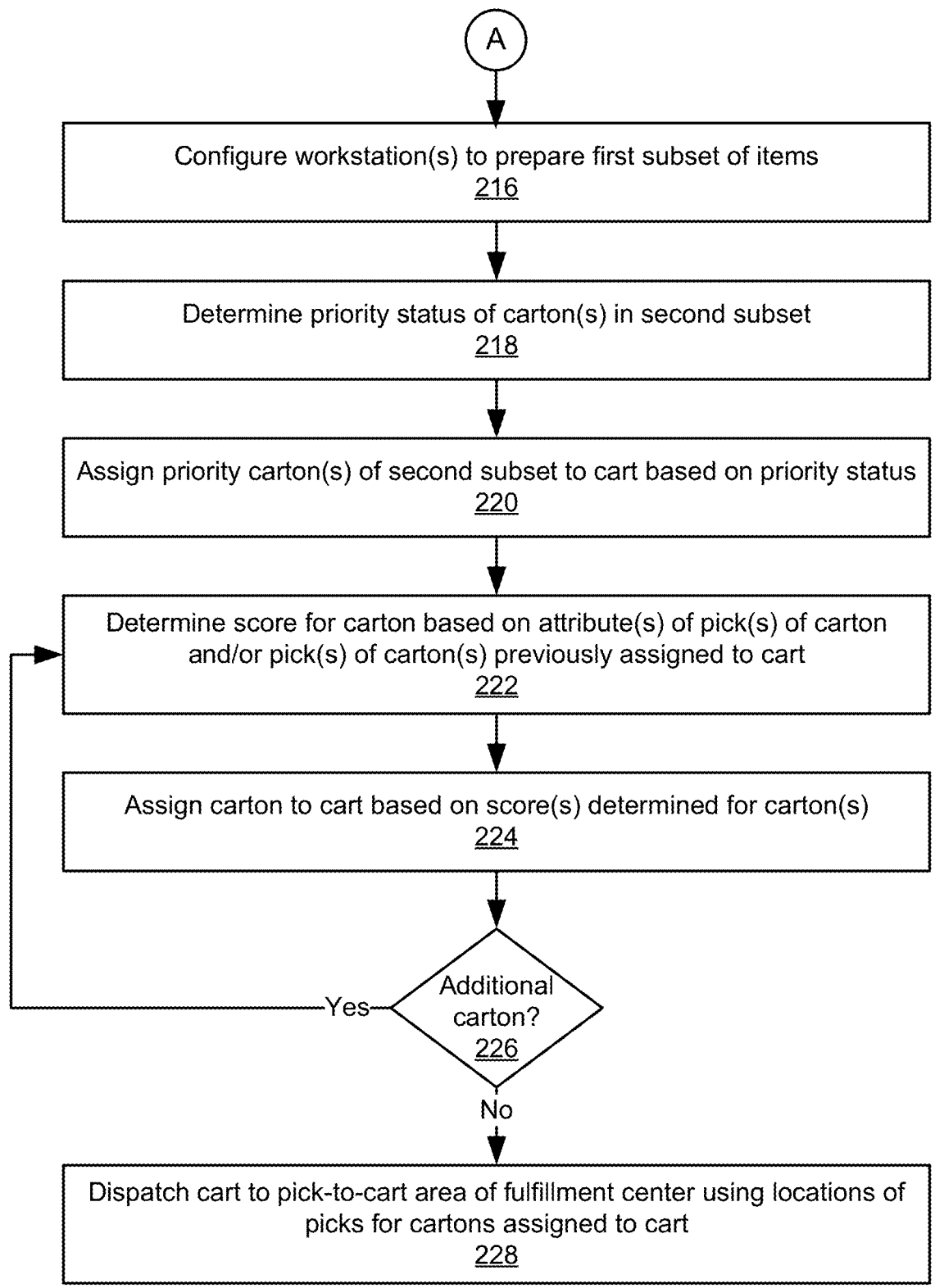

FIGS. 2A and 2B are a flowchart of an example method for intelligent carton release. The example method may consider pick locations, inventory levels, cut times, SKU affinity, pick-to-cart locations, etc., to determine an optimal set of cartons to be assigned to a cart (and/or locations for the cartons on a cart) or, in some instances, a goods-to-person station. The selected set of cartons may then be inducted into the system by releasing the carton data into one or more workflows to cause the cartons to receive picks and be shipped, for example, the method may release the cartons to a workstation (e.g., including a Packsize® machine), which may prepare the cartons to be loaded onto a cart. The cart may then be transported (e.g., by a cart AGV 116) through the distribution facility and receive picks of items into the cartons on the cart.

At 202, the release logic engine 142 may receive an input triggering a release of cartons into the fulfillment system. For instance, in response to a trigger, (e.g., a button press, arrival of a carton, a low-workload threshold being satisfied, etc.), the release logic engine 142 may receive or retrieve carton data or otherwise analyze available cartons that can be selected for an induction release.

At 204, the release logic engine 142 may receive carton data representing a set of cartons. The carton data may indicate one or more picks for each carton and/or other carton attributes, such as a delivery address, carton type (e.g., envelope, carton shape, carton size, etc.), carton priority, identification of delivery vehicle assignment, cut time (e.g., a time by which the carton is to leave the distribution facility), associated cartons (e.g., in a common order or delivery address), etc. The carton data may be included in order data describing orders to be fulfilled at the distribution facility. In some implementations, the WMS 104 may break orders into one or more cartons, determine storage and/or pick locations of the one or more cartons, and/or determine carton data based on order data, etc.

At 206, the release logic engine 142 may identify any cartons of the set of cartons marked for replenishment and, at 208, the release logic engine 142 may filter the cartons marked for replenishment from the set of cartons and hold them for a later induction release. For instance, the release logic engine 142 may filter out cartons that have picks with replenishment holds. If there is not enough inventory in the distribution facility and/or in a given area of the distribution facility for a pick of an item, the release logic engine 142 may remove cartons with picks for that item from the pool of cartons that cartons can be released. In some implementations, the release logic engine 142 may divide picks of a held carton (e.g., after a threshold number of release cycles or in response to one or more picks having a threshold priority status) into multiple cartons, so that a portion of the picks may be fulfilled while waiting for replenishment of the out-of-stock item.

In some implementations, at 210, the release logic engine 142 may select a finalization station (of a finalization area 314) for a cart and/or carton and filter the set of cartons for the selected finalization station. For instance, the release logic engine 142 may select a finalization station for a carton or cart based on a time until a cut time, an association with a particular delivery vehicle, or a cut time, etc. For example, if a carton is in danger of missing a cut time (e.g., with a high priority level), the release logic engine 142 may be filtered or assigned it to a finalization station with a matching cut time (e.g., a finalization station that would finalize the carton by the cut time). From a different perspective, the release logic engine 142 may select a finalization station and filter/select a set of cartons that may be fulfilled using that finalization station, which filtered/selected set may be used for subsequent operations described below, depending on the implementation. In some instances, if there are no cartons or carts that are near their cut time, the release logic engine 142 may select a finalization station using a round robin selection mechanism, although other suitable selection mechanisms may be used/be applicable. In some instances, the release logic engine 142 may select a finalization station by grouping cartons with the same destination (finalization station, delivery vehicle, address, etc.) together to be finalized at a common finalization station.

At 212, the release logic engine 142 may group the set of cartons (e.g., in some instances, those filtered at 210) into a first subset and a second subset based on workload and/or capacity of pick-to-cart equipment and goods-to-person equipment of the fulfillment center. The cartons may be grouped based on whether they are assigned to be picked using the pick-to-cart equipment, goods-to-person equipment, or both. Similarly, in some instances, the release logic engine 142 may also differentiate between cartons that are assigned to be picked using carts (whether at the pick-to-cart area 302 or a pick-cell station 316) or cartless (e.g., at a cartless goods-to-person station).

In some implementations, the cartons may be separated into groups based on areas that the carton needs to visit (e.g., goods-to-person area 310, pick-to-cart area 302, both areas) based on status codes assigned to the cartons and/or based on the equipment used to pick items to the cartons (e.g., cart or cartless). For example, the release logic engine 142 may determine a first subset of cartons of the set of cartons that is assigned to be picked in the pick-to-cart area 302 of the fulfillment center based on status codes associated with the set of cartons. Similarly, the release logic engine 142 may determine a second subset of cartons of the set of cartons that is assigned to be picked in a goods-to-person 310 area of the fulfillment center based on status codes associated with the set of cartons. In some implementations, the release logic engine 142 may additionally or alternatively determine whether to pick cartons using a cart or using a cartless station 326. For instance, the second subset may include specifically those cartons for a cartless station 326 or may include any carton that includes a pick at a goods-to-person station.

Figure 4A:
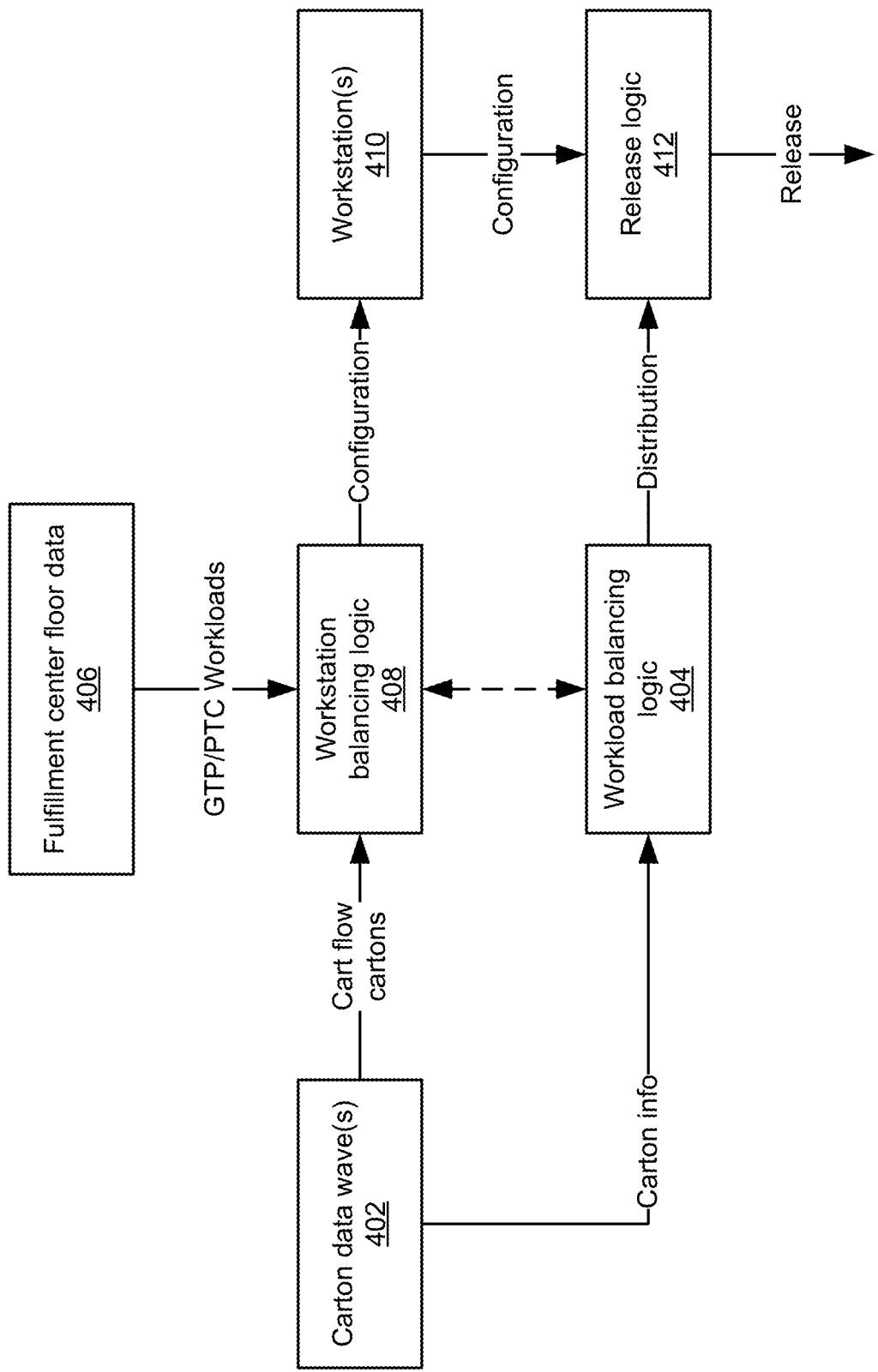
FIG. 4A is an example data-flow diagram illustrating the interaction between workstation logic, workload balancing logic, and release logic.
Figure 4B:
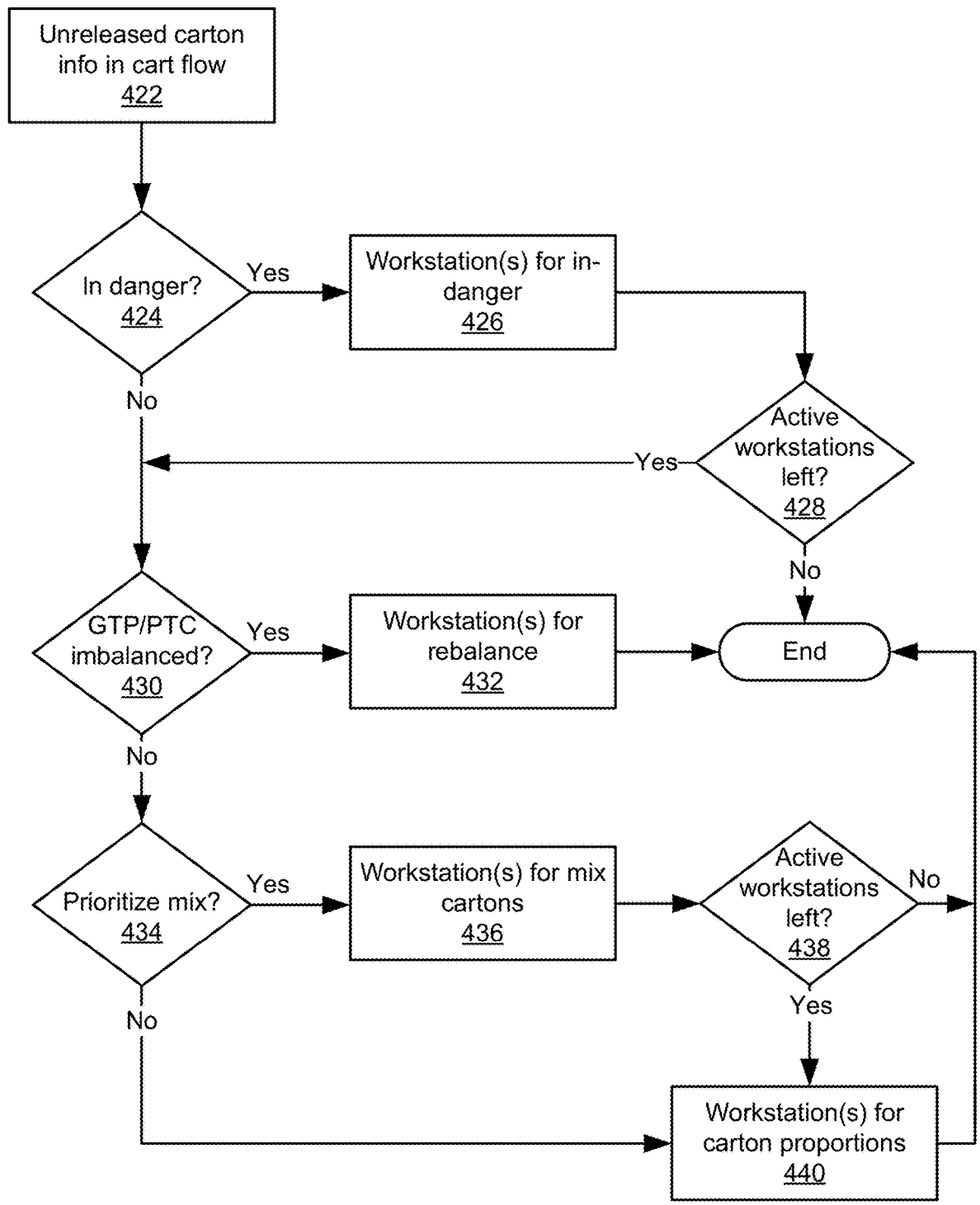
FIG. 4B is a flowchart of an example method for workstation logic.
Figure 4C:
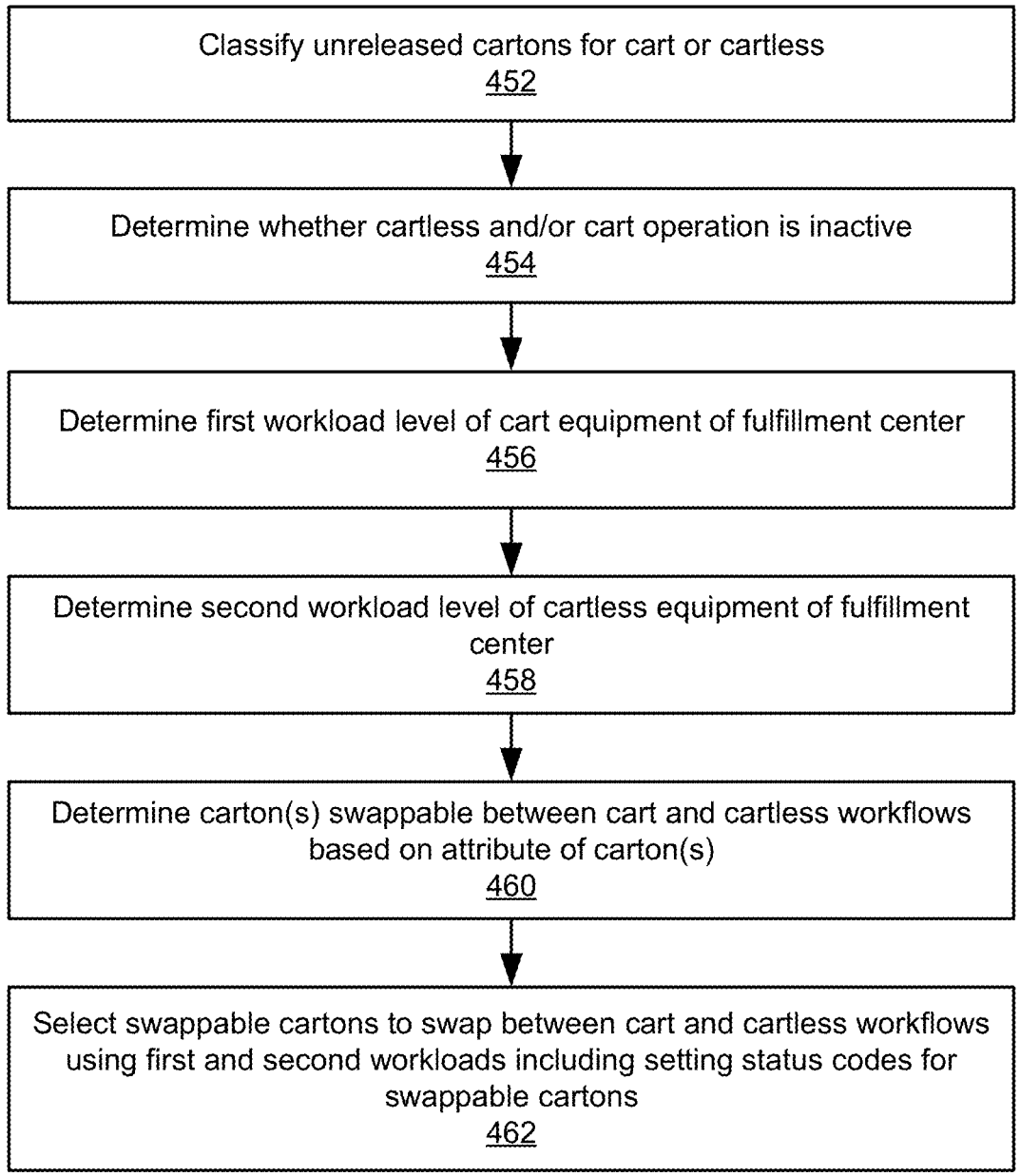
FIG. 4C is a flowchart of an example method for illustrating workload balancing logic for pick-to-cart and goods-to-person equipment.
Figure 4D:
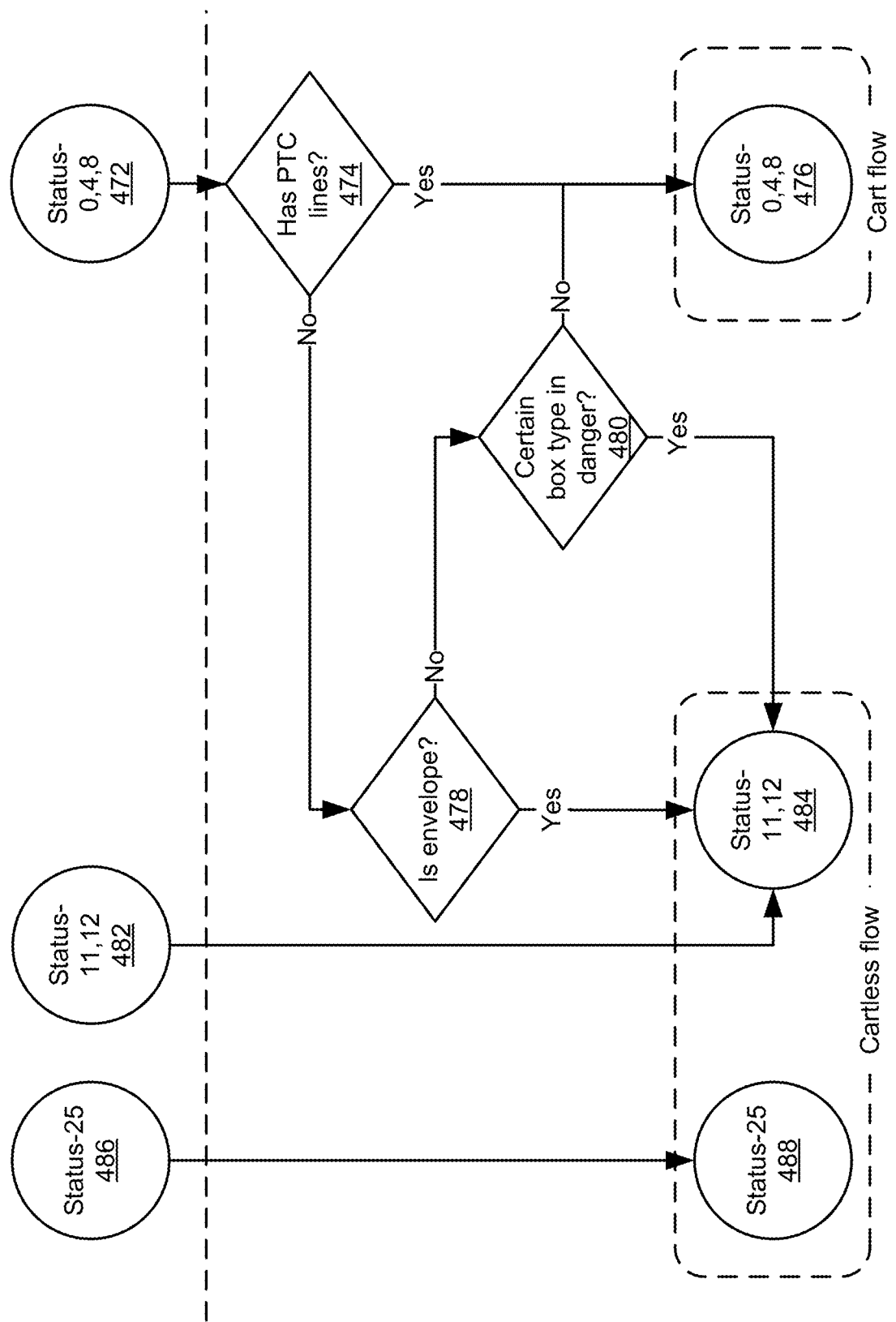
FIG. 4D is a flowchart of an example method for classifying cartons for workload balancing for pick-to-cart and goods-to-person equipment.

In some implementations, as described in the example method of FIGS. 4A, 4C, and 4D, the release logic engine 142 may assign status codes or otherwise group the cartons thereby indicating workflows and areas of the fulfillment center to use to fulfill the cartons. For example, the release logic engine 142 may assign each of the cartons to one of the first subset of cartons and the second subset of cartons including determining a first workload level of the pick-to-cart area 302 of the fulfillment center, determining a second workload level of the goods-to-person area 310 of the fulfillment center, and setting a status code for that carton based on the first workload and the second workload.

As described in further detail elsewhere herein, the pick-to-cart equipment, for the first subset, may include a cart (and, in some instances, a cart AGV 116) to transport cartons through a pick-to-cart area 302. While the pick-to-cart area 302 may have a slower cycle time (e.g., 30 minutes to 2 hours to complete picks for a set of cartons on a cart) than a goods-to-person station, it has a higher throughput because multiple cartons can receive picks to a single cart and multiple carts can traverse the pick-to-cart area 302 at the same time.

In some implementations, a cart may include cartons with picks in both the pick-to-cart area 302 and the goods-to-person area 310, for example, as described below. For instance, the cartons may be grouped into those that include visits to both a pick-to-cart area 302 and a pick-cell station 316. Similarly, a cart may include both cartons with picks in the pick-to-cart area 302 and the goods-to-person area 310.

At 214, the release logic engine 142 may sort and release cartons in the second subset of cartons using goods-to-person equipment of the fulfillment center. Goods-to-person equipment, for the second subset, may include a goods-to-person station, such as a pick-cell station 316 or cartless station 326, an MSF-AGV 114, or other components. Cartons may be grouped together to be picked using goods-to-person equipment, for example, as described in the examples of FIGS. 4A-4D. For instance, the release logic engine 142 may induct one or more of the second subset of cartons to be picked using the goods-to-person equipment, as described in FIG. 2C.

In some implementations, at 216, the release logic engine 142 may configure workstation(s) to prepare the first subset of items for the pick-to-cart area 302. For instance, the release logic engine 142 may configure one or more workstations to build and/or print cartons for a cart based on whether the cart and/or cartons are assigned to be picked in the pick-to-cart area 302, the goods-to-person area 310, or both areas. Configuring workstations is described in further detail below in reference to FIGS. 4A and 4B.

In some implementations, at 218, the release logic engine 142 may determine the priority status of carton(s) in the second subset grouped for fulfillment using a cart. For instance, if a carton is within a threshold time to a defined endangered cut time (e.g., a time at which a delivery vehicle is scheduled to depart the distribution facility), the release logic engine 142 may prioritize the carton over another carton that has a later cut time. In some instances, a carton's priority status may be defined as, for example, non-priority, priority, or immediate release based on the time until cut time and, potentially, projected time to prepare the carton and transport it to the finalization area 314.

In some implementations, the release logic engine 142 may determine priority based on a threshold time until cut time, a relative ranking in comparison to other cartons indicating which cartons are more or less in danger of missing cut time, or other factors. The release logic engine 142 may continuously or periodically monitor and adjust the priority of cartons, so that their priority status may change over time. Accordingly, by releasing priority cartons first, the release logic engine 142 may minimize the time and quantity of cartons at risk of missing cut time thereby allowing the entire system to function more efficiently, for example, by allowing selection of cartons for a cart using more efficient methods than by solely priority, as described below.

At 220, the release logic engine 142 may assign priority carton(s) of the second subset to a particular cart based on the priority status, for example, priority cartons may be assigned before non-priority cartons. In some instances, the priority cartons may be ranked, so that highest priority cartons are assigned first. In some instances, the release logic engine 142 may estimate a time that a carton would take to arrive at the finalization area 314, for example, based on a distance a cart would travel, average or maximum time typically spent fulfilling cartons using a cart, number of picks, and/or past performance of pick-to-cart equipment. The release logic engine 142 may then assign a priority carton that, using the cart, pick-to-cart area 302, and/or goods-to-person area, would allow the priority carton to avoid missing a cut time.

In some implementations, the release logic engine 142 may assign multiple priority cartons to the cart, for example, based on their priority status and/or their determined scores. Subsequently assigned cartons (whether priority or non-priority) may be assigned using scoring algorithms, as described below.

It should be noted that priority cartons that have a threshold priority status, such as those marked for immediate release, may be assigned for immediate release using a goods-to-person station or another method for allowing the picks of the carton to be performed quickly. For instance, immediate release cartons may be pulled from a cart flow and picked manually.

At 222, the release logic engine 142 may determine a score for a carton based on attribute(s) of pick(s) of the carton and/or pick(s) of carton(s) previously assigned to the cart. In some implementations, a score for a particular carton may be computed based on a location of a pick of the carton in reference to one or more previous picks of the same or other cartons already assigned to the cart. For instance, the score may be determined based on a first location of a first pick for a particular carton and a second location of a second pick for a carton already assigned to the cart (e.g., a priority carton assigned at 220). For example, the score may be determined based on a proximity of and/or distance traveled from the first location to the second location.

In some implementations, a score for a pick may be based on its attributes, such as its location, size, affinity, etc., relative to other picks, such as those of cartons already assigned to the carton. For example, the release logic engine 142 may determine the score based on SKU affinity, aisle selection, a number of stops made by a cart, a depth that the cart would have to travel down an aisle to make a pick, or other factors. As such, the release logic engine 142 may maximize efficiency and utilization of processing and equipment. For instance, the scoring algorithm may minimize cycle time of a cart and/or picker, energy used by a cart AGV 116, processing cycles used by an AGV guidance system or REX 132, or other resources. Example operations for computing scores are described in further detail in reference to FIGS. 5A-5F.

In some implementations, such as where a carton has multiple picks, the score for the carton may be determined for each pick and combined to form a composite score for the carton. For example, a first score may be determined for a first pick of a carton relative to previously assigned picks (e.g., of previously assigned cartons), a second score may be determined for a second pick of the carton relative to previously assigned picks (e.g., of other assigned cartons and/or of the first pick). The scores for the first and second picks may be computed by combining them to form a composite score for the carton.

In some implementations, a carton may have picks in both the pick-to-cart area 302 and the goods-to-person area 310 of the distribution facility. In such instances, a second score may be determined for the carton for the goods-to-person area 310, for example, based on SKU affinity, timing, etc., for example, as described in further detail in the example of FIG. 2C. For these mixed cartons, the pick-to-cart score and the goods-to-person score may be combined, such as by summing, normalizing, and/or otherwise algorithmically combining the scores for the carton.

At 224, the release logic engine 142 may assign a carton to cart based on the score(s) determined for the carton(s). For instance, a carton may be selected based on scoring multiple cartons, ranking the cartons by the scores, and selecting the carton with the highest or most favorable score.

In some implementations, the release logic engine 142 may iteratively add cartons to the cart based on cartons already assigned to the cart, so that the scores are based on the cartons already assigned to the cart, whether priority cartons or non-priority. For instance, at 226, the release logic engine 142 may determine whether there is an additional carton to be added to the cart (e.g., based on available cartons or cart capacity) and may recalculate the scores for the cartons based on, for example, the picks of the additional carton(s) and the picks of the cartons already assigned to the cart. Once the scores are recalculated, the release logic engine 142 may assign the next carton with the highest score to the cart. It should be noted that, in some implementations, in order to reduce computation time, the release logic engine 142 may select multiple cartons with the highest scores each time the scores are recalculated rather than recalculating the scores every time a carton is assigned.

In some implementations, once the carton(s) are assigned to the cart, the release logic engine 142 may induct the cartons including, for example, dispatching the cart to the pick-to-cart area 302 (and/or goods-to-person area 310, depending on the implementation) of the fulfillment center using the locations of the picks for the cartons assigned to cart at 228.

In some implementations, dispatching the cart to the pick-to-cart area 302 of the fulfillment center may include transmitting an instruction to a cart AGV 116 to couple with the cart and then to transport the cart from an induction area 308 to pick locations, a pick-cell station 316, and then the finalization area 314. For instance, a cart AGV 116 may include a drive unit providing motive force to propel the cart AGV, a controller receiving the instruction and controlling the cart AGV 116, a guidance system coupled with the controller and processing navigation markers to locate the cart AGV 116 within the fulfillment center, and a power source coupled to the controller and the drive unit, for example, as described in reference to FIGS. 8A and 8B.

In some implementations inducting a carton and/or dispatching a cart may include printing cartons at a workstation, as described below.

Figure 2C:
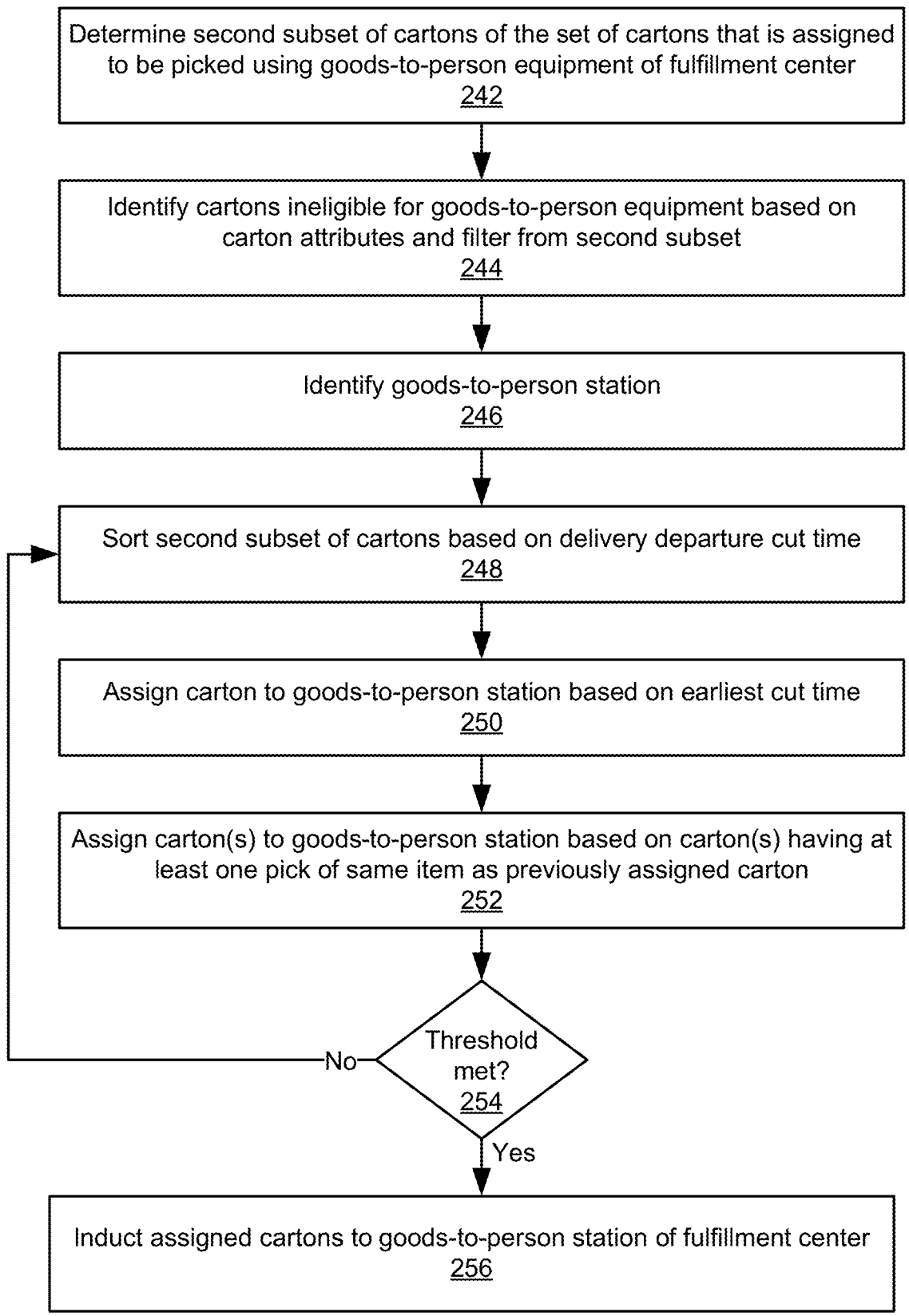
FIG. 2C is a flowchart of an example method for carton release using goods-to-person equipment.

FIG. 2C is a flowchart of an example method for intelligent carton release using goods-to-person equipment, such as a goods-to-person station and, in some instances, an MSF-AGV 114. Some implementations of the method described in FIG. 2C may apply specifically to cartless stations 326 where cartons may be built and filled. For example, the release logic engine 142 may use the method to send a stream of cartons to a goods-to-person station at which items may be picked and placed into the cartons in consideration of inventory levels, cut times, SKU affinity, or other factors. The method allows the release logic engine 142 to manage replenishment holds, cut time prioritization (e.g., as described above), and pick collisions, for example, where SKUs delivered to the goods-to-person station are used in picks to multiple cartons and, in some instances, to avoid the same SKU (e.g., in the same modular storage unit or pallet) being scheduled to be delivered to multiple goods-to-person stations at the same time.

At 242, the release logic engine 142 may determine the second subset of cartons of the set of cartons that is assigned to be picked using the goods-to-person equipment or area 310 of the fulfillment center, for example, based on the status codes of the cartons identifying the areas in which the picks for the cartons are located. Identifying cartons for a cartless station 326 or a pick-cell station 316 are described below, for example, in reference to FIG. 4D.

At 244, the release logic engine 142 may identify cartons ineligible for fulfillment using goods-to-person equipment (e.g., a pick-cell station 316 or a cartless station 326) based on carton attributes and filter them from the second subset. For instance, the release logic engine 142 may filter out cartons that cannot be picked at a pick-cell station 316 based on their carton type, such as an envelope, small box, large box, etc., because the carton type cannot be transported by a cart physically or due to a defined setting. In some implementations, such as when the method in FIG. 2C is determining cartons for cartless fulfillment, the release logic engine 142 may filter out cartons that cannot be picked at a cartless station 326, for example, because it includes picks in a pick-to-cart area 302.

At 246, the release logic engine 142 may identify a goods-to-person station for which to assign one or more cartons. For instance, a goods-to-person station may be selected based on available picking capacity, current workload, balancing, presence of certain modular storage units or items at the station, or other factors.

As described in further detail in reference to FIG. 3A, a goods-to-person station may be a station or area to which items are brought and at which the items are picked into a carton. For example, as described below, modular storage units or pallets holding items may be transported from a storage area to a goods-to-person station at which items are removed from the modular storage unit and placed into a shipping carton. In some implementations, the goods-to-person station may be configured to interact with carts carrying cartons, such as a pick-cell station 316 described below. In some implementations, the goods-to-person station may be configured to print and/or build cartons (or receive the cartons by another means than a cart), in which case the goods-to-person station may be referred to as a cartless station 326. For instance, a cartless station 326 may include a label printer and a supply of various sized boxes, so that when an item is brought to the cartless station 326 (e.g., in a modular storage unit by an MSF-AGV 114), the carton corresponding to that item/pick can be built and/or its label printed.

At 248, the release logic engine 142 may sort the second subset of cartons for the goods-to-person area 310 based on delivery departure cut time. For instance, as described above, a carton may have an associated priority status that may be based on how close the current time is to the cut time for the carton.

At 250, the release logic engine 142 may assign a carton to the goods-to-person station based on a delivery departure cut time, priority status, and/or an attribute of the goods-to-person station. For instance, a carton with the earliest cut time may be assigned to a goods-to-person station the goods-to-person station having the capacity and/or performance to fill the carton prior to the cut time.

At 252, the release logic engine 142 may assign carton(s) to the goods-to-person station based on the carton(s) having at least one pick of the same item (e.g., the same type of item or SKU) as a previously assigned carton (e.g., a carton assigned at 250). Additionally or alternatively, cartons may be assigned based on having picks of items stored together in the same modular storage unit as a previously assigned carton.

In some implementations, the release logic engine 142 may determine a score for cartons and assign the cartons to the goods-to-person station based on the score. For example, a score for a carton in the goods-to-person area 310 may be determined based on one or more factors, such as SKU affinity, storage unit affinity, and/or a demand factor for a particular item or modular storage unit. For instance, the release logic engine 142 may weight, combine, and/or normalize a SKU affinity, storage unit affinity, and/or demand factor to determine the score for a certain carton. Depending on the implementation, each factor may be weighted and combined into a single score for the carton.

A SKU affinity may be determined based on the quantity of picks of the current carton that are for the same SKU as those already assigned to the goods-to-person station within a threshold amount of time, cartons, or picks. For instance, a carton having two picks in common with a previously assigned carton would have a higher SKU affinity than a carton having one or zero picks in common with a previously assigned carton. The higher score represents the value of having one storage unit containing the common item to be delivered to the goods-to-person station for the common picks rather than using multiple storage units.

A storage unit affinity may be determined based on a quantity of picks of the current carton that are for items stored together in the same storage unit (e.g., modular storage unit, pallet, shelf, etc.) with those of previously assigned cartons. For example, a storage unit may have multiple slots carrying different items or different items may be stored together in a single compartment of the storage unit. The release logic engine 142 may determine the storage unit affinity based on whether a pick of the current carton is for an item in the same storage unit as a picked/to-be-picked item of a previously assigned carton. Similar to the SKU affinity, the storage unit affinity may be higher with more common picks and/or fewer additional storage units that would be retrieved for the current carton over previously assigned cartons.

A demand factor may be for a pallet or storage unit that is called for in multiple locations, such as goods-to-person stations or on multiple carts that are assigned to travel to one or more pick-cell stations 316. The release logic engine 142 may identify, based on other scheduling in the fulfillment center, locations and times where the modular storage unit having an item corresponding to a pick for the carton. If there are conflicts in the timing with when the carton would be filled at the goods-to-person station, the release logic engine 142 may use the demand factor to reduce the likelihood (e.g., by reducing the score) that the carton is selected. In contrast, if the demand for the item or its storage unit is low, the demand factor may increase the score (or not decrease the score) to incentivize the carton with picks from low demand storage units to be picked.

At 254, the release logic engine 142 may determine whether a threshold quantity of cartons or picks is satisfied for the goods-to-person station and, if not, may repeat the process from 248 for a subsequent carton for the station. For instance, the release logic engine 142 may repeat this process assigning cartons until there are no additional cartons that can be assigned to be picked at the goods-to-person area 310 or a maximum workload of the goods-to-person area 310 or station has been met. For instance, a goods-to-person station may have a maximum number of cartons, picks, or storage units that it can handle in a defined time period.

At 256, the release logic engine 142 may induct assigned cartons to the goods-to-person station of the fulfillment center, for example, by releasing the cartons including sending the cartons to the station, sending instructions to build the carton to the station (e.g., to a picking computing device), and/or sending the items to the station. For example, the release logic engine 142 may transmit instructions to an MSF-AGV 114 (e.g., via the REX 132) to transport a modular storage unit holding the item to the goods-to-person station. In some instances, the release logic engine 142 may issue instructions to a picking client device at the goods-to-person station instructing a picker or device to build one or more cartons and perform the picks.

It should be noted that the method described in reference to FIG. 2C may be repeated for one or more additional goods-to-person stations.

FIG. 3A is a schematic of an example configuration of a distribution facility layout, which may be an operating environment of one or more MSF-AGVs 114 and/or cart AGVs 116. It should be noted that the distribution facility may also be referred to as a fulfillment center herein and may represent a building or group of buildings in which items may be picked into cartons and/or from which cartons are shipped to fulfill orders. In some instances, some or all of the operating environment may be divided into one or more zones or areas, as described above. It should be understood that various distribution facilities may include different picking zones having different stocking infrastructure and picking configurations. For instance, high-volume and/or velocity items (e.g., items appearing above a defined threshold of frequency in orders) may be stored in a pick-to-cart area 302 and be available for immediate picking, and relatively moderate and/or low-volume and/or velocity items may be stored in high-density storage area 304 on modular storage units which may be retrieved by MSF-AGVs 114 for an upcoming pick.

The layout depicted in FIG. 3A includes various areas: an induction area 308, a pick-to-cart area 302, a goods-to-person area 310, a goods-to-person staging area 312, a high-density storage area 304, a finalizing or finalization area 314, and a freight or modular storage unit elevator (not shown) for multi-level access when the layout includes multiple floors. In some cases, the layout may include multiple levels of mezzanine with one or more of the different zones/areas. In some implementation, cart AGVs 116 are staged in the induction area 308 and are set up for picking sessions. In some implementations, cartons are assembled, labeled with unique scannable visual identifiers to associate them with specific orders, and are placed on the supports (e.g., cart shelves) of the cart AGVs 116 in the induction area 308. In some implementations, an induction area 308 may include one or more workstations for creating and/or printing one or more cartons, as described above.

The pick-to-cart area 302 is configured for high-velocity and/or volume items and advantageously reduces capital associated to handle this type of item class. Inventory may be stored in high-volume storage in containers or pallets, for example. High-velocity items may be divided into pick zones or aisles and each zone or aisle may include a plurality of bays (e.g., 4, 5, 6+), which may be balanced by the SKU routing engine and/or WES 102 based on demand by the SKU routing engine. Cart AGVs 116 may be scheduled by the REX 132 to autonomously visit these zones, and pickers accompanying the cart AGVs 116 may be guided by the picking hardware (e.g., pick-to-voice and/or pick-to-light) controlled by the WES 102. In an example, a cart AGV 116 is instructed by the REX 132 to stop directly in front of a bay location. The cart AGV 116 may self-locate using a guidance system. For example, the guidance system may include guidance system locators or markers, such as guide tape (magnetic, colored, etc.), laser target navigation, inertial navigation, vision guidance, geolocation, QR codes on the floor of the order fulfillment center, RFID (radio frequency identification) tags, beacons, etc., that can be used to locate and navigate AGVs in the order fulfillment center. Further, the AGVs may include guidance system components configured to read the guidance system locators, such as a QR code reader, wireless radio, etc.

After the picker picks the item and confirms the pick with the picking hardware, the cart AGV 116 autonomously moves to the next sequential bay until the picks are complete. As shown in FIG. 3A, a cart AGV 116 has the capability to bypass zones, bays, shelves, etc., without picks.

In some implementations, the goods-to-person area 310 may include pick-cell stations 316a and 316b situated along path(s) via which the cart AGVs 116 are routed. In some implementations, the goods-to-person area 310 may include one or more cartless stations 326 in which cartons are built and/or items are picked to cartons, for example, modular storage units may be brought to cartless station 326, as described above. Although the goods-to-person stations are shown positioned in a row, they may located anywhere in the distribution facility. For instance, pick-cell station(s) 316 may be located between the pick-to-cart area 302 and the high-density storage area 304 and the cartless station(s) 326 may be located near a conveyor, the high-density storage area 304, the finalization area 314, or another location in the distribution facility.

In some instances, a cartless station 326 may have equipment for building and/or printing cartons and/or their labels. In some implementations, a cartless station 326 may include or be adjacent to a conveyor or other mechanism for sending cartons to the cartless station 326 or receiving picked cartons from the cartless station 326. In some instances, a pick-cell station 316 may serve as a goods-to-person station 326, for example, when it does not receive carts.

In FIG. 3A, the pick-cell stations 316 are situated opposing a portion of the pick-to-cart area 302 and the cart AGVs 116 may be routed to visit one or more of these pick-cell stations 316 depending on the items that are assigned to be picked and placed in the cartons of these cart AGVs 116. In the case that in given cart AGV 116 does not include any items from the goods-to-person area 310, it may bypass it entirely and proceed to the finalizing area 314.

In some implementations, for a given picking session, the REX 132 may establish a single line picking configuration in which the picker and the cart travel through an inventory pick path along a single line until the picks are fulfilled. In further implementations, based on demand, a fast-moving area may be established by the REX 132 that includes multiple routes: a higher speed line that includes single line picking for low-demand items and another area for high demand items. This combination can advantageously balance daily labor.

The layout may also include a replenishment area 318 in which modular storage units are replenished with items. For instance, item inventory in a given modular storage unit may be replenished by an MSF-AGV 114 that picks the modular storage unit from static shelves and transports them to the replenishment area 318 where a case may be opened and items from the case placed directly into the modular storage units. One or more items (whether of the same type of item or different types) can be placed in a given modular storage unit. In some cases, the modular storage unit may be replenished while it is in the static shelf. Having multiple options (manual or AGV) for replenishment has more flexibility to adjust to resource allocation and schedule. Additionally or alternatively, the MSF-AGV 114 can swap out the modular storage unit with another containing the same SKUs which has been prepared ahead of time and staged for that purpose.

In some implementations, the REX 132 may instruct MSF-AGVs 114 to replenish and distribute modular storage units in different locations of the high-density storage area 304 based on order history. In these implementations, items with high order frequency orders may be distributed in more locations than items with lower order frequency. The WES 102 may maintain a moving minimum based on order quantity minimizing the need to use inventory from two locations to fulfill an order, and the REX 132 may schedule the AGVs accordingly.

The modular storage units storing items may be moved by MSF-AGVs 114 from high-density storage area 304 into a staging area 312 and staged for movement into a goods-to-person station for an upcoming pick. In some implementations, the storage units of faster-moving items may be moved directed to a pick cell 382 in a given pick-cell station 316 or cartless station 326 (e.g., a cartless station 326 may also include pick cells 382).

In further implementations, the REX 132 may instruct an MSF-AGV 114 to transfer a modular storage unit between cells of a pick-cell station 316, or between goods-to-person stations 316 or 326 without having to expend the time to return the modular storage unit to the high-density storage area 304.

FIG. 3A also illustrates example paths of AGVs through the order fulfillment center. The paths are represented by dotted lines, cart AGVs 116 are represented by ovals, and MSF-AGVs 114a . . . 114d are represented by diamonds.

Example cart AGV paths are illustrated in FIG. 3A, for example, a cart AGV 116 may navigate from an induction area 308 on a path through the pick-to-cart area 302 and then to one or more pick-cell stations 316. Once the picks for the cart AGV 116 have been completed, it may navigate to a finalizing area 314 where cartons are prepared for shipment, for example. In some implementations, the finalizing/finalization area 314 may include one or more carton removal mechanisms, as described above, and conveyors or other mechanisms for conveying cartons away from the carton removal mechanism(s). Once the cartons have been removed from the cart AGV 116, the cart AGV 116 may return to the induction area 308 to start through the process again.

Another implementation of a path for a cart AGV 116 is illustrated in, and described in reference to, FIGS. 5C-5F.

Example MSF-AGV paths are also illustrated in FIG. 3A, for example, an MSF-AGV 114a may transport a modular storage unit E from a first pick-cell station 316a to a replenishment area 318 for replenishment. An MSF-AGV 114b may retrieve a first modular storage unit A from a first location, navigate to a second location, retrieve a second modular storage unit B, and transport both the first and second modular storage units A and B to a pick-cell station 316b. An MSF-AGV 114c may retrieve a modular storage unit C from a first pick-cell station 316a and transport it to a second pick-cell station 316b. An MSF-AGV 114d may retrieve a modular storage unit D and transport it back to the high-density storage area 304. It should be understood that these paths and implementations are provided as examples and that other combinations are possible and contemplated herein. For example, one or more MSF-AGVs 114 may perform some or all of the paths illustrated as well as others not illustrated in FIG. 3A. Further, as described elsewhere herein, the automation of the MSF-AGV 114 may be performed in synchronization with other actions (e.g., automation of cart AGVs 116, picking sessions or windows, movement of other AGVs or pickers, etc.) in the hybrid modular storage fetching system.

Figure 3B:
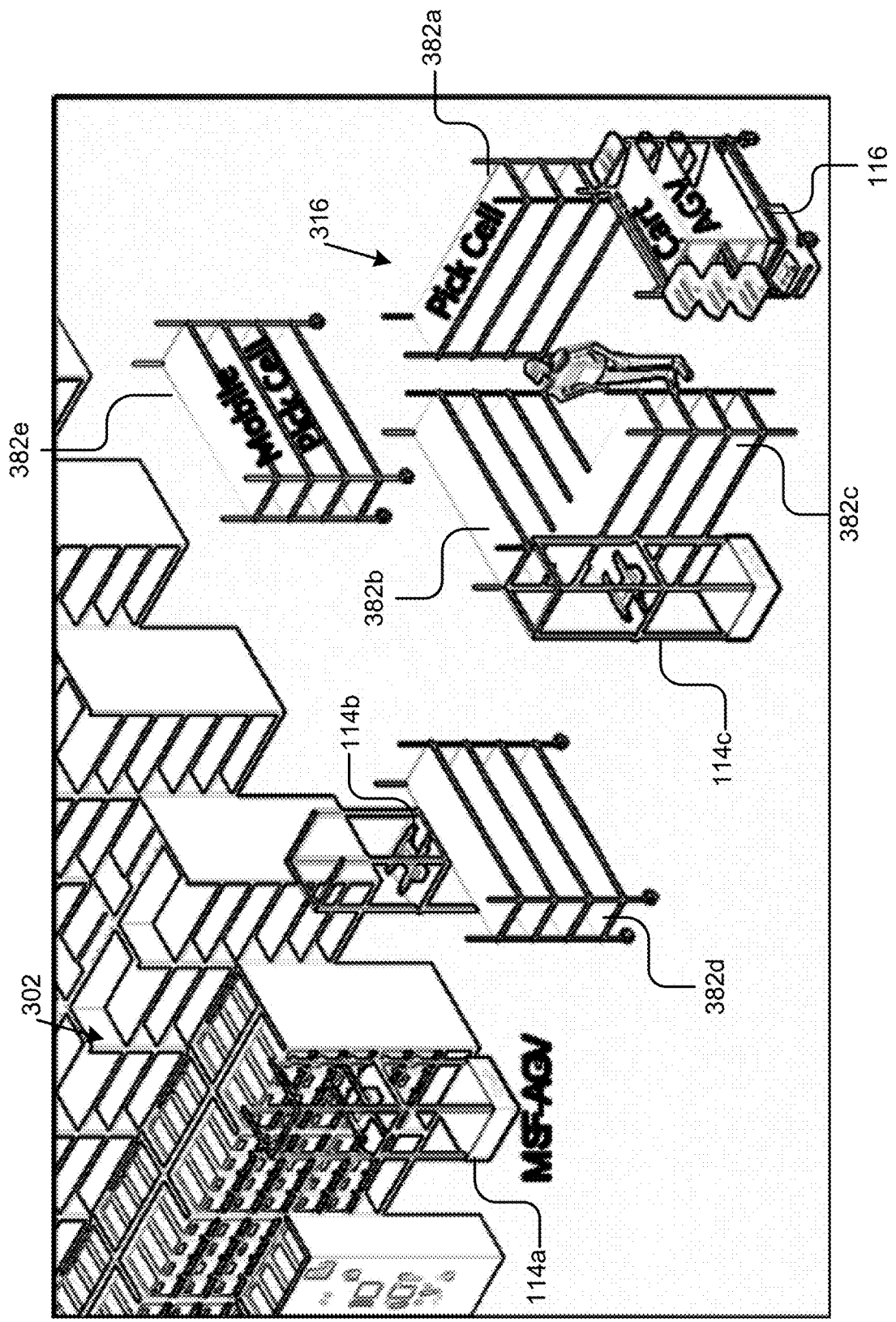
FIG. 3B is an illustration of an example goods-to-person station in a distribution facility.

FIG. 3B is an illustration of an example pick-cell station 316 in a distribution facility. As discussed above, a pick-cell station 316 may serve as a goods-to-person or cartless station 326, although, in some implementations, a cartless station 326 may have a different configuration than a pick-cell station 316. Each pick-cell station 316 may include one or more pick cells 382. The pick cells 382 are a temporary storage mediums (e.g., shelves, bays, etc.) for the modular storage units (e.g., mini pallets, totes, modular storage racks, etc.) and modular storage units may be storage containers that can be picked up or tugged and transported by an MSF-AGV 114. In some cases the pick-cell station 316 may include an output device, such as a pick-to-light frame, for carts, that matches the locations of the cartons in the cart and/or a pick-to-light frame (e.g., a frame on the shelves indicating modular storage units from which to pick items using lights or displays) for the pick cells 382 to indicate the locations of modular storage units to use for a particular pick. For instance, a pick-cell station 316 may include an output device configured to provide picking instructions to a picker, the picking instructions indicating to the picker which of the items in the modular storage units to place in a carton held on the carton holder of the cart AGV 116.

One or multiple of the pick cells 382 may be organized into a staging area 312 around a picker in a pick-cell station 316, so that modular storage units can be easily accessed by the picker. In some implementations, an MSF-AGV 114 may be configured to stage the modular storage units at the staging area 312. For instance, an MSF-AGV 114 may approach from the rear of a pick cell 382 and stage (e.g., place, deliver, etc.) a modular storage unit on the pick cell 382. In some implementations, a modular storage unit may be associated by the picking system 108 with a particular location in the staging area 312 to more precisely direct a picker to the location of the modular storage unit (e.g., using a pick-to-light or other output system).

At a given pick-cell station 316, a cart AGV 116 may arrive and situate itself on one side of the station with the cartons on the cart AGV 116 facing the picker. On the other sides of the station are pick cells 382 in which modular storage units situated and from which the picker may select items to fulfill the orders associated with the cartons. The modular storage units may contain one or more items, types of items (e.g., represented by different universal product codes or SKUs), etc.

As illustrated, the distribution facility may include a pick-cell station 316 with stationary pick cell 382a, 382b, and 382c, one or more mobile pick cells 382d and 382e, and a plurality of AGVs 114a, 114b, 114c, and 116.

In some implementations, a pick cell 382 (e.g., 382d and 382e) may be a device that is mobile. A mobile pick cell 382d or 382e can be preconfigured with modular storage units prior to picking and then transported to the pick-cell station 316. For example, a particular pick-cell station 316 may accordingly fulfill orders with the items from the modular storage units preconfigured or staged in one of the pick cells 382a, 382b, and 382c of the pick-cell station 316.

A first MSF-AGV 114a is illustrated in FIG. 3B interacting with a storage shelf in the high-density storage area 304 to retrieve a modular storage unit from the storage shelf. A second MSF-AGV 114b is interacting with a mobile pick cell 382d, for example, to preconfigure the mobile pick cell 382d for use in a pick-cell station 316, while a second mobile pick cell 382e is in queue to be preconfigured by one or more MSF-AGVs 114. As illustrated in FIG. 3B, another MSF-AGV 114c is interacting with a pick cell 382c at a pick-cell station 316, for example to bring/retrieve a modular storage unit to/from the pick cell 382c.

FIG. 4A is an example data-flow diagram illustrating the interaction of workstation logic, workload balancing logic, and release logic, for example, for selecting and preparing a set of cartons for an induction release.

In some implementations, the release logic engine 142 may receive carton data indicating one or more waves or sets of cartons to be fulfilled using the system at 402.

In some instances, the release logic engine 142 may use workload balancing logic at 404 to assign a status code to each carton based on a default setting, a location of items to be picked to the carton, carton attributes, current capacities or workloads of equipment, etc. For instance, the workload balancing logic may assign status codes to cartons to cause the cartons to be fulfilled using one or both of the pick-to-cart equipment and goods-to-person equipment (e.g., stations, carts, AGVs, picking client devices, etc.).

In some implementations, the workload balancing logic may receive carton data, assign cartons to be picked using certain equipment, for example, by assigning or re-assigning status codes to cartons, and send distribution information (e.g., status codes or other data) to the release logic at 412. In some instances, the workload balancing logic may adjust the system in real time to balance workload levels between the pick-to-cart equipment and the goods-to-person equipment based on the throughput, capacity, work cycle frequency, or other details.

The workload balancing logic may balance the release of cartons and, correspondingly optimize overall system efficiency, for example, by classifying currently unreleased cartons to the pick-to-cart flow (e.g., a flow or set of cartons assigned to be picked using the pick-to-cart equipment or area) or the goods-to-person flow (e.g., a flow or set of cartons assigned to be picked using the goods-to-person equipment or area), calculate workloads for both flows/equipment, identify cartons that are swappable between the flows, and determine cartons to swap between flows. An example method for balancing workload is described in reference to FIG. 4C.

In some implementations, the release logic engine 142 may receive fulfillment center floor data at 406. For instance, the fulfillment center floor data may include attributes of workstations, fulfillment center equipment, backlogs, performance data, or other data. For instance, the fulfillment center floor data may include a workload for each cart AGV 116, each MSF-AGV 114, the pick-to-cart area 302, the high-density storage area 304, each goods-to-person station, pickers, each workstation for printing cartons, and/or other components of the system.

The release logic engine 142 may use workstation balancing logic at 408 to assign workstations to prepare cartons for carts. For instance, the fulfillment center may have multiple workstations that build and/or print cartons. In some implementations, a workstation may include a computing device that selects carton sizes and/or prepares labels, such as shipping labels, packing slips, marketing materials, etc. For example, a workstation may include a Packsize® machine that creates physical cartons for holding items. In some instances, a cart may be loaded with cartons at a workstation.

The workstation balancing logic may configure workstations to prepare specific types of cartons and/or types of carts to build an efficient ratio of different types of carts. For instance, some carts may have only cartons that visit a pick-cell station 316 but not the pick-to-cart area 302, for example, when all items to be picked to those cartons are in the high-density storage area 304, so the cart does not need to pass through the pick-to-cart area 302. Some carts may have only cartons that have picks in the pick-to-cart area 302. Some carts have mixed cartons with picks in both areas (either individually or as a group) and may visit both the pick-to-cart area 302 and a pick-cell station 316. A particular workstation may be configured to print cartons for a particular type of cart depending on areas that it is assigned to visit.

In some implementations, the workstation balancing logic may receive pick-to-cart and/or goods-to-person workload information from 406 and identification of cart flow cartons (e.g., those cartons assigned to a cart) from 402 and/or the workload balancing logic at 404. The workstation balancing logic may use this data to determine which type(s) of carts a certain workstation is configured to prepare. In some implementations, the workstation balancing logic balances the cartons for carts, but does not affect the cartless flow for the cartless equipment. The workstation balancing logic may balance the workload among areas of the fulfillment center by determining which types of carts one or more workstations prepare (e.g., which cartons the workstations prepare). Additional detail for balancing workload using workstations is described in reference to FIG. 4B.

The workstation balancing logic may transmit a signal to one or more workstations at 410 including configuration data indicating which cartons to prepare, balances of carton types to prepare, etc., as described elsewhere herein. The workstations or workstation balancing logic may send configuration data indicating workstation configuration, cart type, carton type, or other configuration data to release logic at 412 for determining which cartons to assign to a cart, as described above.

FIG. 4B is a flowchart of an example method for workstation balancing logic. Depending on the implementation, the release logic engine 142 may use the workstation balancing logic to configure workstations to balance workload in areas and/or equipment of the fulfillment center. The release logic engine 142 may run the workstation balancing logic periodically (e.g., every 5 minutes) to regulate the induction of carts and, in some instances, their types based on areas they visit, as described above. The workstation balancing logic allows the pick-to-cart area 302 and goods-to-person area 310 to have a balanced workload, allow priority cartons to be released more quickly, and improve the efficiency of the system.

The workstation balancing logic may configure workstations dynamically to print cartons for the pick-to-cart, goods-to-person, or mixed flows. In some instances, the release logic engine 142 may use the workstation balancing logic to determine how many cartons to prepare for each type of cart (e.g., pick-to-cart, goods-to-person, mix) and then configure corresponding quantities of workstations to prepare the determined quantity of cartons. For example, in response to a trigger or button press to prepare a cart with cartons, the workstation may prepare cartons for a determined cart type, for instance, with mixed cartons to cause the cart to visit both a pick-to-cart area 302 and a pick-cell station 316.

At 422, the release logic engine 142 may receive unreleased carton info for the cart flow, such as data describing cartons, their priority status, associated cut times, pick locations, or other details. In some instances, as described above, the release logic engine 142 may also receive workload and/or capacity levels for various equipment in the fulfillment center, such as workstations, pick-to-cart equipment, goods-to-person equipment, etc.

At 424, the release logic engine 142 may determine whether there are any of the cartons for the cart flow that are in danger of missing their cut time and/or have a priority or immediate release status at the workstation balancing logic runtime. For instance, the release logic engine 142 may prioritize preparation of endangered cartons.

At 426, the release logic engine 142 may configure workstations to prepare the in-danger cartons. For instance, the release logic engine 142 may configure a set of the workstations to prepare cartons that are within a threshold time of a delivery departure cut time.

For instance, the release logic engine 142 may identify a plurality of workstations adapted to prepare cartons, determine which of the workstations have the capacity (e.g., based on workload data) to prepare the cartons, and configure the workstations to print the in-danger cartons. The release logic engine 142 may look at how many endangered cartons there are by type, such as how many endangered cartons are in goods-to-person only, in pick-to-cart only, and in both/mixed flows. The release logic engine 142 may then assign a number of workstations to prepare the endangered cartons using the available capacity or throughput (e.g., based on the workload) of the workstations or other induction equipment. For instance, the available throughput that may be assigned may be determined based on the quantity of cartons that a workstation can prepare in a given time period and/or its workload.

In some implementations, the release logic engine 142 may determine a target time window for preparation of the set of priority/endangered cartons and may adjust the quantity of workstations configured to handle these cartons based on the target time. For example, if any one workstation can process 100 cartons in an hour, there are 100 priority cartons, and the target time window is 30 minutes, the release logic engine 142 may set two workstations to prepare the cartons. In some implementations, the target time window may be determined based on a cut time for a carton plus the projected time to complete the picks for the cart using the pick-to-cart and/or goods-to-person equipment.

At 428, the release logic engine 142 may determine whether there are any active workstations left that were not assigned at 426. If there are no additional active workstations, the release logic engine 142 may terminate the workstation balancing logic until its next runtime.

If there are additional workstations to configure, the release logic engine 142 may, at 430, determine whether the pick-to-cart and goods-to-person workloads (e.g., of equipment, pickers, backlog, etc.) are imbalanced. In some implementations, the release logic engine 142 may determine a first workload level of the pick-to-cart area 302 and a second workload level of the goods-to-person area 310 of the fulfillment center. The release logic engine 142 may then determine a level of balance between the first workload level and the second workload level. A level of balance or imbalance may determine whether there is enough work for a particular area or whether there is congestion in the area.

At 432, the release logic engine 142 may configure a second set of the workstations to prepare cartons for one or more of the pick-to-cart area 302 and the goods-to-person area 310 based on the level of balance. The workstations may be configured to rebalance the workloads, for instance, by looking at the throughput ratio of the different areas of the fulfillment center and configuring the workstations based on the ratio. For example, the release logic engine 142 may determine the capacity of each area and how close each area is to its capacity. The release logic engine 142 may configure the workstations to match the capacity ratios or, if they are unbalanced, configure the workstations (e.g., the quantity or operations thereof) primarily for the area that is below capacity or further below capacity than the other area(s).

If the release logic engine 142 determines at 430 that the workloads are not imbalanced, it may proceed to 434 where it may determine whether to set cartons to prioritize a mix where carts visit both the pick-to-cart area 302 and the goods-to-person area 310 of the fulfillment center. For instance, the workstations or workstation balancing logic may have a defined setting that instructs the workstations to be in a prioritized mixed mode that will cause the workstations to prepare mixed carts.

At 436, the release logic engine 142 may configure workstations to induct enough workstations to induct the mixed cartons. By prioritizing the mixed cartons, which have a longer cycle time than carts that do not visit both the pick-to-cart area 302 and goods-to-person area 310, the release logic engine 142 may induct cartons that require visits to both areas earlier in a picking period (e.g., a workday), so that the mixed cartons are less likely to approach their cut time, which they would be more likely to miss due to the longer cycle time to complete picks in both areas. This mix prioritization may also allow other aspects of the WMS 104 or system 100 to manage resources more cleanly at the end of the picking period.

At 438, the release logic engine 142 may determine whether there are any workstations left that were not configured for the mix cartons and, if not, the workstation balancing logic may terminate until its next runtime. If there are additional workstations remaining, the release logic engine 142 may, at 440, configure remaining workstations to be proportional to remain carton types in the system. For example, if there are 200 picks to the pick-to-cart area 302 and 50 picks to the goods-to-person area 310, the release logic engine 142 may configure 80 percent of the remaining workstations to print pick-to-cart cartons and 20 percent of the remaining workstations to print goods-to-person cartons.

FIG. 4C is a flowchart of an example method for illustrating workload balancing logic for balancing workload between pick-to-cart and goods-to-person equipment. For instance, the release logic engine 142 may use the workload balancing logic to rebalance some of the cartons that are being released in order to help balance the workload of the areas and equipment of the fulfillment center. The workload balancing logic may select a pool of cartons from which release logic may select cartons for a cart, for example, as described in reference to FIG. 4A. The workload balancing logic may keep equipment or pickers in the system 100 from idling without work. In some implementations, the workload balancing logic may balance workload between cart flows (e.g., using a cart in a pick-to-cart area 302 and/or pick-cell station 316) and cartless flows (e.g., using a cartless station 326).

At 452, the release logic engine 142 may classify unreleased cartons for cart or cartless flows. The release logic engine 142 may receive data identifying a pool of cartons and may classify them with status codes to be in a certain flow. In some implementations, new cartons received may be initially set with a status code of 0, which indicates that they are set to be in the cart flow. For instance, the release logic engine 142 may use the workload balancing logic to distribute some of the cartons into a cartless flow with a status of 11. Cartons may be released into the cart flow based on their statuses being set to a cart flow (e.g., 0, 4, or 8, as described below). Similarly, cartons may be released into the cartless flow based on their statuses being set to a cartless status (e.g., 11, 12, or 25, as described below). In some implementations, the release logic engine may check whether a setting is set to ignore a replenishment hold, as described in further detail above, globally or for a certain carton, and may set the status code for the carton to reflect that the replenishment hold should be ignored. For example, from among the cart statuses (0, 4, and 8), the release logic engine 142 may set a status code 4 to indicate that a replenishment hold should be ignored for a carton. Similarly, from among the cartless statuses (11, 12, and 25), the release logic engine 142 may set a status code 12 to indicate that a replenishment hold should be ignored for a carton. In some implementations, the workload balancing logic may set the status codes between cart and cartless, but may leave the setting whether to ignore a replenishment hold unchanged. Logic for setting the status codes is described in further detail below in reference to FIG. 4D.

In some implementations, the release logic engine 142 may scan the cartons in the release logic system (e.g., received in order data, stored in carton data 124, etc.) and determine their current status codes. In some implementations, the release logic engine 142 may classify or re-classify cartons and their status codes using the example operations described in reference to FIG. 4D.

At 454, the release logic engine 142 may determine whether the cartless and/or cart operation is inactive (e.g., turned off, deactivated, unavailable, etc.). For instance, the release logic may check for a system configuration indicating whether the cartless operation is turned off and/or if the cartless stations 326 are closed. In some implementations, the release logic engine 142 may run the workload balancing logic if both cart and carless operations are enabled in order to balance workload between the areas/flows. If the release logic engine 142 (e.g., using the workload balancing logic)

determines that either the carless flow or the cart flow is inactivated, it may keep the cartons in the active flow (e.g, if cart is inactive, then it would keep the cartons in the cartless flow; if cartless inactive, then it would keep the cartons in the cart flow). In some instances, if the release logic engine 142 (e.g., using the workload balancing logic) determines that both the cart and cartless operations are inactivated, it may exit the workload balancing logic, depending on the implementation.

In some implementations, if the cartless operation is turned off, the release logic engine 142 may update the status codes of envelopes and cartons assigned to the cartless flow to re-assign them to the cart flow. In some instances, once the statuses are reassigned, the release logic engine 142 may exit the workload balancing logic.

At 456, the release logic engine 142 may determine a first workload level of the cart equipment or flow. For example, the release logic engine 142 may monitor the number of carts, cart AGVs 116, pick-cell stations 316, etc., in the cart flow and their processing speed (e.g., a throughput in picks per hour), which allows the release logic engine 142 to estimate an amount of work remaining in the cart flow for cartons assigned to the cart flow. In some implementations, the release logic engine 142 may use the classified cartons (e.g., their number and/or picks) and the performance or throughput for the pick-to-cart equipment (e.g., a cart, cart AGV, picker, pick-cell station 316 assigned to pick to carts, finalization station, etc.) to compute the workload level, for example, in terms of time remaining to process the workload.

At 458, the release logic engine 142 may determine a second workload level of the cartless equipment. For instance, as described above, the release logic engine 142 may monitor the performance of the cartless equipment (e.g., cartless station(s), MSF-AGVs 114, etc.) and use the cartons classified as cartless to determine a workload level of the cartless equipment similar to computations at 456.

At 460, the release logic engine 142 may determine carton(s) that are swappable between the cart and cartless flows based on attributes of the carton(s). In some implementations, some cartons or carton types may be set to be or to not be swappable between the flows based on their attributes, such as size, carton type, priority, picks, quantity of cartons to move, or other factors. For example, the release logic engine 142 may determine that a carton is not swappable based on priority status, for instance, because the priority cartons may be assigned based on cut time rather than balancing the system.

The release logic engine 142 may determine that mixed cartons or multi-pick (or more than a threshold number of picks) cartons are not swappable to a cartless flow because they may not be pickable from the high-density storage 304 or the cycle time for these types of cartons may be too slow at a cartless station 326. In some implementations, envelopes or certain sized packages may not be swappable to the cart flow because the pick-to-cart equipment may be incapable of handling envelopes or certain carton sizes or shapes.

In some implementations, the release logic engine 142 may identify those cartons in the cartless flow that can be swapped to the cart flow, such as those cartons that do not have a priority status, are assigned to the cartless flow, and/or are not envelopes.

In some implementations, the release logic engine 142 may identify those cartons in the cart flow that can be swapped to the cartless flow, such as those cartons that do not have pick-to-cart picks, have fewer than a defined threshold quantity of picks, are assigned to the cart flow, and/or are have a define box size, such as a carton that is too small or large for a cart.

At 462, the release logic engine 142 may select one or more swappable cartons to swap between the pick-to-cart and cartless flows based on the first and second workloads and may set status codes for the selected swappable cartons. For instance, the release logic engine 142 may reassign a carton from a cart flow to a cartless flow based on factors described below.

The release logic engine 142 may select cartons to balance the workloads of the cart and cartless flows. For example, the release logic engine 142 may determine the difference in the workload levels in time (e.g., hours to complete the picks) and then determine a quantity of cartons to shift between flows to balance the workload levels, for example, by estimating a time to pick a carton using the flow to which it is being swapped and then swapping the number of cartons needed to balance the workload levels in terms of time. In some implementations, the release logic engine 142 may determine a quantity of picks to swap and then determine the cartons and/or number of cartons corresponding to the quantity of picks.

For example, the release logic engine 142 may use equation (1) to determine a quantity of cartons to swap:

$$\frac{\text{lines}_{cartless} - x}{\text{thruput}_{cartless}} = \frac{\text{lines}_{cart} + x}{\text{thruput}_{cart}} \quad (1)$$

In equation (1), a line represents a pick, x indicates how many lines would be moved, the throughput (thruput) may be represented by working hours. The release logic engine 142 may solve equation (1) for a value of x that balances the sides of the equation.

In some implementations, cartless stations 326 may process different carton types or sizes (e.g., AA, BB, CC, etc.). In such implementations, the problem of solving a single equation may become solving a set of linear equations (2) to balance working hours between carton types:

$$\begin{cases} \frac{\text{lines}_{cartless,AA} - x_{AA}}{\text{thruput}_{cartless,AA}} = \frac{\text{lines}_{cart} + x_{AA} + x_{BB} + x_{CC}}{\text{thruput}_{cart}} \\ \frac{\text{lines}_{cartless,BB} - x_{BB}}{\text{thruput}_{cartless,BB}} = \frac{\text{lines}_{cart} + x_{AA} + x_{BB} + x_{CC}}{\text{thruput}_{cart}} \\ \frac{\text{lines}_{cartless,CC} - x_{CC}}{\text{thruput}_{cartless,CC}} = \frac{\text{lines}_{cart} + x_{AA} + x_{BB} + x_{CC}}{\text{thruput}_{cart}} \\ \quad \ldots \ldots \end{cases} \quad (2)$$

For instance, the release logic engine 142 may determine a number of cartons to swap for each carton type by solving the linear equations (2). For example, smaller cartons may have an AA size through to a largest carton at FF size, although other implementations are possible. In some implementations, a cartless station 326 may be configured to work with one or more specific carton sizes or types. The release logic engine 142 may determine one or more values of x that solve the linear equations.

In some instances, the set of equations (2) may not have a solution, for example, if there aren't enough cartons to swap. The linear equation solution may be converted into an optimization problem (3) where the release logic engine 142 finds a best possible x that minimizes a gap between cartless and cart workload levels.

$$\min_{x_{AA} \ldots FF} (t_{cartless,AA} - t_{cart})^2 + (t_{cartless,BB} - t_{cart})^2 + \ldots + (t_{cartless,FF} - t_{cart})^2 \quad (3)$$

Where t represents the workload level in time (e.g., remaining work time in hours) based on unreleased cartons and throughput. For instance, $t_{cartless,AA}$ indicates the remaining work time for AA cartons in the cartless flow, and $t_{cart}$ indicates remaining work time for the cartless flow (e.g., not divided by carton type). The optimization may be subject to constraints:

$$\text{s.t.} \begin{cases} -\text{lines}_{eligible,cart,AA} \le x_{AA} \le \text{lines}_{eligible,cartless,AA} \\ -\text{lines}_{eligible,cart,BB} \le x_{BB} \le \text{lines}_{eligible,cartless,BB} \\ \ldots \ldots \\ -\text{lines}_{eligible,cart,FF} \le x_{FF} \le \text{lines}_{eligible,cartless,FF} \end{cases} \quad (4)$$

In some implementations, the release logic engine 142 may run a script every defined time period (e.g., every 1, 2, or 5 minutes) to solve the optimization problem, subject to the constraints (4). The solution for x overall or for each set of stations may indicate a quantity of cartons to move.

FIG. 4D is a flowchart of an example method for classifying cartons for workload balancing for cart and cartless flows. Newly received cartons may start with a status code of 0 at 472 and the release logic engine 142 may use the workload balancing logic to distribute the newly released cartons into the cart or cartless flow. At 474, the release logic engine 142 may determine whether there are any picks/lines in the pick-to-cart area 302 for the carton. If there are pick-to-cart area 302 picks for the carton, the release logic engine 142 may assign a status code of 0, 4, or 8, which indicate that the carton is in the cart flow at 476. As described in further detail above, a carton may have a status code of 4 to identify that a replenishment hold should be ignored for the carton. In some implementations, the release logic engine 142 may determine a quantity of picks for a carton and, in response to the quantity being over a threshold, assign a status code of 8, which indicates that the carton should not be reassigned by workload balancing logic to the cartless flow.

If the release logic engine 142 determines at 474 that the carton has no pick-to-cart area 302 picks, it may determine whether the carton is an envelope at 478. If the carton is an envelope, then the release logic engine 142 may classify the carton as belonging to the cartless flow and assign it a status of 11 or 12.

If the release logic engine 142 determines at 478 that the carton is not an envelope, it may determine whether the carton is a box of a certain type and/or is in danger (e.g., has a priority status) at 480. For instance, the certain carton type may be a certain size or shape of box. If the carton is a certain type and/or has a priority status, the release logic engine 142 may classify the carton as belonging to the cartless flow and assign it a status code of 11 or 12 at 484. For instance, after a carton is reassigned from the cart flow to the cartless flow, the release logic engine 142 may set its status code to 11 or 12.

The release logic engine 142 may receive cartons with a status code of 11, 12, or 25 at 482 or 486 respectively. For instance, some cartons may have been assigned or reassigned one or more times previously. The release logic engine 142 may determine, based on attributes of the cartons, that they should remain at these status codes. For instance, if the cartons have a priority status, are envelopes, or are of a defined size or type, the release logic engine 142 may leave the status codes the same or transition between the cartless flow status codes at 484 and 488. As described above, the status code 12 may identify that a replenishment hold should be ignored for the carton.

In some implementations, at 486, the release logic engine 142 may determine whether a carton has a single pick and is already prepared with the picked item in a carton. In such instances, the release logic engine 142 may assign a status of 25 to the carton and instruct a picker, for example, at a cartless station, to print and/or attach a shipping label to the item (e.g., if the item is shipped in its own box) or already prepared carton and ship it to the order address. As shown at 488, the status code 25 for the carton may remain assigned to the carton until the carton is printed or shipped.

It should be noted that, in some implementations, the workload balancing logic affects which status codes are assigned to cartons (e.g., to identify where or in which flow a carton is to be picked). Further, the workload balancing logic may not change the status codes of mixed cartons with both pick-to-cart and goods-to-person picks.

Figure 5A:
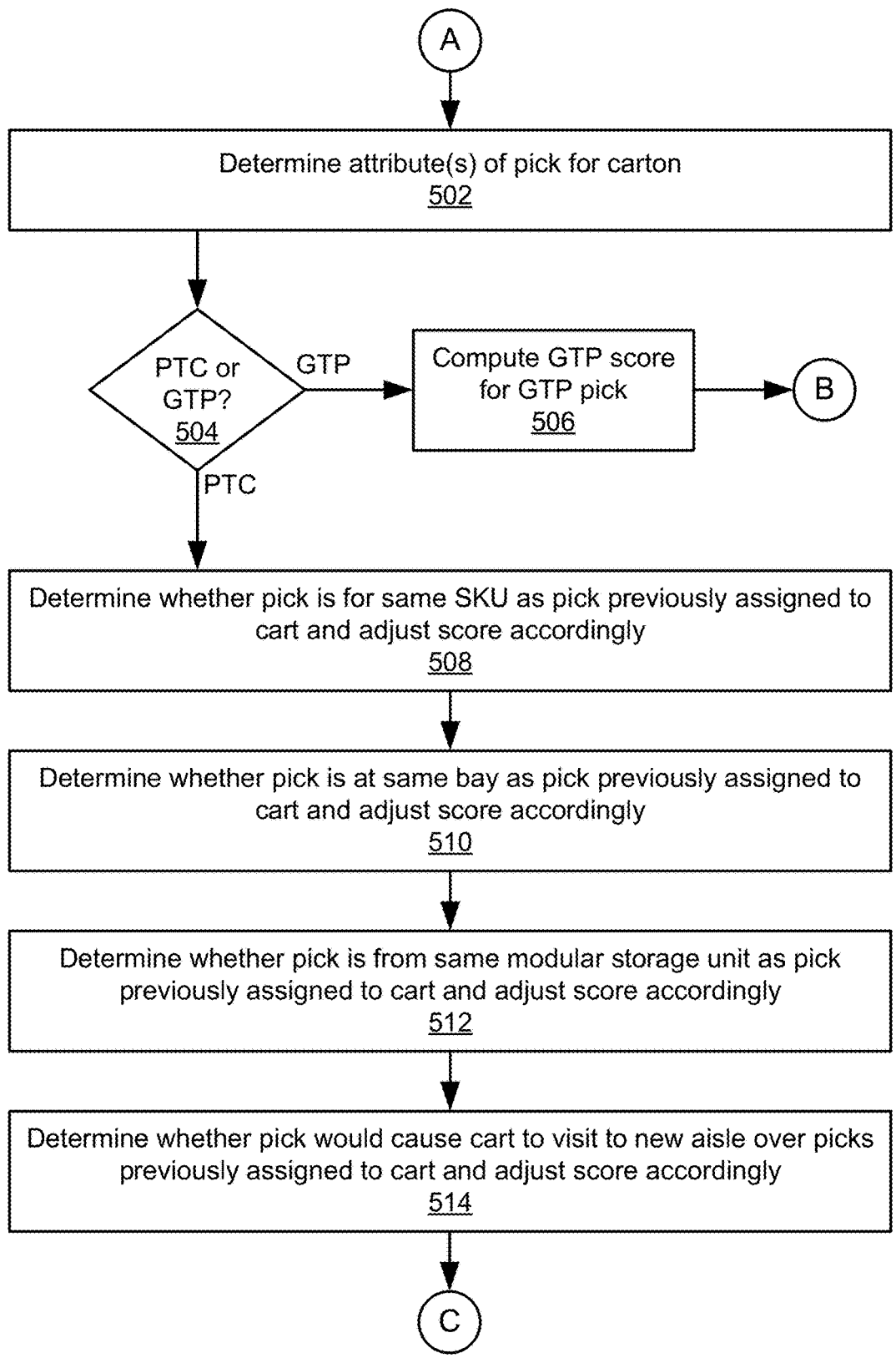
FIGS. 5A and 5B are a flowchart of an example method for scoring cartons for assignment to a cart.
Figure 5B:
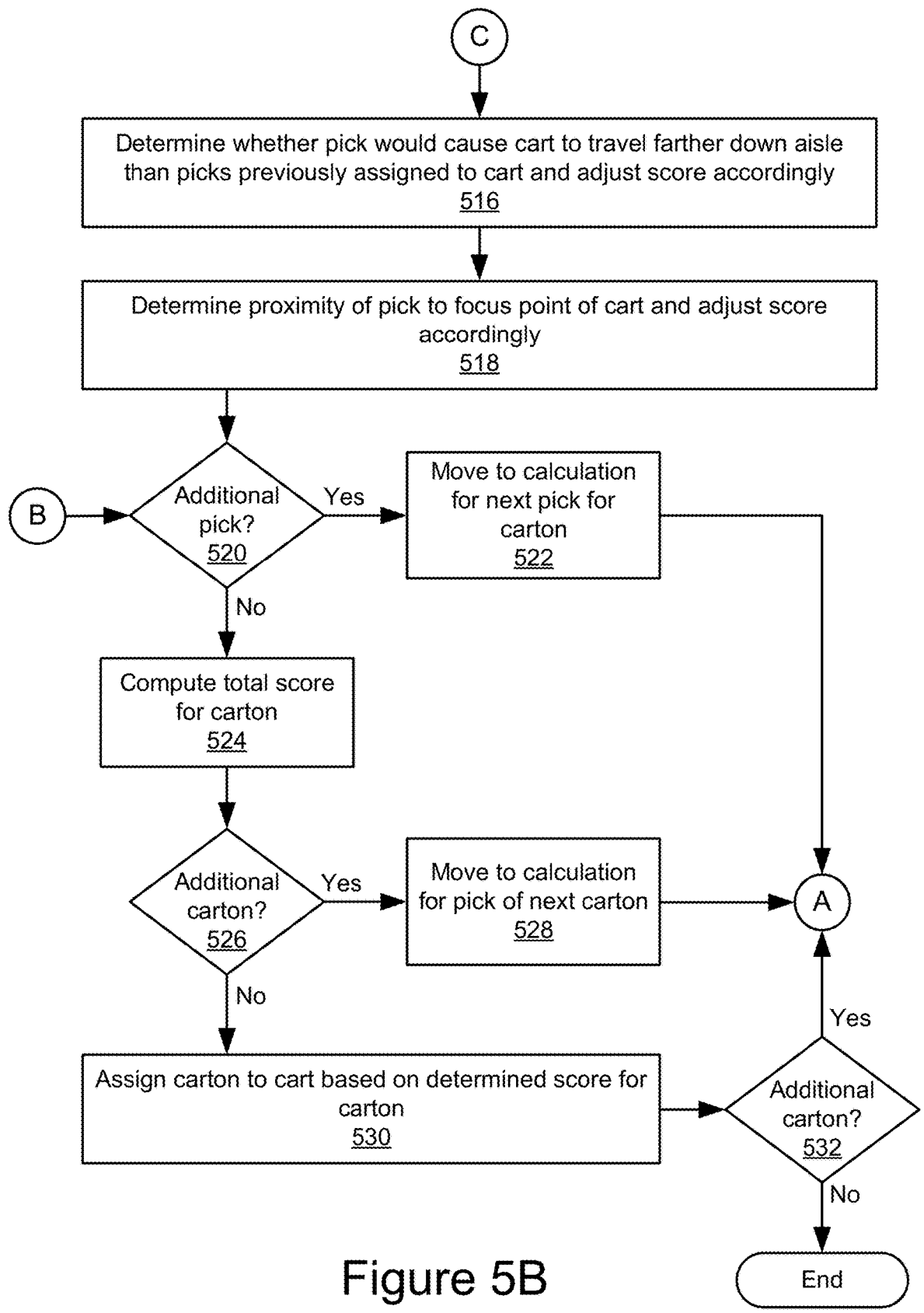

FIGS. 5A and 5B are a flowchart of an example method for scoring cartons, for example, for assignment to a cart. It should be noted that additional or fewer factors or operations may be used to determine the score. Factors in determining the score may be added, normalized, or otherwise algorithmically combined. Additionally, weights applied for each factor may be adjusted without departing from the scope of this disclosure. In some instances, the weights may be trained using machine learning (e.g., supervised machine learning based on tracking time spent preparing cartons corresponding to each factor) and applied to future score calculation. Finally, it should be noted that scores may be increased or decreased for each factor to indicate whether a pick with a corresponding attribute is more or less favorable, depending on the implementation.

In some implementations, at 502, the release logic engine 142 may determine attribute(s) of a pick for a carton. For instance, attributes of a pick may include a location of the pick (a bay, aisle, storage location, modular storage unit in which the item is stored, etc.), an item or SKU being picked, a quantity of items to be picked, or other attributes.

In some implementations, at 504, the release logic engine 142 may determine whether the pick is from a pick-to-cart area 302 or a goods-to-person area 310. For instance, the cart may be assigned to visit both areas as a mixed cart and some or all cartons that may be assigned to the cart (e.g., they may be filtered or assigned status codes, etc., as described above) may include picks in both areas. If the pick is for a goods-to-person area 310, the release logic engine 142 may determine a score for the pick at 506, for example, based on SKU affinity, as described above in reference to FIG. 2C.

At 508, the release logic engine 142 may determine whether the pick is for the same SKU or item type as a pick previously assigned to cart (e.g., of a previous carton or a previously calculated pick for the same carton) and adjust the score accordingly. For instance, if the item matches the item (e.g., the same SKU) of the previous pick, the score may be increased (or decreased, depending on the implementation).

At 510, the release logic engine 142 may determine whether the pick is at same bay as a pick previously assigned to the cart and adjust the score accordingly. For instance, if the pick would cause the cart to stop at a bay at which it is already schedule to stop, the score may be increased (or not/less decreased) for the pick.

At 512, the release logic engine 142 may determine whether the pick is from the same storage unit (e.g., a modular storage unit, pallet, shelf, box, etc.) as a pick previously assigned to the cart and adjust the score accordingly. For instance, a storage unit may include multiple SKUs or items in separate or a common compartment. If the pick is for an item stored together in a common storage unit with a previously assigned pick, the release logic engine 142 may increase the score for the pick.

At 514, the release logic engine 142 may determine whether the pick would cause a cart to visit to a new aisle over picks previously assigned to the cart and adjust the score accordingly. For instance, the release logic engine 142 may determine whether a first location for the pick and a second location for a previous pick are located on the same aisle of a pick-to-cart area 302 and may increase the score if the locations are on the same aisle or decrease the score if the picks are on different aisles.

At 516, the release logic engine 142 may determine whether the pick would cause the cart to travel farther down an aisle than picks on the same aisle and previously assigned to the cart and may adjust the score accordingly. For instance, the release logic engine 142 may determine a distance traveled in the same aisle by a cart transporting a first carton having the pick and a second carton having a previously assigned pick to evaluate how much further down the aisle the cart would travel. In some implementations, the cart may travel down an aisle and back up the same aisle (e.g., rather than entering a second aisle on a return trip). Accordingly, in some instances, the distance traveled along the path further down the aisle may include both the trip to and from the pick location. For example, if the cart would travel further down the aisle, the release logic engine 142 may decrease the score. This situation can be seen in the illustrations of FIGS. 5C-5F.

At 518, the release logic engine 142 may determine a proximity of the pick's location to a focus point assigned to the cart and adjust a score accordingly. For instance, the release logic engine 142 may determine a focus point or area within the pick-to-cart area 302 at which to focus picks for a certain cart in order to avoid congestion by carts while decreasing cart travel time. The release logic engine 142 may adjust the score for picks based on how close (e.g., within one or more threshold distances or bays) they are to the cart's focus point. Depending on the implementation, the release logic engine 142 may increase scores for picks that are closer to the focus point and decrease scores for picks that are further from the focus point.

At 520, the release logic engine 142 may determine whether there is an additional pick for the carton and, if there is an additional pick, the release logic engine 142 may move to the calculation for the next pick for the carton at 522. For instance, the release logic engine 142 may move to 502 for the next pick for the carton to determine a score for that pick based on picks of cartons previously assigned to the cart and, in some implementations, picks of the current carton (e.g., a not-yet-assigned carton) for which scores have been determined. For example, the release logic engine 142 may treat picks of a carton with previously calculated scores as tentatively assigned to the cart for the purposes of computing scores of the picks of that carton.

If the scores of all picks for a carton have been determined, the release logic engine 142 may compute, at 524, a total score for the carton. For instance, the scores for all of the picks of the carton may be combined and, in some implementations, normalized. The release logic engine 142 may store the score for the carton, for example, until a carton is assigned to the cart based on its score (e.g., as described at 530) at which point the scores for unassigned cartons are recalculated.

In some implementations, if the carton has picks for both the pick-to-cart area 302 and the goods-to-person area 310, the release logic engine 142 may combine the scores determined for both areas together. The scores may be combined by adding them, weighting each score before adding them, normalizing the scores, or performing another operation for combining the scores, depending on the implementation.

In some implementations, the release logic engine 142 may be set to prioritize pick-to-cart cartons or mixed (e.g., both pick-to-cart and goods-to-person) cartons for a certain cart. For instance, depending on whether the release logic engine 142 is set to prioritize mixed cartons, it may lower the combined score for mixed cartons. If the release logic engine 142 is set to de-prioritize the cartons with picks to more than just the pick-to-cart area 302, the scores for the picks of the different areas may be merely added together such that non-mixed scores are likely selected before mixed scores. In some implementations, the release logic engine 142 may discourage having picks in both the pick-to-cart area 302 and the goods-to-person area 310 by adjusting the score to based on whether a carton newly requires a pick in the goods-to-person area 310 over previous cartons (e.g., if the carton would be the first carton that would cause a pick-cell station 316 visit).

At 526, the release logic engine 142 may determine whether there are additional cartons for which to calculate scores, such as if there is remaining capacity on the cart or remaining cartons to be assigned. If there are additional cartons, the release logic engine 142 may, at 528, move to the calculation for a first pick of the next carton, for example, by performing the operation at 502 for a pick of that carton.

If the determination at 526 is negative, the release logic engine 142 may assign a carton to the cart based on the determined score for the carton (e.g., the total score for the picks of the carton). For instance, the release logic engine 142 may sort or rank the cartons for which scores have been computed and/or may select the carton with the highest (or lowest, depending on the implementation) score to assign to the cart.

In some implementations, when assigning a carton to the cart based on the score, the release logic engine 142 may assign the carton to a location on the cart based on its attributes. For instance, the carton may be assigned to be adjacent to cartons having picks of common items or on a side of the cart that faces the bays in which the carton's items are stored.

In some implementations, the release logic engine 142 may assign multiple cartons to the cart with scores below a threshold or within a range to reduce the number of times that the scores are recalculated thereby significantly reducing computing cycles and increasing computational efficiency.

At 532, the release logic engine 142 may determine whether there are additional cartons that may be assigned to the cart, such as if there is remaining capacity or time until dispatch for the cart or remaining cartons to be assigned. If there are additional cartons, the release logic engine 142 may move to 502 to compute the score for the next carton. In some instances, the next carton may be a carton for which a score was previously computed for the cart, it may be updated based on the inclusion of the picks of the carton(s) assigned at 530 or deleted and recomputed.

If the determination at 532 is negative, the score determination and/or assignment for the cart may terminate, although other implementations are possible.

FIGS. 5C, 5D, 5E, and 5F are depictions of aisles 542 of a pick-to-cart area 302. FIGS. 5A-5F each show two aisles 542a and 542b with bays 544a, 544b (not all bays are labeled), etc., located along both sides of the aisles 542a and 542b. Each of the bays may hold items that may be picked into cartons. In some implementations, the cart may travel into/up and out of/back in the aisles 542 in a U-shaped path. Additionally, as illustrated, the first aisle 542a includes a focus group/zone 546 along one side of the aisle 542a.

Although other implementations are possible, picks for the same SKU may have their score increased by 1 point, picks in the same bay 544 may have their scores increased by 1 point, picks in a new aisle 542 may have their scores decreased by 10 points, picks to the focus zone 546 may have their scores increased by 0.5 points, and picks farther down an aisle may have their scores decreased by 0.1 points multiplied by the distance down the aisle (e.g., a distance in meters, quantity of bays, etc.). It should be noted that the number of points or weight for each factor of the score are configurable and, in some instances, may be dynamically set based on tracked data, for example, using a supervised computer learning algorithm.

Figure 5C:
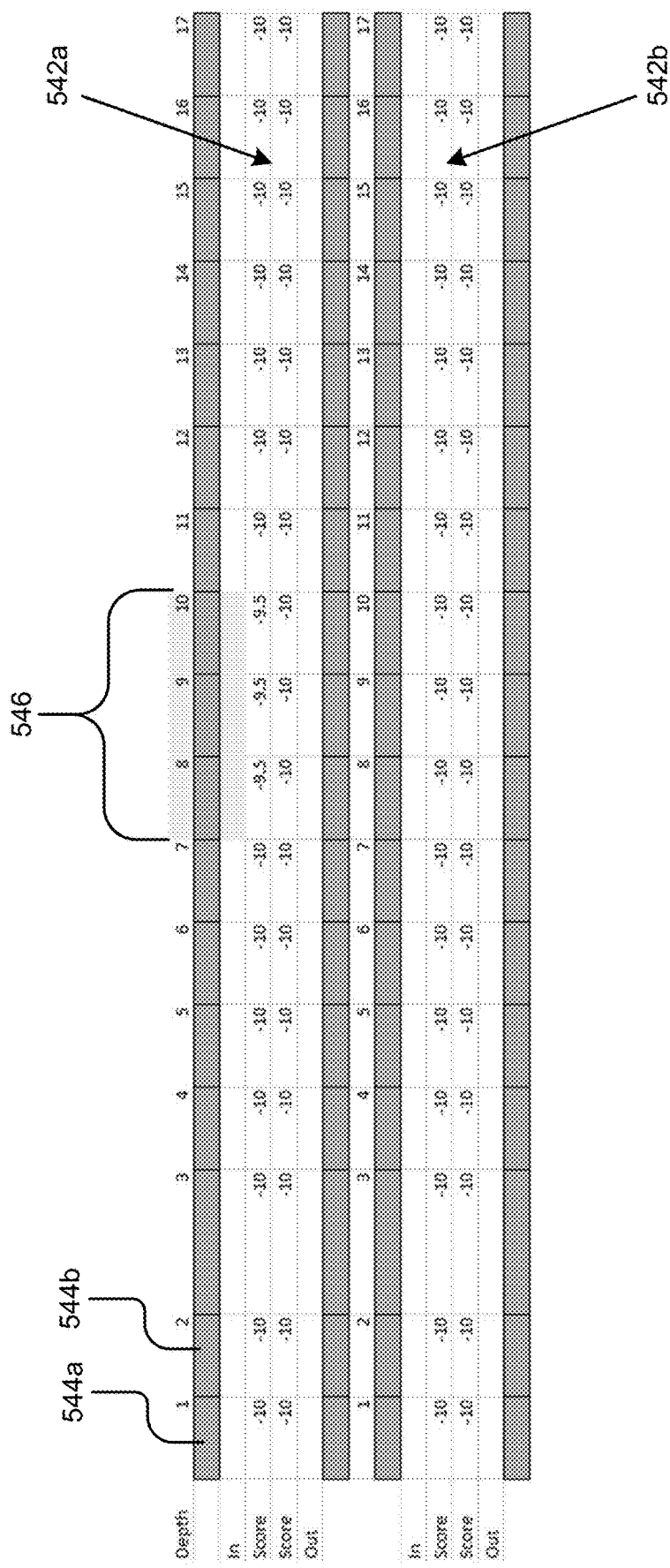
FIGS. 5C-5F are depictions of aisles of a pick-to-cart area 302.

For example, as illustrated in FIG. 5C, for a pick newly located in a particular aisle 542a or 542b, the release logic engine 142 may subtract 10 points from a score for a carton.

Similarly, as illustrated, picks in bays 544 in a focus zone 546 for a cart may have a score that is 0.5 points higher than other bays to help encourage more picks in those bays. The release logic engine 142 may thereby increase pick density and efficiency in the focus zone 546. It should be noted that the size, weight, and location of focus groups/zones 546 are configurable and may, for example, be selected using a selection mechanism (e.g., by round robin) or balancing and the selection may be iterated for each cart visiting the pick-to-cart area 302.

Figure 5D:
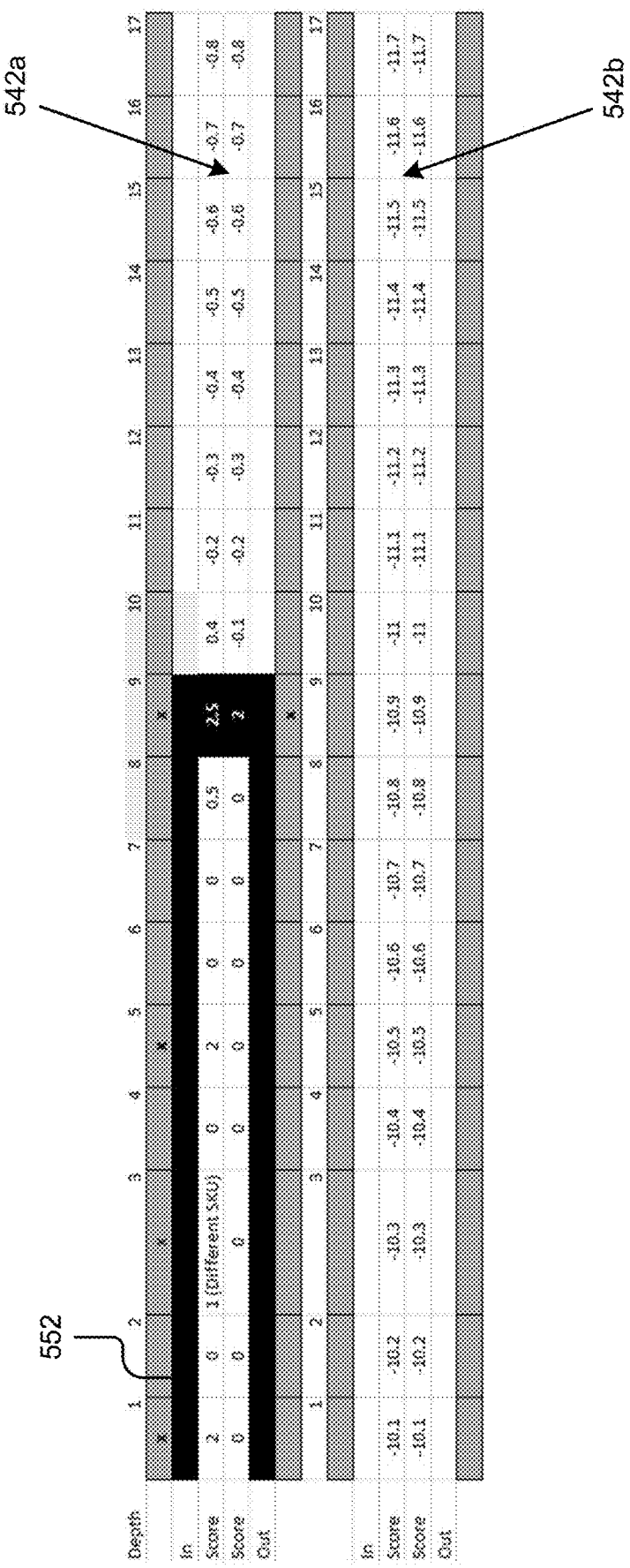

An example path 552 (shown in black) for a cart preparing a carton is illustrated in FIG. 5D. As illustrated, the carton may have 5 picks represented by the Xs shown in the various bays 544. In the example, the scores for bays in the first aisle 542a are higher than the scores in the second aisle 542b because there are already picks in the first aisle 542a, but not in the second aisle 542b.

Figure 5E:
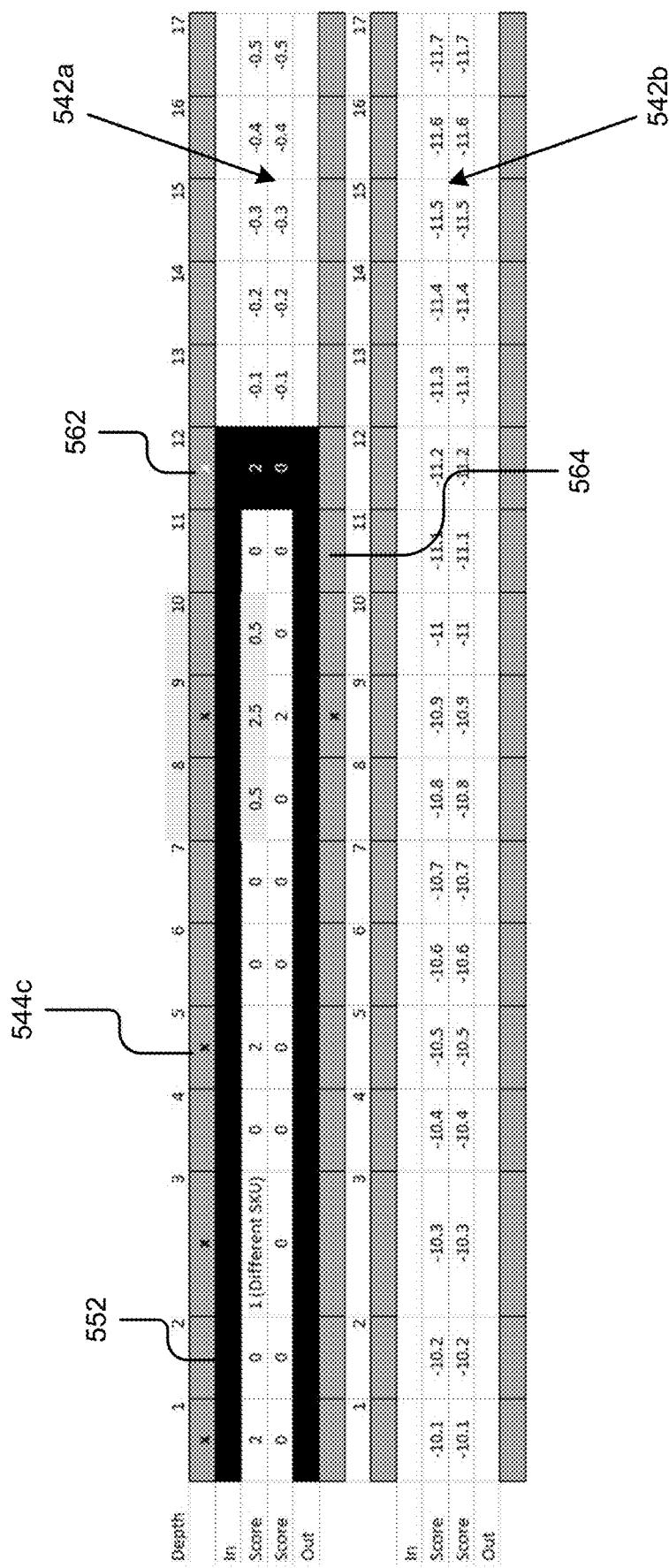

As shown in FIG. 5E, if an additional carton or pick is added at 562, the path 552 may be extended to the location at 562. For instance, the release logic engine 142 may subtract points for each bay farther that the cart would travel the pick at 562. This may be referred to as a depth score and is described in further detail at 516 above. As illustrated, if another pick or carton with a pick were added at 564, the release logic engine 142 may add a depth score of zero for the pick at 564 because it already passes by this point on its current path.

Additionally, as illustrated in FIG. 5E, a score to add a pick at each bay 544 where a pick is already assigned may be increased to encourage additional picks at that bay 544. For instance, the bay 544c has a pick already assigned for the cart, so the release logic engine 142 may increase the scores for any additional picks to that bay, as described in further detail at 510 above. The score may further be increased if the pick is for the same SKU at the bay, as described at 508 above.

Figure 5F:
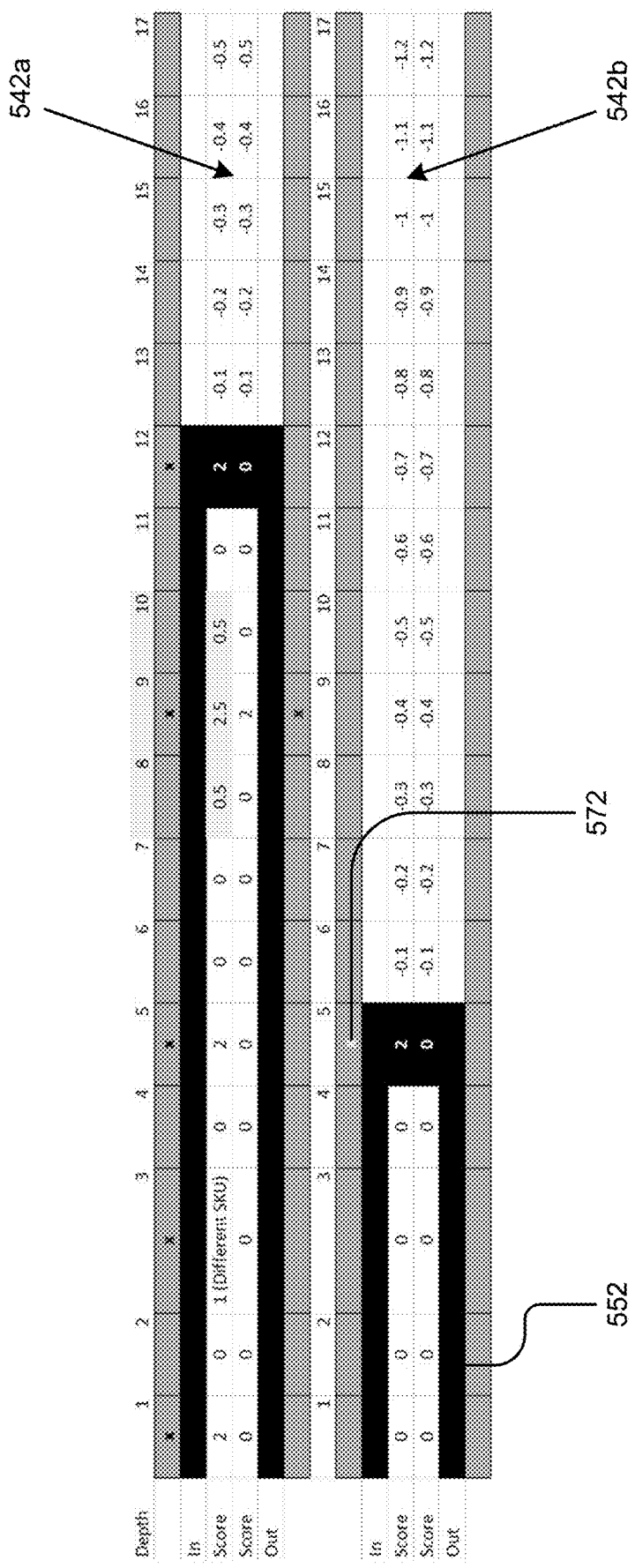
Figure 6A:
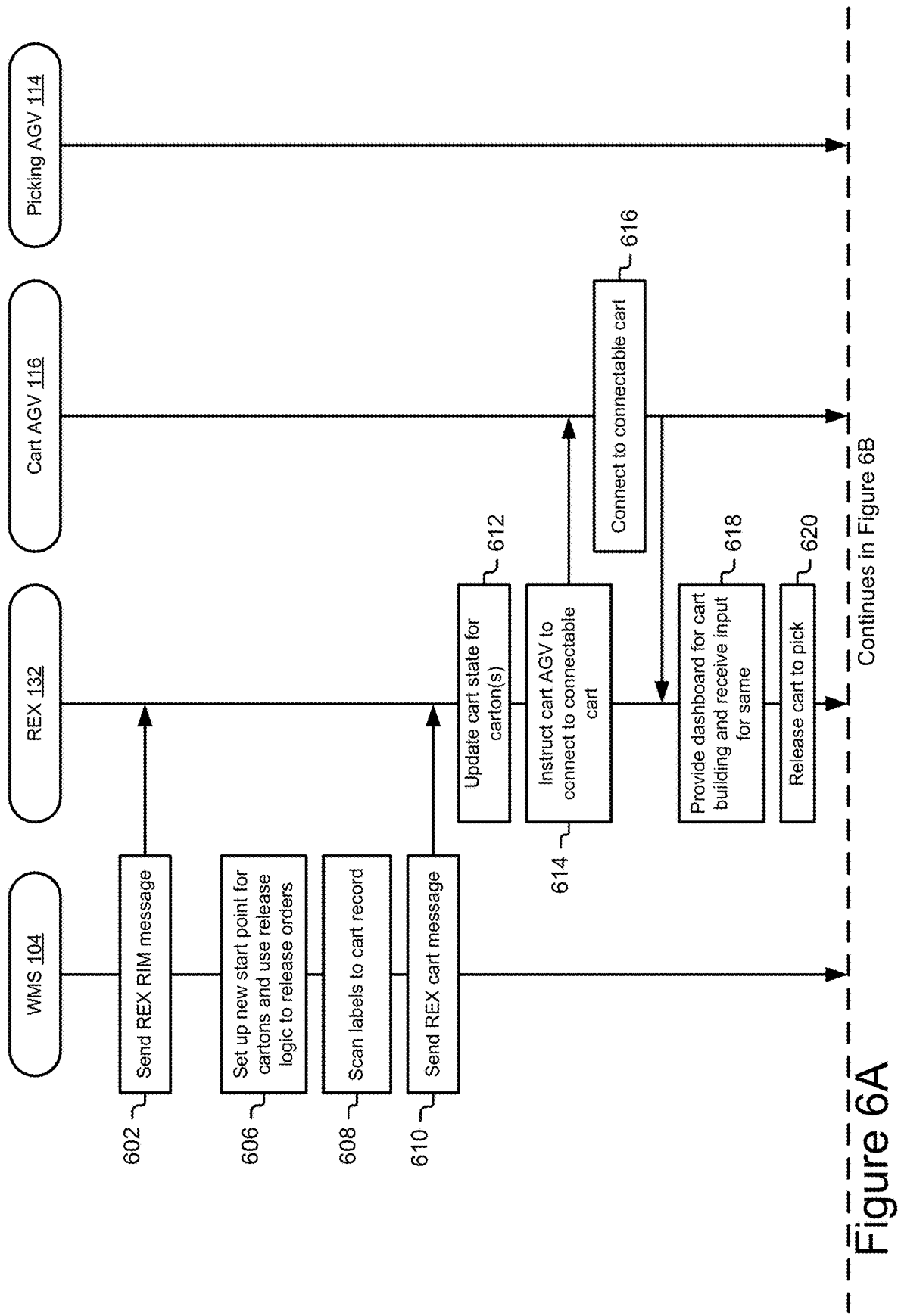
Figure 6B:
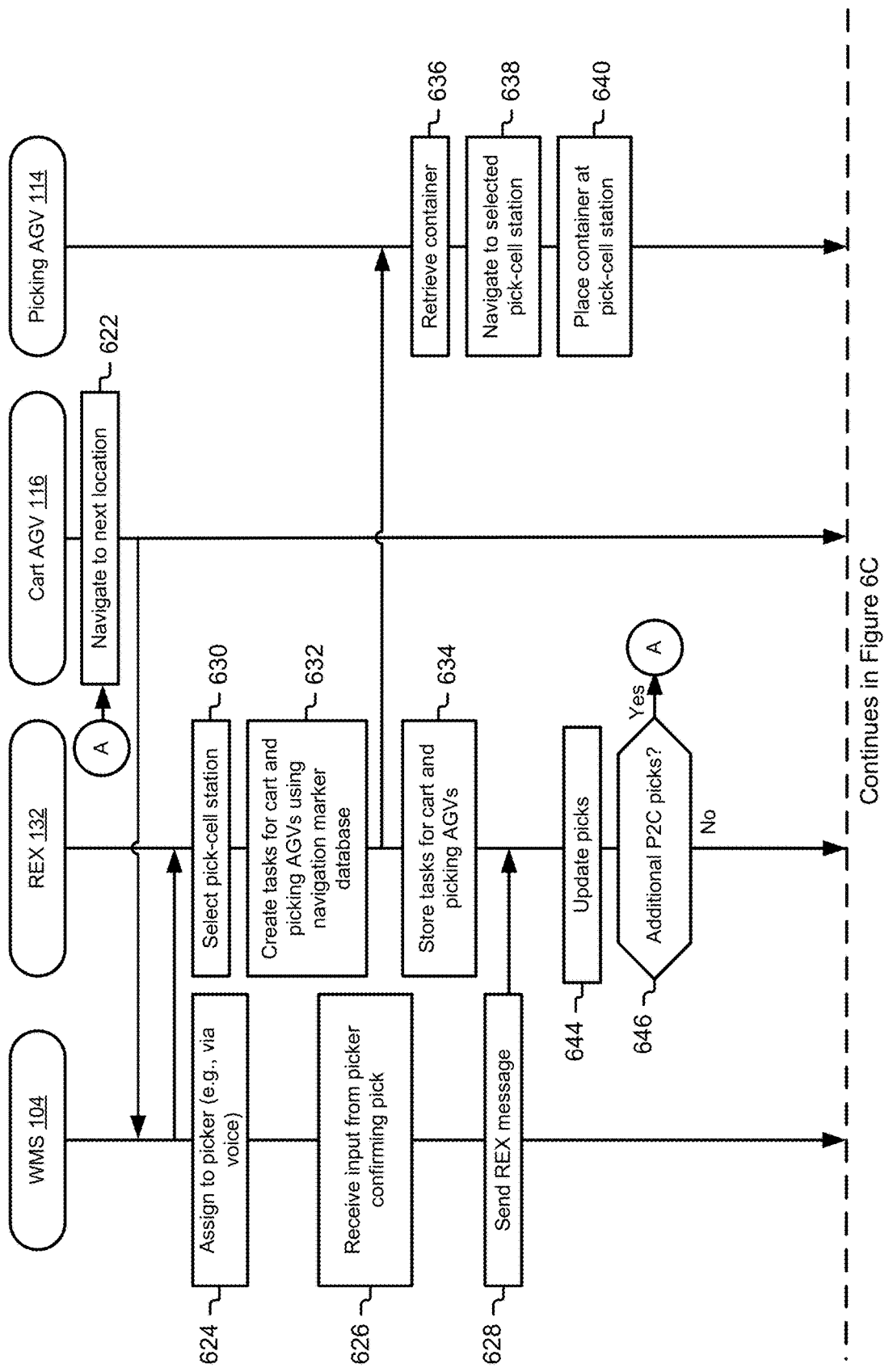
Figure 6D:
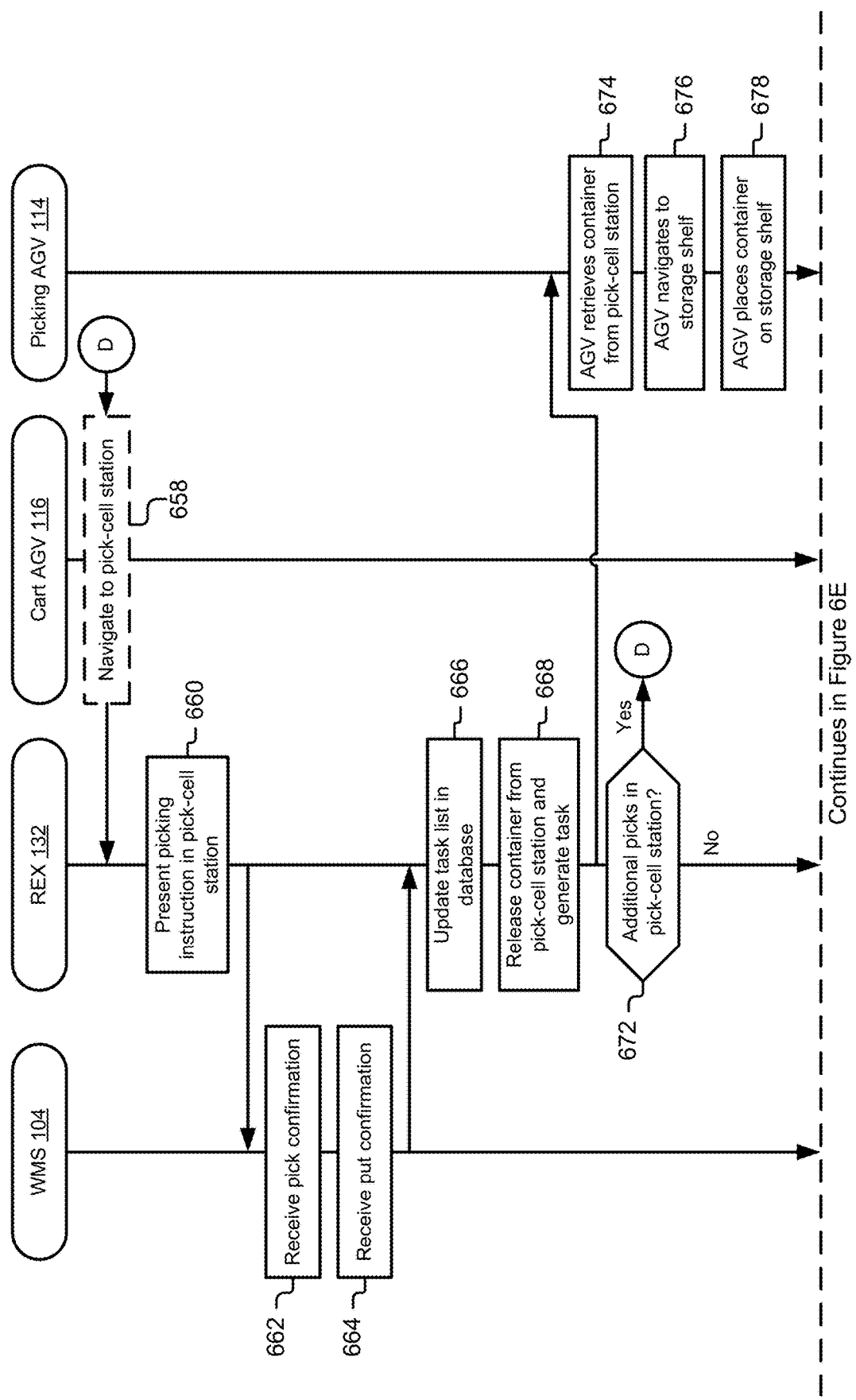
Figure 6E:
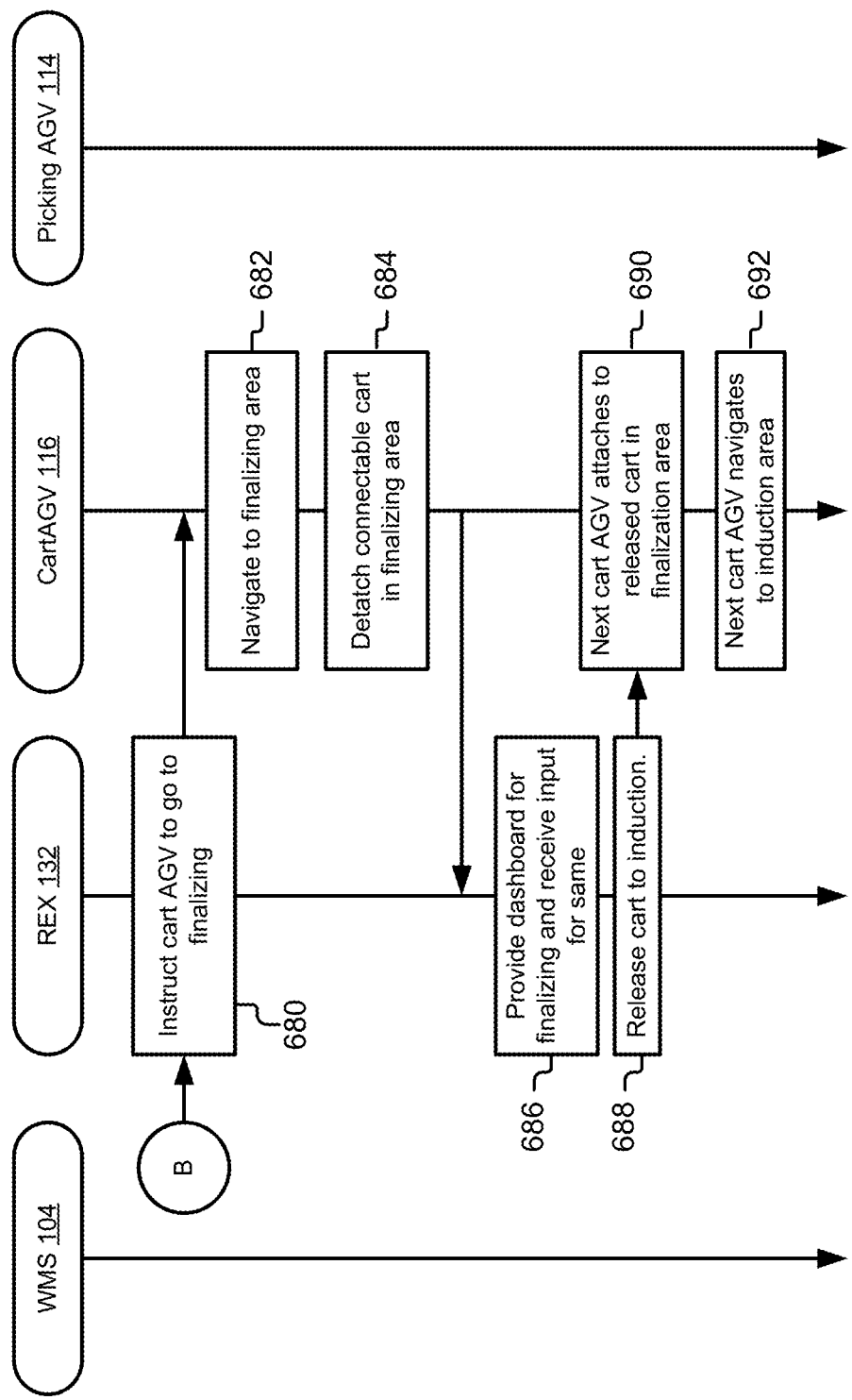

As illustrated in FIG. 5F, additional picks in a second aisle 542b may be added, but those picks may have their score reduced due to being in a new aisle. Additional picks in the new aisle, however, would not have reduced scores because they are not causing a new aisle visit. As illustrated, the path 552 may continue into the second aisle 542b for a new pick at 572.

In some implementations, attributes of bays, aisles, picks, focus zones, etc., may be stored in a table with cross-referenced cells, so that cells and associated scores may be rapidly updated and recalculated.

It should be noted that the operations, factors, weights, and other details of the scoring algorithm (e.g., described in FIGS. 5A-5F) may be changed without departing from the scope of this disclosure and that other scoring algorithms and factors are possible and contemplated herein.

FIGS. 6A-6E are data-flow diagrams of an example method of managing AGVs by a REX 132. The WES 102 or WMS 104 may receive an order including items for distribution/fulfillment. The order may be reflected in order data 126 having a unique identification code (e.g., unique product codes, stock keeping units, etc.) for an item and a quantity associated with that item. The order may be assigned a carton (e.g., of a particular size, dimension, etc.) for picking and/or shipping or, in some instances, split into multiple cartons. The WES 102 or WMS 104 may determine which cartons to assign to a cart and/or goods-to-person station, for example, as described above.

At 602, the WMS 104 may send a robot information message (RIM) to the REX 132. The RIM message may indicate to the REX 132 that one or more cartons are being to be inducted into the system, for example, by identifying the cartons in one or multiple orders and, in some instances, items in the cartons. The RIM message may include order details, carton numbers, lines in an order, SKUs in an order, quantities of SKUs in an order, or other information for inducting an order into the system.

In some implementations, the cart may include a connectable cart, which may be assigned to a cart AGV 116, for instance, based on an availability of the cart AGV 116, proximity of the cart AGV 116 to an induction area 308, availability or location of a connectable cart, size or other attributes of the connectable cart, or other criteria.

At 606, the WMS 104 may set up a new start point for cartons and use release logic to release orders. For instance, the WMS 104 may assign items to the carton(s) assigned to a cart AGV 116. In some implementations, releasing the orders may include printing labels with unique identifiers (e.g., QR codes, bar codes, stock keeping units, tracking codes, etc.) and/or creating the cartons and placing them on the cart of the cart AGV 116.

At 608, the WMS 104 may receive input scanning the labels to a cart record of the cart (e.g., using voice input or other input of the WES 102). For instance, a picker in the induction area 308 may scan the labels using an optical scanner, which is coupled with the WMS 104. The WMS 104 may then associate, in a cart record, the unique identifier of the labels, the order(s), the items in the order(s), and the cart/cart AGV 116, for instance.

At 610, the WMS 104 may send a cart message to the REX 132. The cart message may indicate the labels assigned to the cart/cart AGV 116, thereby identifying the orders assigned to the cartons on the cart/cart AGV 116. In some instances, the message may identify one or more items in an order that are stored in the high-density storage area 304 and the pick-to-cart area 302.

In some implementations, the RIM message and the cart message may be sent as separate messages or may be combined into an induction instruction indicating one or more first items in each order assigned to the cart AGV 116 to be picked using the cart AGV 116 and one or more second items in each order to be picked using the MSF-AGV 114. It should be noted that some orders may include only items located in the pick-to-cart area 302 or items located in the high-density storage area 304 of an order fulfillment center without departing from the scope of this disclosure.

At 612, the REX 132 may update the cart state and/or carton information for the carton(s), for instance, to indicate that the labels have been assigned to the cart/cart AGV 116, and, in some implementations, may instruct a cart AGV 116 to connect to a connectable cart.

At 616, in response to receiving the instruction from the REX 132, the cart AGV 116 may navigate to a location of the cart (e.g., in the induction area 308) and mechanically couple with the cart, so that the cart AGV 116 may push or pull the cart through the order fulfillment center. For example, a cart AGV 116 may include a coupling mechanism that detachably couples the cart AGV 116 to a connectable cart. The coupling mechanism may mate with a corresponding coupling component of the connectable cart, so that when the cart AGV 116 is under or adjacent to the connectable cart, the coupling mechanism may attach the connectable cart, for instance, in response to a signal received from the dispatch system 106. The cart AGV 116 may then pull or push the connectable cart through an operating environment, such as the order fulfillment center described in reference to FIG. 3A.

At 618, the REX 132 may provide a dashboard for cart building and receiving input for the same. For instance, the REX 132 may output a dashboard embodied by a graphical user interface presented on a computing device, which may be part of the WES 102. The dashboard may indicate that the connectable cart is coupled with the cart AGV 116 and the labels have been assigned to the connectable cart.

At 620, the REX 132 may release the cart to pick. For instance, the REX 132 may release the cart AGV 116 to navigate away from the induction area 308 to, for instance, the pick-to-cart area 302 based on an automatic determination that the cart AGV 116 is coupled to the connectable cart and the labels have been scanned into the cart record, or, for instance, based on a confirmatory input from a picker into the dashboard.

In some implementations, the REX 132 may receive, via the dashboard, a confirmation input from a picker that the cart AGV 116 is connected to the connectable cart and is ready to be released to pick. For example, the cart AGV 116 may be released to navigate to the pick-to-cart area 302 where items will be picked to the cartons on the cart AGV 116.

At 630, the REX 132 may select a pick-cell station 316 from a plurality of pick-cell stations in the operating environment. In some implementations, the pick-cell station 316 may be selected based on a queue or projected load of cart AGVs 116 at a pick-cell station, proximity to items to be picked, availability, presence of items (e.g., in modular storage units) already staged at the pick-cell station 316, speed of picker, or other criteria.

At 632, the REX 132 may create tasks for cart AGVs 116 and/or MSF-AGVs 114, for example, using a navigation marker database. For instance, the task list may include a series of items to be picked, and the order and AGV assigned to perform the picks may be selected based on the locations of items assigned to be picked. For instance, the task list may include a series of items and corresponding locations in a pick-to-cart area 302 for picking using a cart AGV 116. The task list may also or alternatively include a series of items and corresponding locations in a high-density storage area 304 for retrieval using an MSF-AGV 114.

At 634, the REX 132 may store the tasks for the cart AGVs 116 and/or the MSF-AGVs 114.

At 636, the REX 132 may instruct one or more MSF-AGVs 114 to retrieve one or more containers, modular storage units, or other items, from the high-density storage area 304 or, potentially, from another area of the operating environment (e.g., another goods-to-person station). For instance, the REX 132 may transmit a signal identifying high-density items, modular storage units in which the items are stored, locations of the modular storage units, etc., to one or more MSF-AGVs 114 (e.g., multiple MSF-AGVs 114 may be employed to distribute the work of modular storage unit transport). Other information such as identification of a designated goods-to-person station and time window for the items to be at the designated goods-to-person station, routing directions, priority, traffic of other AGVs, modular storage unit dimensions, etc., may also be transmitted in the signal to the MSF-AGV(s) 114.

The MSF-AGV(s) 114 may autonomously navigate to a location of a first modular storage unit in a high-density storage area 304 and may retrieve it from the location (e.g., from a storage shelving unit at the location).

In some implementations, the MSF-AGV(s) 114 may also retrieve a second item from the high-density storage area 304. For instance, an MSF-AGV 114 may autonomously navigate to a second location of a second modular storage unit in the high-density storage area 304 and retrieve it from the second location. The path of an MSF-AGV 114 may be determined to efficiently retrieve each modular storage unit. Additionally, in circumstances where multiple modular storage units have a certain item, a particular modular storage unit may be selected based the proximity of the multiple modular storage units to an assigned goods-to-person station and/or the MSF-AGV 114.

At 638, the MSF-AGV(s) 114 may navigate to the selected goods-to-person station and, at 640 may place the container at the selected goods-to-person station, for example, as described above.

Returning to 622, at 622, the cart AGV 116 may navigate to a next location. For instance, the cart AGV 116 may navigate to a sequential location in a task list, which sequential location may correspond to a location of an item in an order assigned to the cart/cart AGV 116. For instance, a REX 132 may instruct the cart AGV 116 to navigate (e.g., propel the connectable cart) to a location of a first item in the pick-to-cart area 302 based on a task list (e.g., generated in 632 or during induction, depending on the implementation). For example, the cart AGV 116 may navigate to a bay (e.g., a shelving bay) where a pick-to-cart item in one or more orders assigned to the cart is stored. For example, a guidance system coupled with the cart AGV 116 may read navigation markers and follow them until a destination defined by the REX 132 (or another component of the system 100) is reached. For instance, the cart AGV 116 may stop adjacent to the location where the item is stored (e.g., in front of a storage shelving unit).

At 624, the WMS 104 may assign a pick at the location to a picker, for example, via voice, light, or other output of the WES 102. In some implementations, the WES 102 may output an instruction to a picker on an output device, the instruction identifying the item and quantity to be picked at that location. In some implementations, the WES 102 may coordinate lights or screens on the cart indicating into which carton an item is to be placed and/or lights on a shelving bay/location of the item in the pick-to-cart area 302 indicating the storage location of the item. Other systems, such as audio (e.g., pick-to-voice), a mobile computing device indicating the location of the item, etc., are possible.

At 626, the WMS 104 may receive a confirmation message input from the picker confirming the pick into a computing device of the WES 102. For example, the input may include one or more messages indicating that an item (e.g., a specific item in one of the orders assigned to the cart) has been picked from the location and put on the cart AGV 116, for example, into a carton on the connectable cart coupled with the cart AGV 116.

At 628, the WMS 104 may send a message to the REX 132 indicating that the pick(s) at the location have been completed, in response to which, at 644, the REX 132 may update the picks, for example in the task list and/or cart record, to indicate that the first item has been picked to the cart/cart AGV 116.

The REX 132 may determine, at 646, whether an additional item in the task list is assigned to be picked to the cart AGV 116 from the pick-to-cart area 302 (e.g., also referred to as a P2C or pick-to-cart pick).

In response to determining that there is an additional item in the task list to be picked to the cart AGV 116, the REX 132 may instruct the cart AGV 116 to return to the operation at 622 to navigate to the next location of the additional item in the pick-to-cart area 302 based on the task list. In some implementations, the order of locations visited by the cart AGV 116 is based on a picking list configured to order the picking according to a designated path through the pick-to-cart area 302.

In response to a negative determination at 646, the method may continue to 648, where the REX 132 determines whether there are picks at the pick-cell station 316 assigned to one or more of the cartons assigned to the cart/cart AGV 116. For instance, the REX 132 may determine whether there are items in the high-density storage area 304 also assigned to one or more cartons transported by the cart AGV 116. For example, if one or more of the orders assigned to the cart AGV 116 (e.g., as described above) includes an item that is to be retrieved by an MSF-AGV 114, the REX 132 may direct the cart AGV 116 to navigate to the pick-cell station 316 where the item from the MSF-AGV 114 may be picked to the cart AGV 116 (e.g., to a carton in the connectable cart).

If there are no pick-cell picks, the method may proceed to 680, described below.

If there are pick-cell picks, the REX 132 may determine, at 650, whether the selected pick-cell station 316 is available. For example, the REX 132 may determine whether another cart AGV 116 is already at the selected pick-cell station 316 or if there is another reason that the selected pick-cell station 316 may not be available, such as that a picker at the pick-cell station 316 is on a break, the pick-cell station 316 is temporarily out of order, etc.

In response to determining that the selected pick-cell station 316 is not available, the REX 132 may transmit a signal to the WMS 104, which may assign, at 652, a picker associated with the cart AGV 116 to another cart AGV 116, for example, using voice. In some implementations, the cart AGV 116 may be reassigned to a different pick-cell station 316 either automatically by the REX 132 or by a picker using the WES 102.

At 654, the REX 132 may signal a current picker in the selected (or reassigned) pick-cell station 316 to stay in the pick-cell station 316 to wait for the cart AGV 116 and/or one or more MSF-AGVs 114.

At 656, the cart AGV 116 may enter a queue on a main buffer (e.g., waiting for one of a plurality of pick-cell stations 316) or a pick-cell station buffer (e.g., waiting for the selected pick-cell station 316).

If the determination at 650 is that the selected pick-cell station 316 is available or that the pick-cell buffer has cleared, the method may continue to 658, where the cart AGV 116 may navigate to the pick-cell station 316. For instance, the cart AGV 116 may autonomously navigate to the selected pick-cell station 316 to pick-cell picks. This may be done in coordination with one or more MSF-AGVs 114 delivering items to the pick-cell station 316.

At 660, the REX 132 may present a picking instruction in the pick-cell station 316 to a pick-cell picker, for example, in response to the cart AGV 116 (and/or the MSF-AGV 114) arriving at the pick-cell station 316. For instance, the WES 102 may output instructions via an output device to a pick-cell picker indicating to place an item from an MSF-AGV 114 (e.g., in a modular storage unit or other carton delivered by the MSF-AGV 114) into a carton along with an item picked using the cart AGV 116. For instance, the WES 102 may direct the pick-cell picker to pick an item from a modular storage unit delivered to the pick-cell station 316 by an MSF-AGV 114 and put the item in a particular carton (e.g., the carton to which the item was assigned, as described above) held on a connectable cart of the cart AGV 116.

At 662, the WMS 104 or REX 132, may receive a pick confirmation confirming that an item has been picked by the pick-cell picker from a container, such as a modular storage unit. For instance, the pick-cell picker may use a computing device of the WES 102 to scan a label of the item or container in which the item is stored to confirm the pick, although it should be noted that other methods of confirming the pick (e.g., using voice or a button) are possible.

At 664, the WMS 104 or REX 132, may receive a put confirmation message indicating that an item has been put into the carton by the pick-cell picker. For instance, the pick-cell picker may use a computing device of the WES 102 to scan a cart label or carton label indicating the carton into which the picker put the item. The picker may also or alternatively confirm the put with voice or other input. For instance, the picker may place the item into a carton along with an item that was put into the carton using the cart AGV 116 in the pick-to-cart area 302.

In response to receiving the put confirmation (whether directly from the WES 102 or from the WMS 104), at 666, the REX 132 may update the task list in the database to indicate that the pick and put have been completed for the item.

At 668, the REX 132 may release the container from the pick-cell station and generate a task, for instance, for an MSF-AGV 114 to store the container back to the high-density storage area 304. In some implementations, the container may not be released unless all picks from that container to the cart/cart AGV 116 have been performed.

The REX 132 may signal the MSF-AGV 114 (e.g., the same MSF-AGV 114 that delivered the container, a next available MSF-AGV 114, or another selected MSF-AGV 114) to store the container, in response to which, at 674, the MSF-AGV 114 may retrieve the container from the pick-cell station 316.

At 676, the MSF-AGV 114 may navigate to a storage shelf in the high-density storage area 304 and, at 678 may place the container on the storage shelf. For instance, the MSF-AGV 114 may store the container at a location where the container was stored prior to being retrieved above or, the REX 132 may direct the MSF-AGV 114 to store the container at a different location, for example, based on an availability of storage shelves, projected demand for items in the container, quantity of items remaining in the container, or other criteria.

At 672, the REX 132 may determine whether there are additional pick-cell picks for the cart AGV 116 (e.g., for the cartons held by the cart/cart AGV 116) at the pick-cell station 316. If there are additional pick-cell picks for the cart AGV 116, the method may return to the operation at 660 to present an instruction to the pick-cell picker for the next pick-cell pick.

In response to determining, at 648 that there are no pick-cell picks or determining, at 672 that there are no additional picks in the pick-cell station 316, the REX 132 may instruct the cart AGV 116 to go to the finalizing area 314, and at 682, the cart AGV 116 may navigate to the finalizing area. For instance, the REX 132 may instruct the cart AGV 116 to propel the connectable cart to the finalizing area 314.

In some implementations, at 683, the cart AGV and/or mobile cart may interact with a carton removal mechanism to remove carton(s), as described in further detail above.

At 684, the cart AGV 116 may detach from the connectable cart in the finalizing area 314. In some implementations, the cart AGV 116 may then return to an induction area 308 to attach to another connectable cart.

At 686, the REX 132 may provide a dashboard for finalizing and receive input for the same. For instance, an associate in the finalizing area 314 may finalize the cart using the dashboard and/or using the WMS 104. In some implementations, the associate may verify the contents of a carton, close the cartons, place the cartons on a conveyer to go to a shipping area, and confirm on the dashboard that the cartons have been finalized.

At 688, in some implementations, the associate may use the dashboard or other input method to release the cart (e.g., the connectable cart) to induction, in response to which the REX 132 directs a cart AGV 116 (e.g., a next available or another cart AGV 116) to attach to the released cart in the finalizing area at 690. At 692, the cart AGV 116 may navigate to the induction area 308 with the cart.

FIGS. 7A and 7B are illustrations of example cart AGVs 702a and 702b (e.g., also referred to herein as 116). The examples may include a cart AGV 702 or robot configured to autonomously transport pick-to-cart items, as described above. The cart AGV 702 may include or be adapted to autonomously transport a carton holder 704a or 704b (e.g., a cart or shelves) that is adapted to hold cartons (not shown in FIG. 7A or 7B). For example, a cart AGV 702 may push/pull a carton holder 704. In some implementations, a carton may be a box placed on a shelf of the carton holder 704.

As illustrated in FIGS. 7A and 7B, the cart AGV 702 may include a substantially rectangular body and may include or be couplable to a connectable cart having shelves, such as the carton holder 704a or 704b. The cart AGV 702 may couple to a connectable cart via a coupling mechanism and matching coupling component, for example, a latch mechanism coupling the cart AGV 702 to the connectable cart. In some instances, the shelves may be angled for easy loading of cartons to be filled with picked items.

In some implementations, the cart AGV 702 may also include a guidance system that may detect, for instance, a human picker associated with the cart AGV 702 (e.g., via a tracking device on the picker, optical recognition, etc.), determine the picker's position, and reposition itself automatically based on the picker's position by comparing the cart AGV's 702 position and the picker's position, and a pre-determined offset (e.g., a distance in front of, behind, and/or next to the picker). This advantageously allows the cart AGV 702 to follow the picker.

The cart AGV 702 may include drive units that move the cart AGV 702 in an operating environment. Although other implementations are possible, the drive unit may include turn tables each with one or more drive motors. For instance, the cart AGV 702 may include two turn tables, each of which may include one or more drive motors coupled to one or more wheels, tracks, treads, etc. The turntables may be motorized to allow them to rotate. The turntables may allow the cart AGV 702 to maneuver along any horizontal trajectory (e.g., forward, backward, sideways, rotate, etc.)

FIG. 8 is an illustration of an example MSF-AGV 114, which may include an AGV body 810, a drive unit 812 housed within or coupled to the body 810, a power source (not shown) housed within or coupled to the body 810, an AGV item storage rack 806 with one or more AGV shelves 814, a CHM 816, a carrying surface 820, a guidance system (not shown), and one or more controllers (not shown), although other configurations are possible and contemplated herein.

The body 810 may include a front, a rear opposing the front, a left side extending from the front to the rear, and a right side opposing the left side and extending from the front to the rear. While various shapes and construction materials to the body 810 are possible, the body 810 may be configured to fit between rows of storage shelving in a high-density storage area 304. The body 810 may be configured to house a drive unit 812, power source, controller, and/or other components of the MSF-AGV 114.

The drive unit 812 may be coupled to the body 810 and configured to receive power from the power source to provide motive force to the MSF-AGV 114 and propel the MSF-AGV 114 within an operating environment. In some implementations, the drive unit 812 may receive instructions from one or more controllers instructing the drive unit 812 to cause the MSF-AGV 114 to move forward, backward, sideways, turn, or perform another movement. In some implementations, the drive unit 812 may include electric motors and wheels, although other configurations, such as treads are possible.

The drive unit 812 may be wirelessly coupled via a controller to a wireless interface and a wireless communications network to receive control signals from the dispatch system 106 and/or other components of the system 100.

The power source may be coupled to the components of the MSF-AGV 114 to provide power to the components, for example, the power source may provide power to the CHM 816, the drive unit 812, a controller, or another component of the MSF-AGV 114. The power source may include a battery, a wire, contact track in the operating environment, induction charger, alternator or gas generator, etc.

Some implementations of the MSF-AGV 114 may include an AGV item storage rack 806 (also referred to as AGV rack 806). While the AGV rack 806 is illustrated as coupled to the top of the body 810, other configurations are possible, for example, the AGV rack 806 may be coupled in front of, behind, to the side of, or even towed or pushed by the MSF-AGV 114. The AGV rack 806 may be positioned proximate to the CHM 816, so that the shelves 814 are within reach of the CHM 816 for the CHM 816 to place items on the shelves 814.

The AGV rack 806 may include a single shelf 814 or a plurality of shelves 814 coupled to a frame. The shelves 814 may include flat surfaces, bays, containers, or other mechanisms for holding a modular storage unit 114 or another item. At least one of the shelves 814, where equipped, is capable of storing the item during transit of the MSF-AGV 114.

The plurality of shelves 814 may be vertically arranged and, in some implementations, one or more of the shelves 814 may have an adjustable height (e.g., adjusted manually or automatically using a motor coupled with the MSF-AGV 114) on the AGV rack 806. In some implementations, a controller of the MSF-AGV 114 may determine a current height of a particular shelf of the plurality of shelves 814, for example, using an optical scanner or retrieving a stored height of a particular shelf from a database (e.g., on the data store 120). For example, one or more of the shelves 814 may include a marker readable by an optical scanner coupled with the CHM 816 or carrying surface 820 to indicate to the CHM 816 a location or identification of the particular shelf. In some implementations, a controller of the MSF-AGV 114 may store a shelf identifier for a shelf 814 in association with a height or size of the shelf 814, or an identifier of an item or modular storage unit 822 stored on the shelf 814.

In some implementations, a shelf 814 onto which an item is placed may be selected based on the size, height, weight capacity, or other attributes of the shelf 814. For example, a modular storage unit 822 of a given size may be placed on a shelf 814 having a corresponding size. In another example, a modular storage unit 822 having a threshold weight may be placed on a lower shelf 814 of the AGV rack 806 than a modular storage unit 822 having a lighter weight than the threshold.

The container handling mechanism or CHM 816 may include an extender for extending a carrying surface 820 from an MSF-AGV 114 to a storage shelving unit that is separate from the MSF-AGV 114. The CHM 816 may have three or more degrees of freedom to move the carrying surface 820 along three or more axes thereby allowing the CHM 816 to retrieve an item from a first target shelving unit using the carrying surface 820 and the three or more degrees of freedom and place the item on a second target shelving unit.

In some implementations, the CHM 816 may include a mast having an elevator 808 coupled with the body 810 and/or AGV rack 806. The elevator 808 lifts and lowers a platform 818 supporting a carrying surface 820. The elevator 808 moves the CHM 816 along a Z-axis to lift and set down the container.

In some implementations, the platform 818 extends or retracts the carrying surface 820 horizontally between the MSF-AGV 114 and a storage shelving unit. In some implementations, the platform 818 may also extend or retract the carrying surface 820 into or out of one or more of the AGV shelves 814 to place an item on one of the AGV shelves 814. The CHM 816 includes a moveable platform 818 having a carrying surface 820 capable of translating along a plane in two or more dimensions and/or rotating about a vertical axis. For example, the platform 818 (or noother component of the CHM 816, depending on the implementation) may translate the carrying surface 820 along any X and Y coordinates (e.g., sideways/left and right relative to the front of the MSF-AGV 114; forward and backward relative to the front of the MSF-AGV 114; etc.). This allows the CHM 816 to retrieve an item from a storage shelf and move it to and place it on an AGV shelf 814 supported by the frame, and vice versa. The CHM 816 may be adjustable to translate between an X-axis, Y-axis, a combination, etc.

In some implementations, the platform 818 may comprise two platforms coupled to one another, a first of which moves along a first horizontal axis and a second of which moves along a second horizontal axis perpendicular to the first horizontal axis. For instance, the first platform may be coupled with the elevator 808 and the second platform, so that the first platform may move the second platform along the first horizontal axis. The second platform may be coupled with the first platform and the carrying surface 820, so that the second platform may move the carrying surface 820 along the second horizontal axis.

The CHM 816 may be capable of moving items between the different shelves 814 in the AGV rack 806, one or more storage shelving units in a high-density storage area 304, one or more pick cells 382 in a goods-to-person station, and, in some instances, to or from other target shelves (e.g., in an induction area 308, replenishment area 318, etc.).

In some implementations, the MSF-AGV 114 may include a scanner coupled with the carrying surface 820, platform 818, etc., that can read signatures or markers to determine location. For example, the scanner may be an optical scanner configured to read visual identifiers (e.g., labels including a QR code, bar code, etc.) to determine which shelf 814 the CHM 816 or the carrying surface 820 is aligned with. The optical scanner may scan a shelf marker on one or more of the AGV shelf 814 or a detached storage shelf. The shelf marker may indicate a position and/or identification code of shelves and/or modular storage units 822, for example.

In some implementations, the elevator 808 may include positional sensors to determine the position of CHM 816 and/or align the carrying surface 820 with a target shelf (whether an external or integrated with the MSF-AGV 114).

The carrying surface 820 may be coupled to or integrated with the CHM 816 and is configured to support a modular storage unit 822 or another item. In some implementations, the carrying surface 820 is connected at a distal end of the CHM 816 or extender. The carrying surface 820 may be movable by the CHM 816 vertically parallel relative to a face of the AGV rack 806, perpendicularly relative to the face of the AGV rack 806, and horizontally parallel relative to the face of the AGV rack 806. The carrying surface 820 may be extendable by the CHM 816 using the three or more degrees of freedom to retrieve a certain item or modular storage unit 822 from a separate shelving unit located within reaching distance of the CHM 816 and retractable using the three or more degrees of freedom to place the certain item on one of the AGV shelves 814 of the AGV rack 806.

In some implementations, the carrying surface 820 may be adapted to interface with a modular storage unit 822. For example, the carrying surface 820 is compatibly engageable with a handling component of the modular storage unit 822 to lift the modular storage unit 822 from the separate shelving unit, retain the modular storage unit 822 during handling, and place the modular storage unit 822 on the one of the shelves 814 of the AGV rack 806.

In some implementations, the carrying surface 820 may include forks, which are designed to engage with a corresponding support structure (e.g., the handling component or supports 712) of the modular storage unit 822. The carrying surface 820, may be made of any material, such as plastic or metal, which is sufficiently strong to support a modular storage unit 822 or other item.

The MSF-AGV 114 may include a guidance system that determines a location of the MSF-AGV 114 within the operating environment. For instance, the guidance system may include one or more sensors that detect and process navigation markers (e.g., QR codes, RFID labels, etc.) to locate the MSF-AGV 114 as the MSF-AGV 114 traverses the operating environment. The guidance system may be coupled to a controller of the MSF-AGV 114, which may, in some instances, include local object detection intelligence and processing to avoid collision with other objects (e.g., AGVs, humans, items, storage shelving units, etc.) in the operating environment.

The MSF-AGV 114 may include one or more controllers coupled with the guidance system, CHM 816, drive unit 812, dispatch system 106, etc., to perform the operations described herein. For instance, the one or more controllers may receive a signal from the REX 132 (e.g., via the dispatch system 106) and signal the drive unit 812 to propel the MSF-AGV 114. The one or more controllers may communicate with the guidance system to determine a location of the MSF-AGV 114 within the operating environment and, using the drive unit 812, navigate through the operating environment. The one or more controllers may receive a signal from the REX 132 indicating to retrieve a particular item from a target storage unit, in response to which, the one or more controllers may instruct the drive unit 812 to position the CHM 816 adjacent to the target shelving unit using the current location determined by the guidance system and then direct the CHM 816 to retrieve the item.

Figure 9:
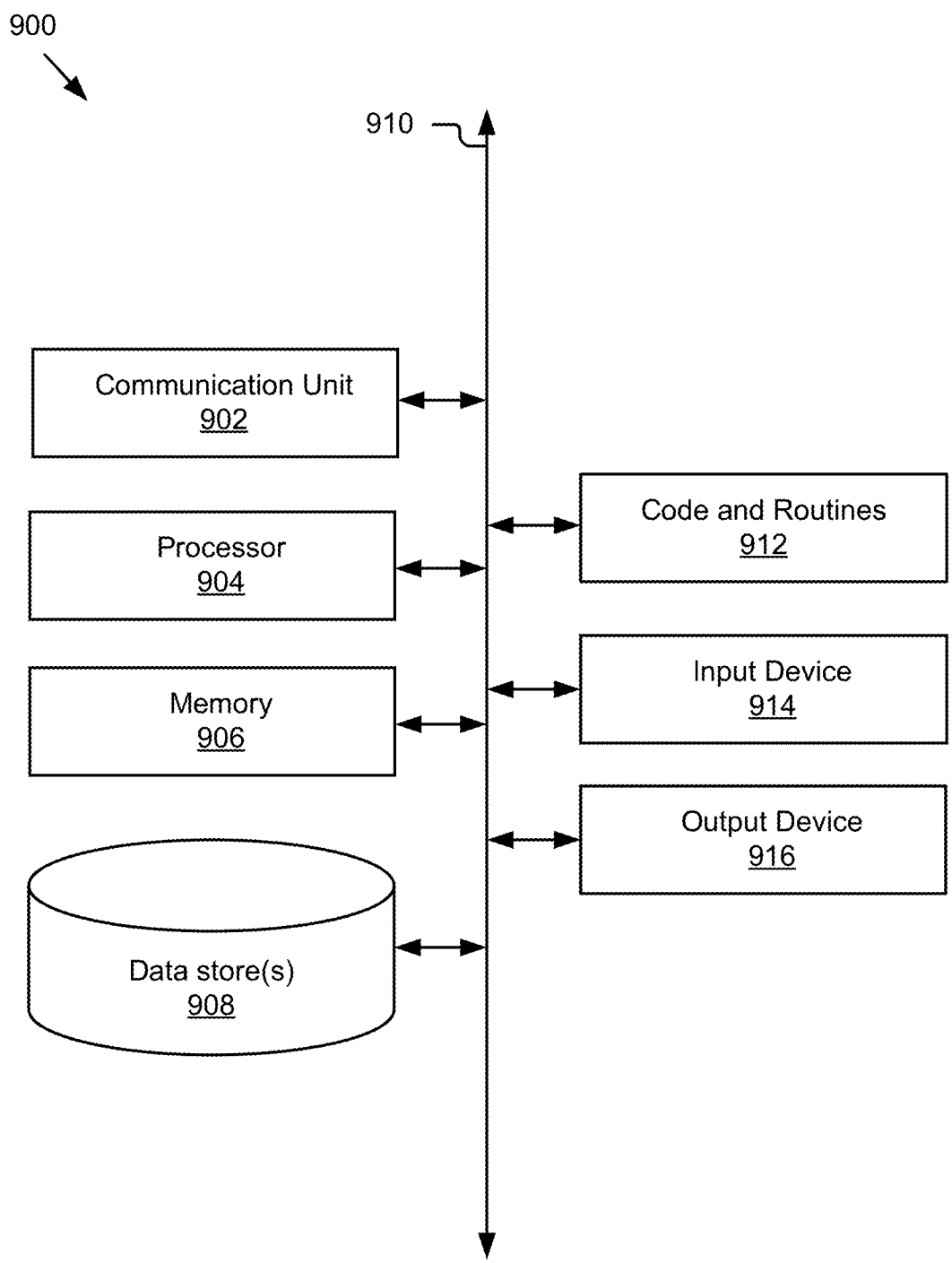
FIG. 9 is a block diagram illustrating an example computing device.

FIG. 9 is a block diagram illustrating an example computing system 900. The example computing system 900 may correspond to a WES 102, a WMS 104, a dispatch system 106, a picking system 108, or a REX 132, or a component thereof, for example.

The code and routines 912 may include computer logic executable by the processor 904 on a computing system 900 to provide for the functionality described in reference to one or more of the components of the system 100. For instance, in some implementations, the release logic engine 142 may include code and routines.

As depicted, the computing system 900 may include a processor 904, a memory 906, a communication unit 902, an output device 916, an input device 914, and database(s) 908, which may be communicatively coupled by a communication bus 910. The computing system 900 depicted in FIG. 9 is provided by way of example and it should be understood that it may take other forms and include additional or fewer components without departing from the scope of the present disclosure. For instance, various components of the computing devices may be coupled for communication using a variety of communication protocols and/or technologies including, for instance, communication buses, software communication mechanisms, computer networks, etc. While not shown, the computing system 900 may include various operating systems, sensors, additional processors, and other physical configurations. Although, for purposes of clarity, FIG. 9 only shows a single processor 904, memory 906, communication unit 902, etc., it should be understood that the computing system 900 may include a plurality of one or more of these components.

The processor 904 may execute software instructions by performing various input, logical, and/or mathematical operations. The processor 904 may have various computing architectures to method data signals including, for example, a complex instruction set computer (CISC) architecture, a reduced instruction set computer (RISC) architecture, and/or an architecture implementing a combination of instruction sets. The processor 904 may be physical and/or virtual, and may include a single core or plurality of processing units and/or cores. In some implementations, the processor 904 may be capable of generating and providing electronic display signals to a display device, supporting the display of images, capturing and transmitting images, performing complex tasks including various types of feature extraction and sampling, etc. In some implementations, the processor 904 may be coupled to the memory 906 via the bus 910 to access data and instructions therefrom and store data therein. The bus 910 may couple the processor 904 to the other components of the computing system 900 including, for example, the memory 906, the communication unit 902, the input device 914, the output device 916, and the database(s) 908.

The memory 906 may store and provide access to data to the other components of the computing system 900. The memory 906 may be included in a single computing device or a plurality of computing devices. In some implementations, the memory 906 may store instructions and/or data that may be executed by the processor 904. For example, the memory 906 may store the code and routines 912. The memory 906 is also capable of storing other instructions and data, including, for example, an operating system, hardware drivers, other software applications, databases, etc. The memory 906 may be coupled to the bus 910 for communication with the processor 904 and the other components of computing system 900.

The memory 906 may include a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with the processor 904. In some implementations, the memory 906 may include one or more of volatile memory and non-volatile memory (e.g., RAM, ROM, hard disk, optical disk, etc.). It should be understood that the memory 906 may be a single device or may include multiple types of devices and configurations.

The bus 910 can include a communication bus for transferring data between components of a computing device or between computing devices, a network bus system including a network or portions thereof, a processor mesh, a combination thereof, etc. The software communication mechanism can include and/or facilitate, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 902 may include one or more interface devices (I/F) for wired and wireless connectivity among the components of the system 100. For instance, the communication unit 902 may include various types known connectivity and interface options. The communication unit 902 may be coupled to the other components of the computing system 900 via the bus 910. The communication unit 902 may be electronically communicatively coupled to a network (e.g., wiredly, wirelessly, etc.). In some implementations, the communication unit 902 can link the processor 904 to a network, which may in turn be coupled to other processing systems. The communication unit 902 can provide other connections to a network and to other entities of the system 700 using various standard communication protocols.

The input device 914 may include any device for inputting information into the computing system 900. In some implementations, the input device 914 may include one or more peripheral devices. For example, the input device 914 may include a keyboard, a pointing device, microphone, an image/video capture device (e.g., camera), a touch-screen display integrated with the output device 916, etc.

The output device 916 may be any device capable of outputting information from the computing system 900. The output device 916 may include one or more of a display (LCD, OLED, etc.), a printer, a 3D printer, a haptic device, audio reproduction device, touch-screen display, etc. In some implementations, the output device is a display which may display electronic images and data output by the computing system 900 for presentation to a user, such as a picker or associate in the order fulfillment center. In some implementations, the computing system 900 may include a graphics adapter (not shown) for rendering and outputting the images and data for presentation on output device 916. The graphics adapter (not shown) may be a separate processing device including a separate processor and memory (not shown) or may be integrated with the processor 904 and memory 906.

The database(s) are information source(s) for storing and providing access to data. The data stored by the database(s) 908 may be organized and queried using various criteria including any type of data stored by them, such as the data in the data store 120 and other data discussed herein. The database(s) 908 may include file systems, data tables, documents, databases, or other organized collections of data. Examples of the types of data stored by the database(s) 908 may include the data described herein, for example, in reference to the data store 120.

The database(s) 908 may be included in the computing system 900 or in another computing system and/or storage system distinct from but coupled to or accessible by the computing system 900. The database(s) 908 can include one or more non-transitory computer-readable mediums for storing the data. In some implementations, the database(s) 908 may be incorporated with the memory 906 or may be distinct therefrom. In some implementations, the database(s) 908 may store data associated with a database management system (DBMS) operable on the computing system 900. For example, the DBMS could include a structured query language (SQL) DBMS, a NoSQL DMBS, various combinations thereof, etc. In some instances, the DBMS may store data in multi-dimensional tables comprised of rows and columns, and manipulate, e.g., insert, query, update and/or delete, rows of data using programmatic operations.

It should be noted that the components described herein may be further delineated or changed without departing from the techniques described herein. For example, the processes described throughout this disclosure may be performed by fewer, additional, or different components.

It should be understood that the methods described herein are provided by way of example, and that variations and combinations of these methods, as well as other methods, are contemplated. For example, in some implementations, at least a portion of one or more of the methods represent various segments of one or more larger methods and may be concatenated or various steps of these methods may be combined to produce other methods which are encompassed by the present disclosure. Additionally, it should be understood that various operations in the methods are iterative, and thus repeated as many times as necessary generate the results described herein. Further the ordering of the operations in the methods is provided by way of example and it should be understood that various operations may occur earlier and/or later in the method without departing from the scope thereof.

In the above description, for purposes of explanation, numerous specific details are set forth in order to provide a thorough understanding of the present disclosure. However, it should be understood that the technology described herein can be practiced without these specific details in various cases. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects may not be mandatory or significant, and the mechanisms that implement the specification or its features may have different names, divisions, and/or formats.

Furthermore, the modules, routines, features, attributes, methodologies, and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method comprising:
receiving, by a processor, carton data representing a set of cartons, the carton data indicating one or more picks for each carton of the set of cartons;
determining, by the processor, a score for a first carton of the set of cartons based on a first location of a first pick of the one or more picks for the first carton in a pick-to-cart area of a fulfillment center, the score for the first carton being based on whether the first location of the first pick is on a path previously assigned to a cart, the path previously assigned to the cart extending at least partially into a first aisle and back out of the first aisle, determining the score including determining that the first location is farther into the first aisle than a previously-assigned location of a previously-assigned pick assigned to the cart, the previously-assigned location being on a first side of the first aisle and the first location being on a return path on a second side of the first aisle;
assigning, by the processor, the first carton to the cart based on the score determined for the first carton, the cart being adapted to transport cartons to the pick-to-cart area of the fulfillment center; and
instructing, by the processor, an automated guided vehicle (AGV) to transport the cart based on the first location for the first carton.

2. The computer-implemented method of claim 1, further comprising:
dispatching, by the processor, the cart to the pick-to-cart area of the fulfillment center based on the first location of the first pick for the first carton including:
transmitting an instruction to the AGV to transport the cart from an induction area to the first location, the AGV coupling with the cart to transport the cart.

3. The computer-implemented method of claim 1, further comprising:
determining, by the processor, a first subset of cartons of the set of cartons that is assigned to be picked in the pick-to-cart area of the fulfillment center based on status codes associated with the set of cartons, the first subset of cartons including the first carton;
determining, by the processor, a second subset of cartons of the set of cartons that is assigned to be picked in a goods-to-person area of the fulfillment center based on the status codes associated with the set of cartons; and
inducting, by the processor, one or more of the second subset of cartons to a station in the goods-to-person area of the fulfillment center.

4. The computer-implemented method of claim 3, further comprising:
assigning, by the processor, each of the set of cartons to one of the first subset of cartons and the second subset of cartons including:
determining a first workload level of the pick-to-cart area of the fulfillment center;
determining a second workload level of the goods-to-person area of the fulfillment center; and
setting a status code for that carton of the set of cartons based on level and the second workload level.

5. The computer-implemented method of claim 4, further comprising:
determining, by the processor, that a second carton of the second subset of cartons is swappable from the first subset of cartons to the second subset of cartons based on a physical attribute of the second carton; and
reassigning, by the processor, the second carton from the first subset of cartons to the second subset of cartons based on the determination that the second carton is swappable including modifying the status code for the second carton.

6. The computer-implemented method of claim 1, wherein:
the first carton includes the first pick and a second pick in the pick-to-cart area of the fulfillment center; and
determining the score for the first carton includes:
determining the first location of the first pick for the first carton;
determining a second location of the second pick for the first carton; and
computing the score for the first carton based on a proximity of the second location to the first location.

7. The computer-implemented method of claim 1, wherein determining the score for the first carton includes:
determining the first location of the first pick for the first carton;
determining a second location of a second pick for a second carton, the second carton being assigned to the cart; and
determining the score for the first carton based on the first location and the second location.

8. The computer-implemented method of claim 7, further comprising:
determining, by the processor, that the second carton has a priority status based on a delivery departure cut time of the second carton;
assigning, by the processor, the second carton to the cart based on the priority status, the second carton being assigned to the cart prior to the first carton being assigned to the cart; and
determining, by the processor, the score for the first carton based on a distance traveled from the second location to the first location.

9. The computer-implemented method of claim 7, wherein determining the score for the first carton based on the first location and the second location includes:

determining that the first location and the second location are located on a same aisle of the pick-to-cart area of the fulfillment center.

10. The computer-implemented method of claim 9, wherein determining the score for the first carton based on the first location and the second location includes:
   determining a distance traveled in the same aisle by the cart transporting the first carton and the second carton to the first location and the second location.

11. The computer-implemented method of claim 7, wherein determining the score for the first carton based on the first location and the second location includes:
   determining that the first pick and the second pick are for items having a same stock keeping unit.

12. The computer-implemented method of claim 1, wherein determining the score for the first carton includes:
   determining a proximity of the first location to a focus zone in the pick-to-cart area of the fulfillment center.

13. The computer-implemented method of claim 1, further comprising:
   identifying, by the processor, a second carton of the set of cartons that has a second pick for an item marked as needing replenishment; and
   holding, by the processor, the second carton for a later induction release.

14. The computer-implemented method of claim 1, further comprising:
   identifying, by the processor, a plurality of workstations adapted to prepare the set of cartons for the one or more picks in the fulfillment center, the fulfillment center including the pick-to-cart area and a goods-to-person area; and
   configuring, by the processor, a first set of the plurality of workstations to prepare cartons of the set of cartons that are within a threshold time of a delivery departure cut time.

15. The computer-implemented method of claim 14, further comprising:
   determining, by the processor, a first workload level of the pick-to-cart area of the fulfillment center;
   determining, by the processor, a second workload level of the goods-to-person area of the fulfillment center;
   determining, by the processor, a level of balance between the first workload level and the second workload level; and
   configuring, by the processor, a second set of the plurality of workstations to prepare cartons of the set of cartons for one or more of the pick-to-cart area and the goods-to-person area based on the level of balance.

16. The computer-implemented method of claim 1, further comprising:
   determining, by the processor, a second carton and a third carton of the set of cartons that are assigned to a goods-to-person area of the fulfillment center;
   assigning, by the processor, the second carton to a determined cartless fulfillment station based on a delivery departure cut time for the second carton and an attribute of the determined cartless fulfillment station; and
   assigning, by the processor, the third carton to the determined cartless fulfillment station based on the third carton having at least one pick at a same location as a pick of the second carton.

17. A system comprising:
   a cart automated guided vehicle (AGV) including a drive unit providing motive force to the cart AGV and a cart coupled to the cart AGV, a controller controlling the cart AGV, a guidance system coupled with the controller and processing navigation markers to locate the cart AGV within a fulfillment center, and a power source coupled to the controller and the drive unit; and
   one or more processors that communicate with the controller of the cart AGV and a memory storing instructions that, when executed by the one or more processors, cause the system to:
      receive carton data representing a set of cartons, the carton data indicating one or more picks for each carton of the set of cartons;
      determine a score for a first carton of the set of cartons based on a first location of a first pick of the one or more picks for the first carton in the fulfillment center, the score for the first carton being based on whether the first location of the first pick is on a path previously assigned to the cart, the path previously assigned to the cart extending at least partially into a first aisle and back out of the first aisle, determining the score including determining that the first location is farther into the first aisle than a previously-assigned location of a previously-assigned pick assigned to the cart;
      assign the first carton to the cart based on the score determined for the first carton, the cart being adapted to transport cartons; and
      induct the first carton into the fulfillment center for the first pick using the cart.

18. The system of claim 17, wherein determining the score for the first carton includes:
   determining the first location of the first pick for the first carton;
   determining a second location of a second pick for a second carton, the second carton being assigned to the cart; and
   determining the score for the first carton based on the first location and the second location.

19. The system of claim 18, wherein the instructions further cause the system to:
   determine that the second carton has a priority status based on a delivery departure cut time of the second carton;
   assign the second carton to the cart based on the priority status, the second carton being assigned to the cart prior to the first carton being assigned to the cart; and
   determine the score for the first carton based on a distance traveled from the second location to the first location.

20. A system comprising:
   means for transporting a set of cartons in a fulfillment center to one or more locations at which one or more items are picked into the set of cartons;
   means for receiving carton data representing the set of cartons, the carton data indicating one or more picks for each carton of the set of cartons;
   means for determining a score for a carton of the set of cartons based on a first location of a first pick of the one or more picks for the carton in the fulfillment center, the score for the carton being based on whether the first location of the first pick is on a path previously assigned to the means for transporting the set of cartons, the path previously assigned extending at least partially into a first aisle and back out of the first aisle, determining the score including determining that the first location is farther into the first aisle than a previously-assigned location of a previously-assigned pick assigned to the means for transporting the set of cartons;

means for assigning the carton to the means for transporting the set of cartons based on the score determined for the carton; and means for inducting the carton into the fulfillment center for the first pick using the means for transporting the set of cartons.

* * * * *